(12) United States Patent
Danko

(10) Patent No.: US 7,610,183 B2
(45) Date of Patent: Oct. 27, 2009

(54) MULTIPHASE PHYSICAL TRANSPORT MODELING METHOD AND MODELING SYSTEM

(75) Inventor: George Danko, Reno, NV (US)

(73) Assignee: Board of Regents of the University and Community College System of Nevada, on behalf of the University of Nevada, Reno, NV (US)

( * ) Notice: Subject to any disclaimer, the term of this patent is extended or adjusted under 35 U.S.C. 154(b) by 671 days.

(21) Appl. No.: 10/881,135

(22) Filed: Jun. 30, 2004

(65) Prior Publication Data

US 2005/0049838 A1    Mar. 3, 2005

(51) Int. Cl.
G06F 17/10 (2006.01)
(52) U.S. Cl. .......................................................... 703/2
(58) Field of Classification Search ...................... 703/2
See application file for complete search history.

(56) References Cited

OTHER PUBLICATIONS

Danko: Numerical simulation of solute transport in a spent heap leach pad; abstract; Heap Leach Closure Workshop; Mar. 25, 2003; one page.*
NPL2: "Code verification (benchmarking)"; portion obtained from p. 5 of Final Report: Nye County Ventilation Modeling; (May 2004; one page.*
G. Danko et al. (2001), "Ventilation Analysis of a Cold Conceptual..", Proceedings, 9th International high-Level Radioactive Waste Management Conference, Apr. 9-May 3.
Danko, G., (2002), Multiflux V2.0, Software Configuration Management, Yucca Mountain Project—STN: 10485-2.0-00, University of Nevada, Reno, Yucca Mountain Project Record.
Danko, G., (1999), Multiflux Four Layer Test, Scientific Notebook: SN-M&O-UNR-024-V1, pp. 35-73, ACC: MOL.20020126.0044.
Danko, G. "Functional or Operator Representation . . . ", Journal of Heat Transfer, vol. 128, pp. 162-175 Feb. 2006 (ASME).

(Continued)

Primary Examiner—Hugh Jones
(74) Attorney, Agent, or Firm—Ryan A. Heck

(57) ABSTRACT

A general, computational-mathematical modeling method for the solution of large, boundary-coupled transport problems involving the flow of mass, momentum, energy or subatomic particles is disclosed. The method employs a modeling processor that extracts a matrix operator equation (or set of equations) from a numerical transport code (NTC). The outputs of software codes, available for modeling physical problems governed by conservation laws in the form of differential equations, can be processed into closed-form operator equations with the method. Included is a numerical transport code functionalization (NTCF) model which can be determined numerically, based on a system of solutions of an NTC, evaluating outputs for a given set of inputs. The NTCF model is a linear or nonlinear, multi-variable operator equation or set of such equations. The NTCF model defines relationships between general, time-variable inputs and outputs, some known and some unknown, considered as boundary values. The user of an NTCF model can directly work with the processed model output, instead of running the original numerical code in general applications of a boundary-value problem. The numerical transport code functionalization model can be employed as a surrogate for representing the numerical transport code to provide a solution to the transport problem. The invention enables modeling efficiency and availability to be increased, while computational complexity and cost decreased. Computational times for complex modeling problems can, in some cases, be dramatially reduced, for example by several orders of magnitude.

17 Claims, 18 Drawing Sheets

OTHER PUBLICATIONS

Danko, G. "Numerical Transport Code Functionalization..", 2004 ASME Heat Transfer/Fluid Engineering Summer Conference, Jul. 11-15, 2004, Charlotte, NC.

Search Report for International Patent Application No. PCT/US02/41436, Dated Jun. 19, 2003.

Poh et al. Heat Transfer and Flow Issues in Manifold Microchannel Heat Sinks: a CDF Approach. IEEE Proc. Elect. Pack. Tech. Conf. Dec. 1998, pp. 246-250.

Shrimpton et al. Steady Stae Eulerian-Eulerian Simulation of Charged Insulating Liquid Flows. IEEE EIDP. Oct. 1999. pp. 767-770.

Nitao, J., (2000), "NUFT Flow and Transport..",Software Configuration Management, Yucca Mountain Project-STN: 10088-3.0S-00 Prep. by Lawrence Livermore National Lab., Sep. 2000.

Danko, G., (Multiflux V2.0, Software Configuration Management, Yucca Mountain Project—STN: 10485-2.0-00, University of Nevada, Reno, Yucca Mountain Project Record Information Systems (RIS), 2002.

G. Danko et al., "The Application of CFD to Ventilation Calculations at Yucca Mountain", WM 02' Conference, Feb. 24-28, 2002, Tucson, AZ, Session 39B, Paper 12, Abs. 243, pp. 1-11, 2002.

BSC (Bechtel SAIC Company), Ventilation Model, ANL-EBS-MD-000030 REV 01, Las Vegas, Nevada: Bechtel SAIC Company, ACC, Feb. 1, 2002.

Danko, G.,"Cooperation between UNR and ANSYS in modeling acceleration," seminar and demonstration, ANSYS, Canonsburg, PA, Sep. 16, 2002.

Danko, G., "REKA V1.1 software qualifications," University of Nevada, Reno, Yucca Mountain Project Record Information System (RIS), ACC: MOL.20010212.0299, 2001.

Danko, G., "Coupled Hydrothermal-Ventilation Studies for Yucca Mountain." Annual Report for 2003. NWRPO-2003-05, Pahrump, Nevada: Nye County Department of Natural Resources, Dec. 2003.

Danko, G., et al., "Technical Support Services for the Multiflux Software." MOL.20031208.0025, Final Report, submitted to BSC, Nevada: Bechtel SAIC Company, Sep. 20, 2003.

* cited by examiner

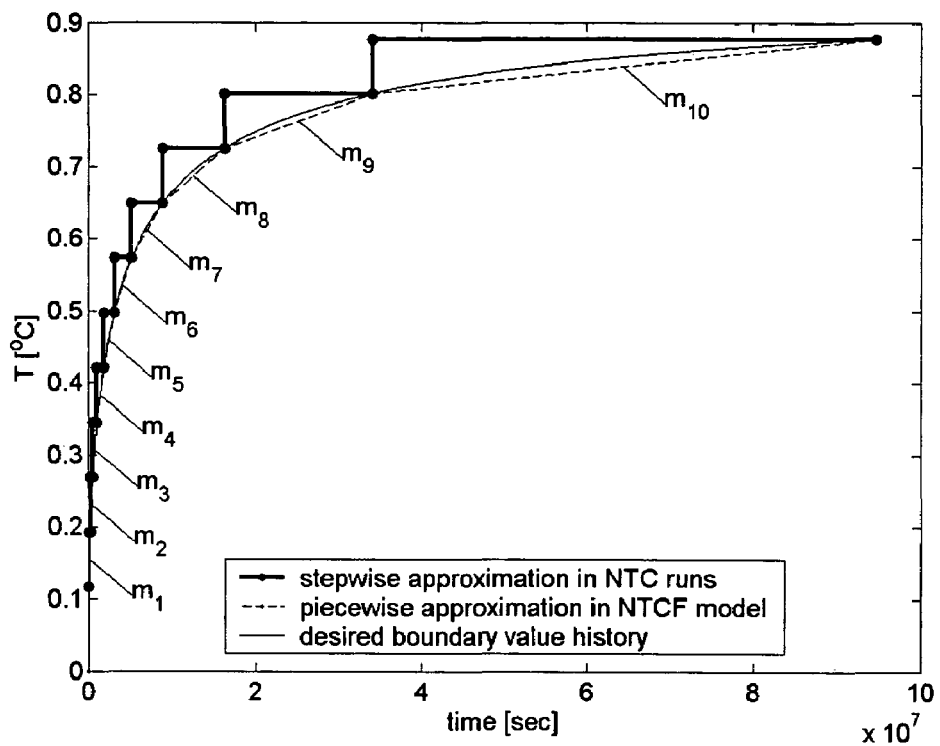
Figure 16(a): NTCF algorithm test approximations
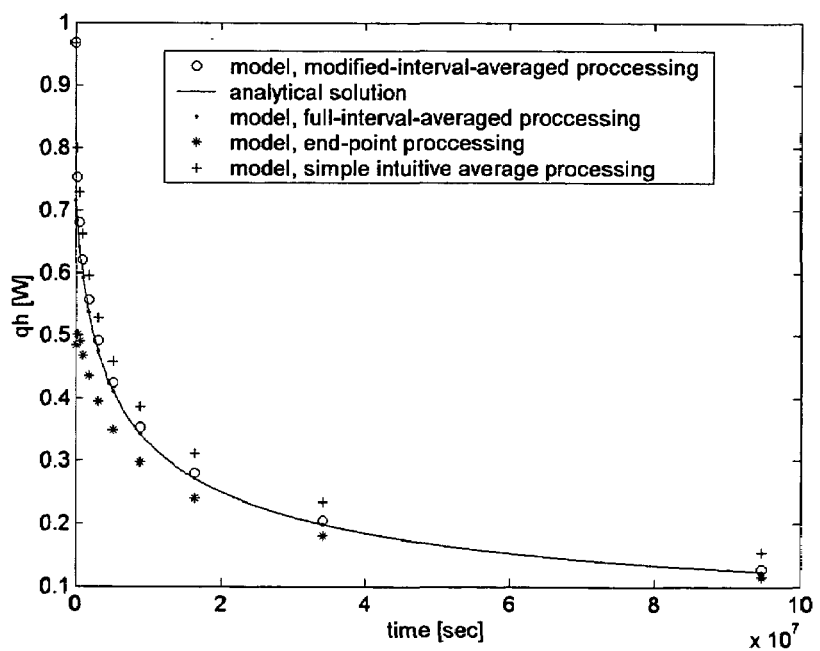
Figure 16(b): Results of three different NTCF post-processing methods.

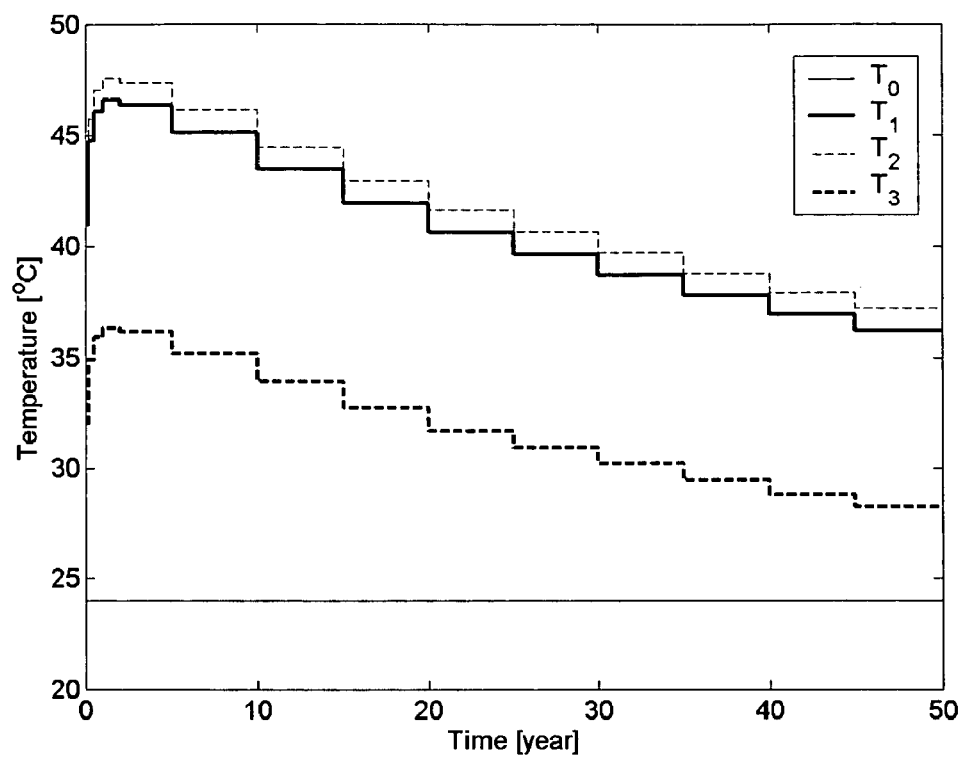
Figure 17: NTCF models identification
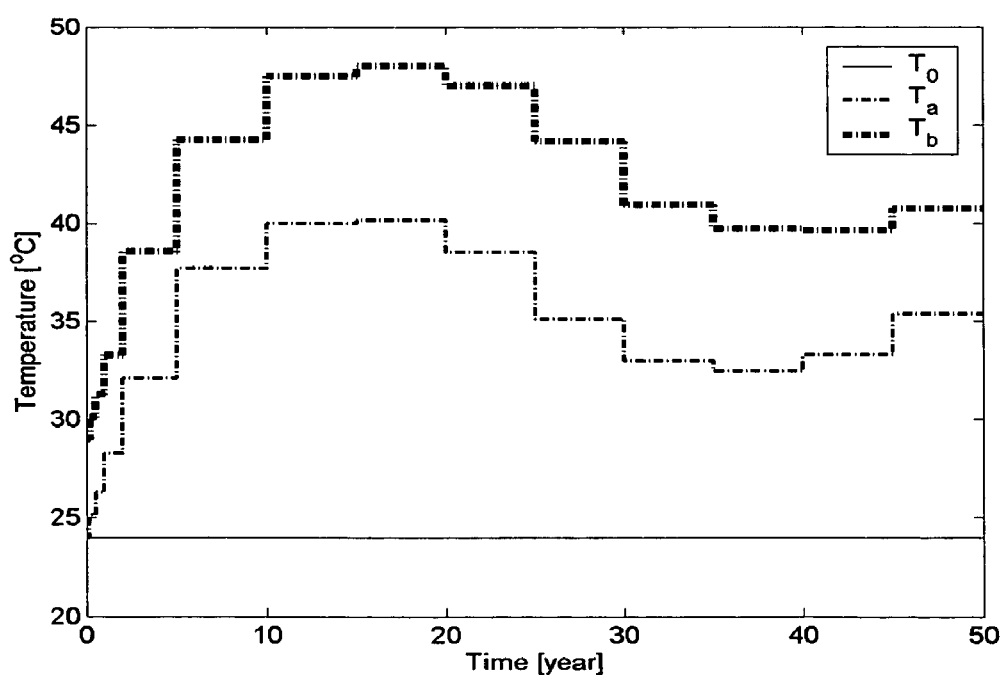
Figure 18: NTCF functional model fitness tests

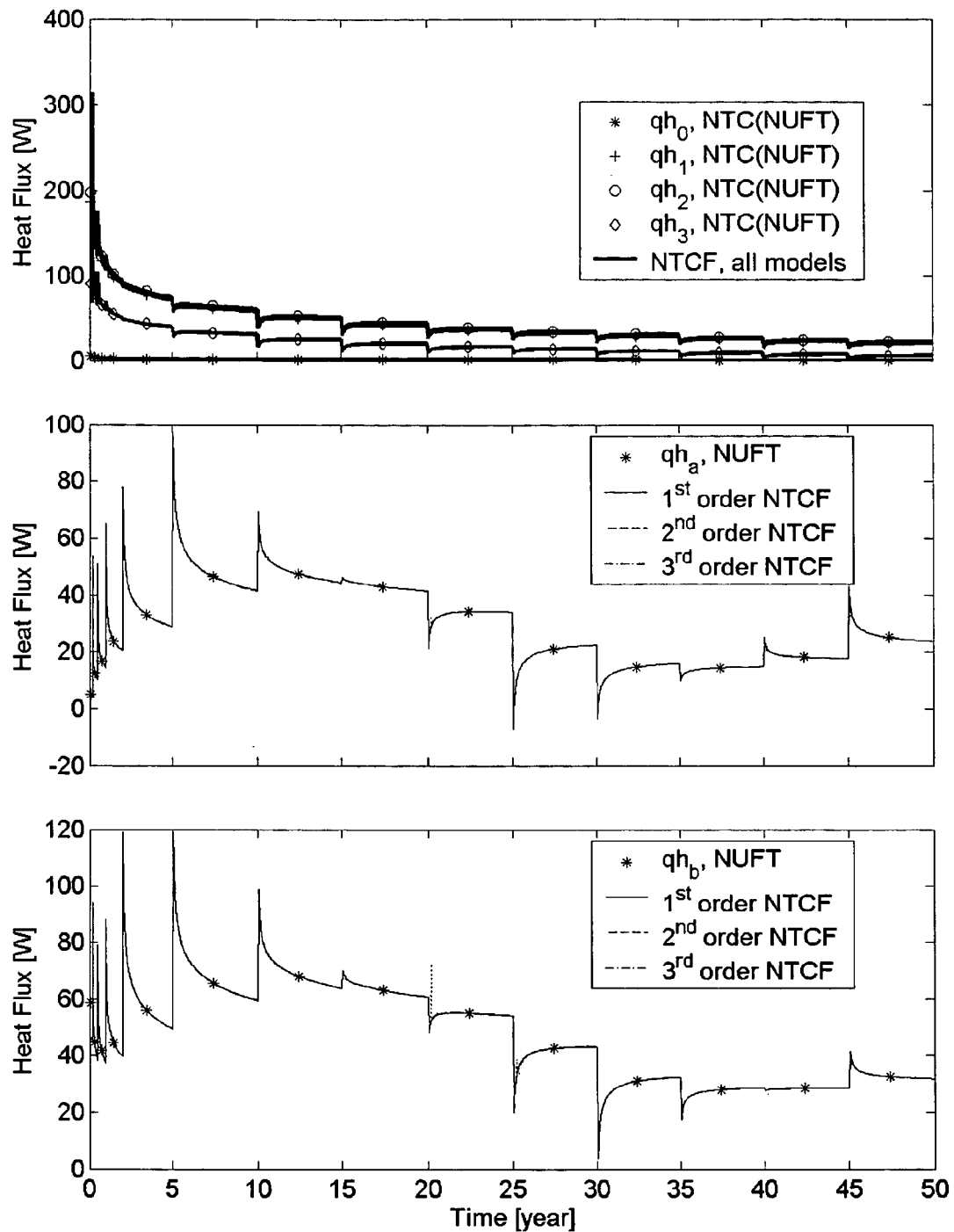
Figure 19: Heat flux model identification and model fitness test results

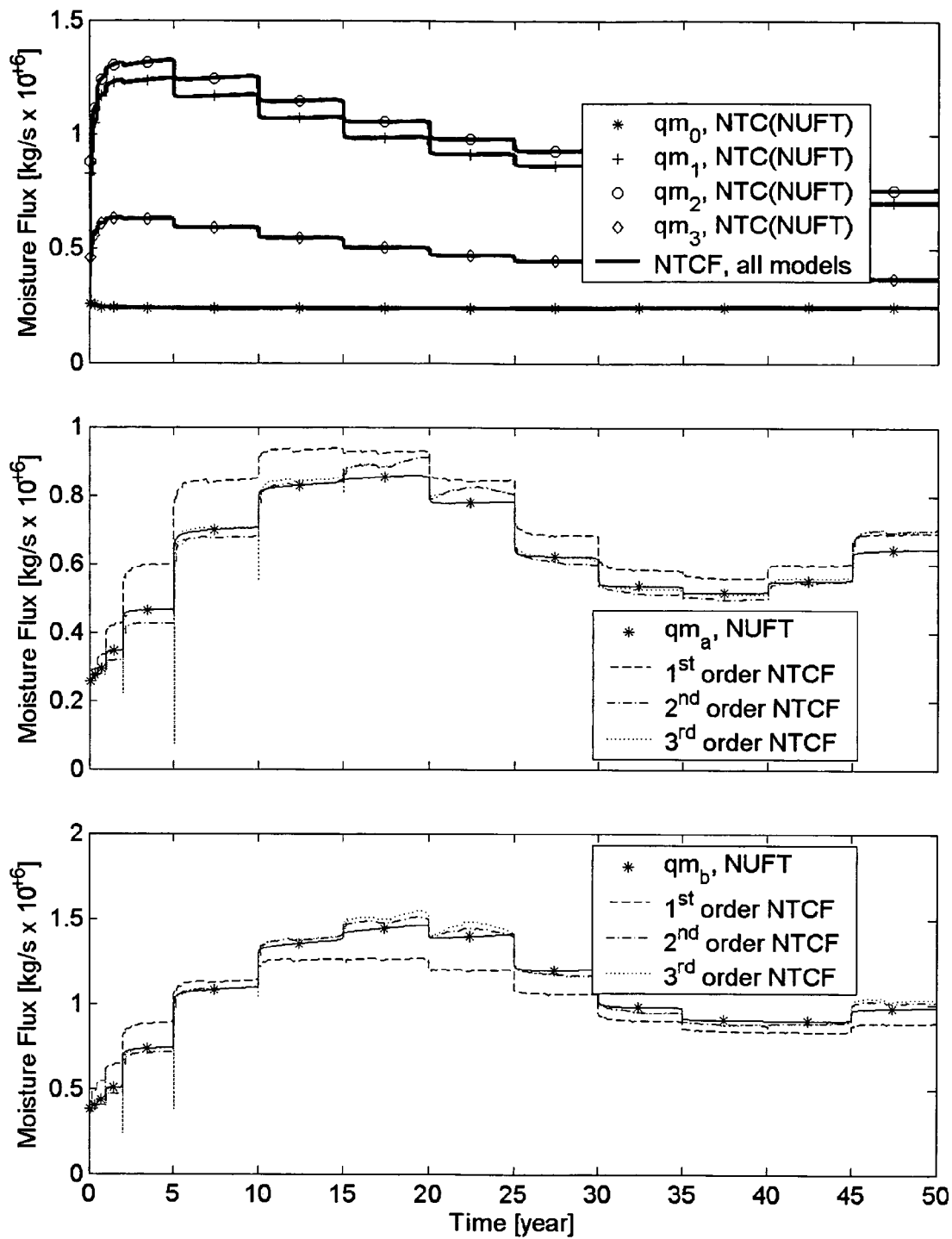
Figure 20: Moisture flux model identification and model fitness test results

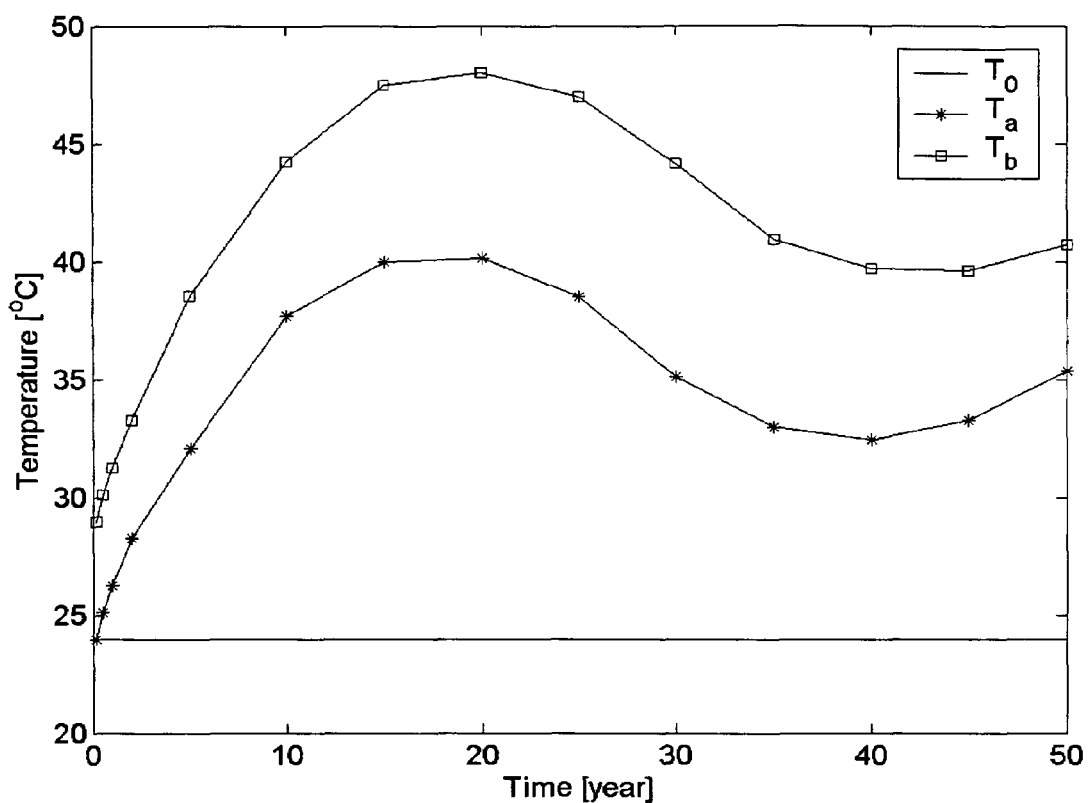
Figure 21: Piecewise-linear input temperature variations with time for $T_a$ and $T_b$.

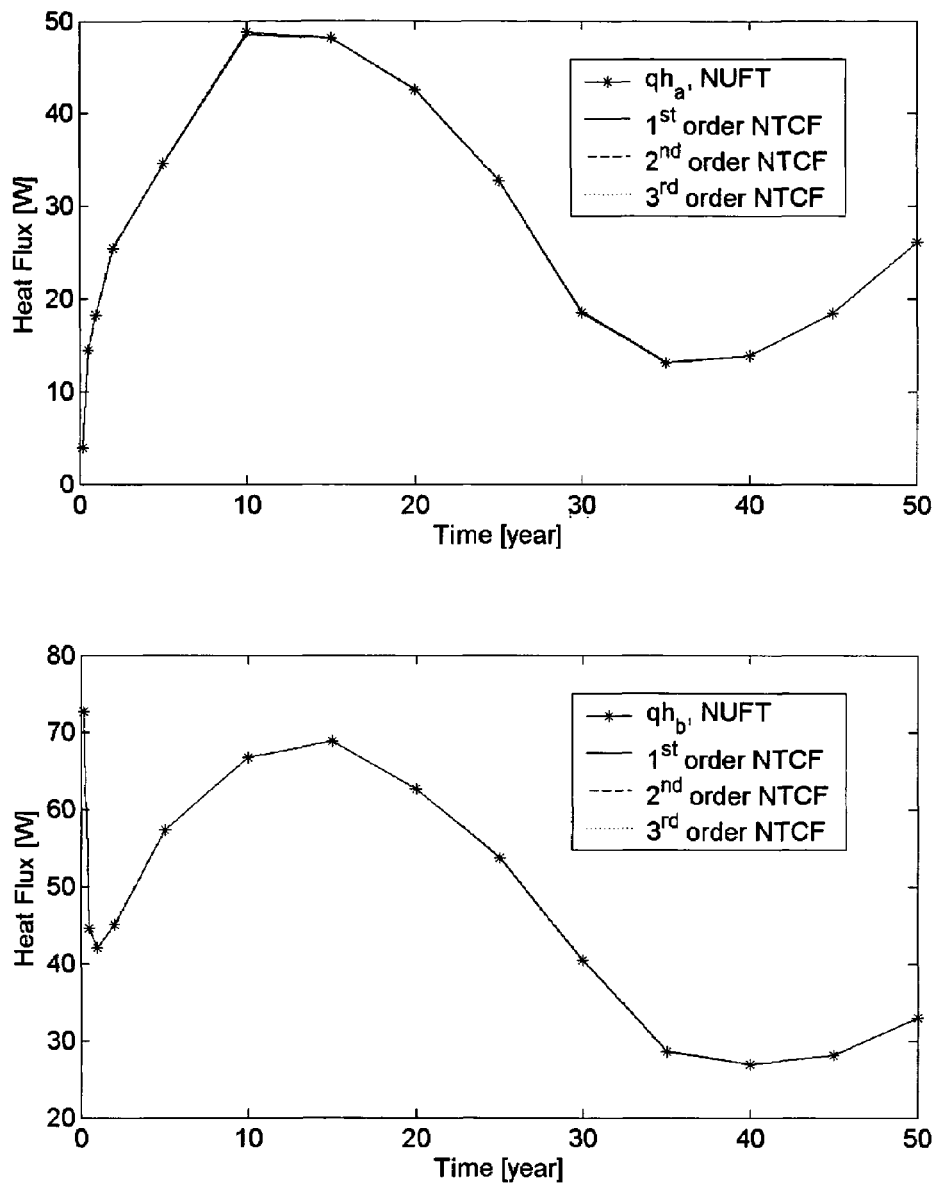
Figure 22: NTCF model results versus the NTC (NUFT) piecewise-linear input boundary function results for heat flux

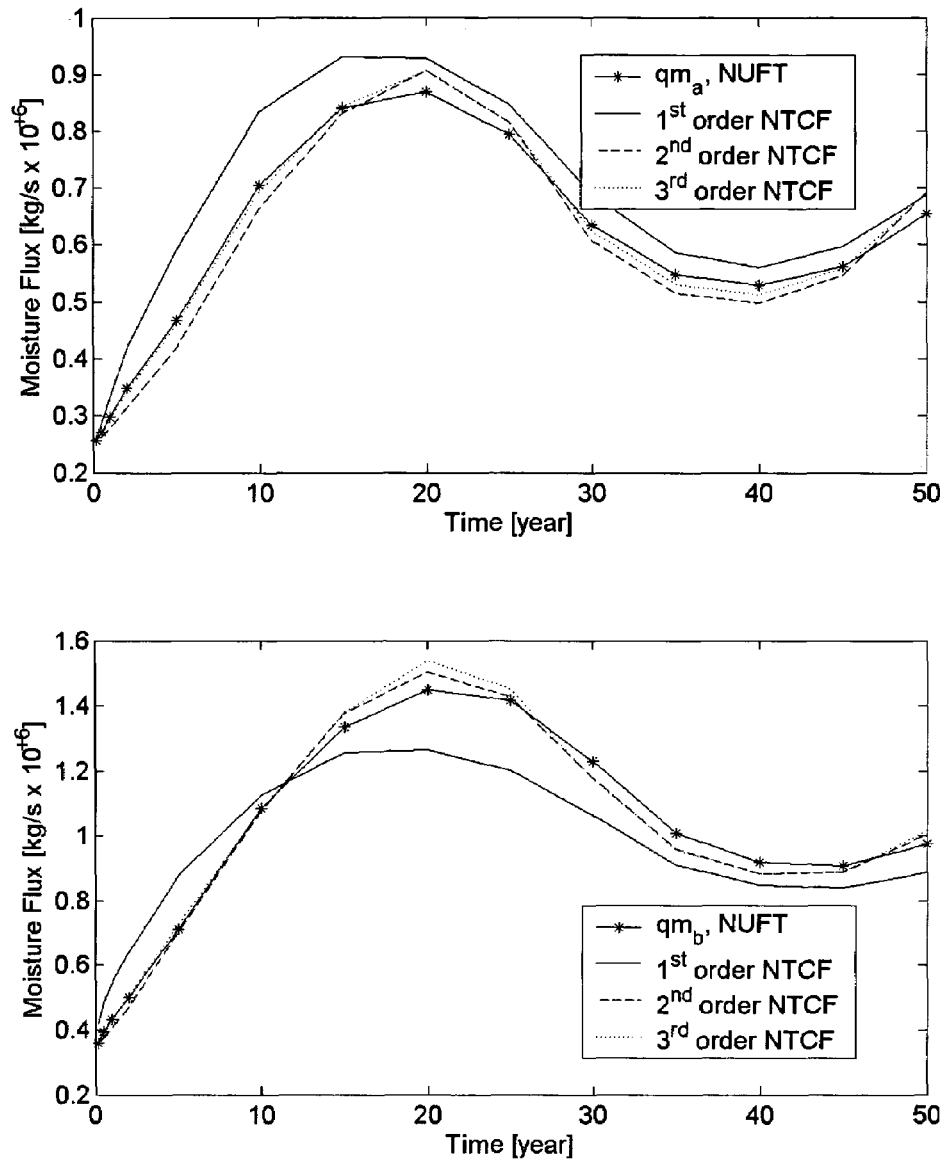
Figure 23: NTCF model results versus the NTC (NUFT) piecewise-linear input boundary function results for moisture flux

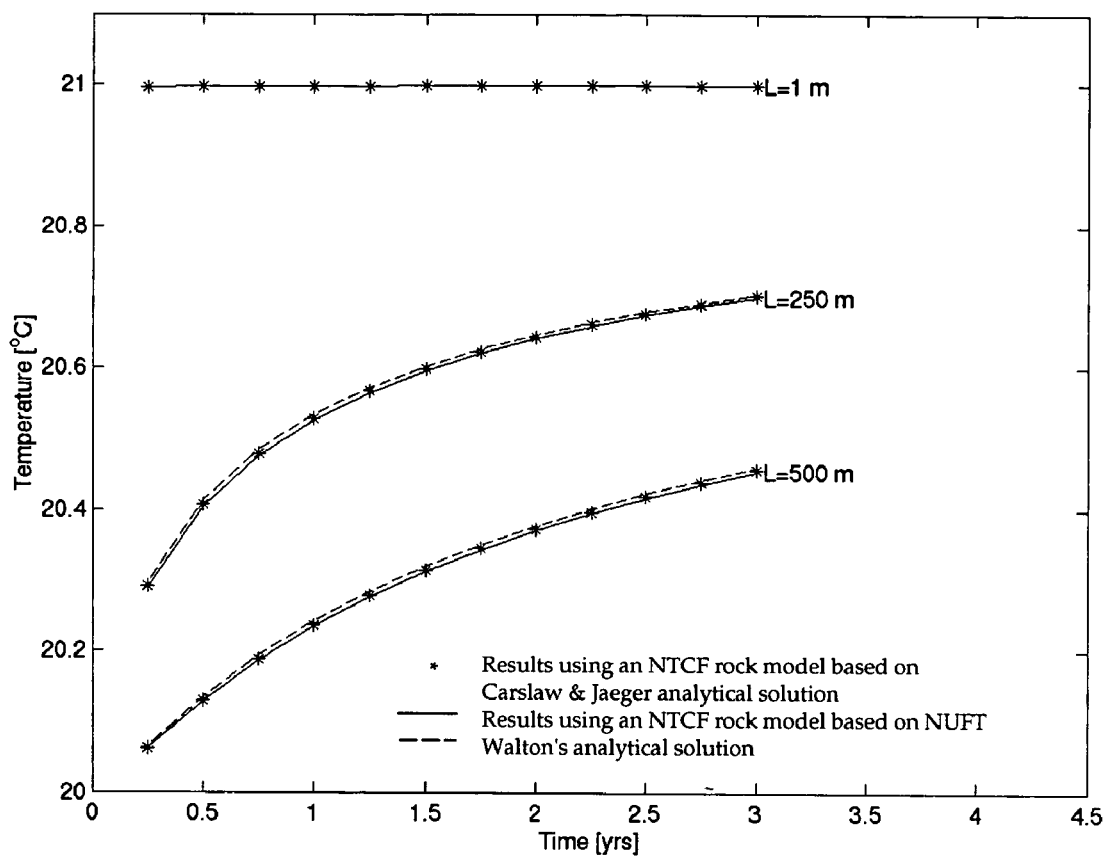
Figure 24: Air temperature history comparisons
Figure 25: Sampling time Discretization
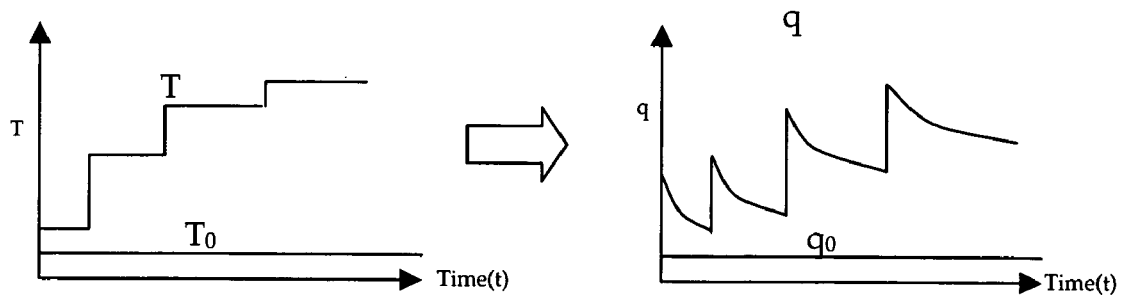

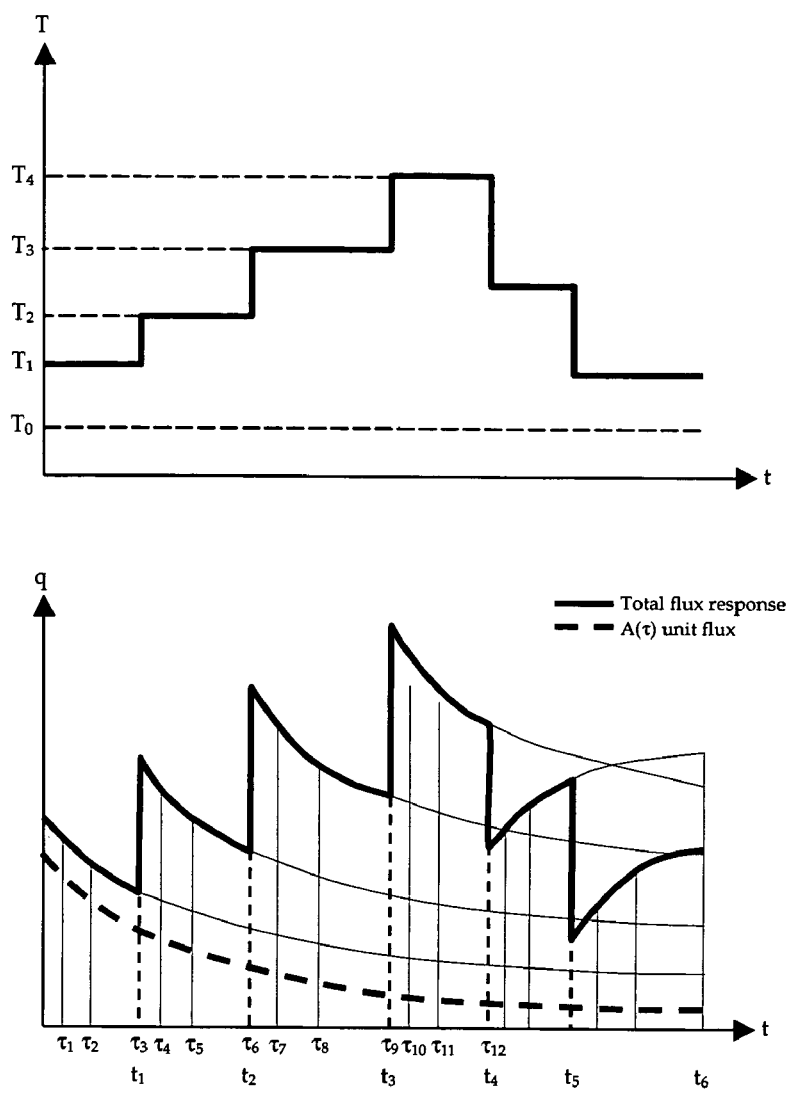
Figure 26: Heat flux response to input variable temperature with time ticks

MULTIPHASE PHYSICAL TRANSPORT MODELING METHOD AND MODELING SYSTEM

FIELD OF THE INVENTION

The present invention relates to a method and computerized system for modeling multiphase physical transport processes. More particularly, the invention relates to a computational-mathematical modeling method and to related software and computerized systems for the solution of time-dependent transport problems involving the flow in each of multiple physical phases, which may be solid, liquid, gaseous or intermediate or mixed physical phases, or media of mass, momentum, energy, subatomic particles or other such physical entities. Such problems include, for example: heat, moisture, and chemical component flows under temperature, pressure, or concentration gradients; energy flows under potential gradients; and stress propagation due to strain distribution; and other such flows as will be apparent to those skilled in the art.

BACKGROUND OF THE INVENTION

Modeling multiple physical flows in two or more interacting physical phases can often become so complex as to require sophisticated computational methods and extensive computer resources. For example, effective modeling of nuclear waste repository systems such as at Yucca Mountain in the state of Nevada to provide time-related heat and moisture flow outcomes for particular storage configurations may require detailed modeling of heat, air and moisture transport processes occurring in a mass of rock of volume of the order of one kilometer cubed and which is invested with shafts, airways, storage bays and corridors and the like. In some cases conventional modeling methods may have difficulty in generating adequately detailed data at a useful pace. Even the best of available computing equipment may lag the calendar. For example, for some problems it appears that a 300-year, three-dimensional, full-mountain hydrothermal and ventilation simulation could take as much as 500 years to run with conventional methods and equipment.

Known solutions of such modeling problems for a given boundary condition often employ a suitable numerical method, referred to as a numerical transport code (hereinafter referenced "NTC"). Numerical transport codes represent a family of engineering software to solve, for example, heat conduction problems in solids using ANSYS; heat and moisture transport problems in porous media using NUFT; or laminar or turbulent flow and transport problems using FLUENT, a computational fluid dynamic (CFD) model.

The component elements of conventional complex simulation models are in some cases quite well developed. A difficulty encountered is that the incorporation of two or more, stand-alone model elements into a coupled simulation may introduce problems including (1) code incompatibilities; (2) source-code-level programming needs; and (3) quality-control problems of large codes developed by multiple groups of independent authors. For example, 3D heat conduction, or nonequilibrium flows of heat, moisture, and a scalar substance transport in saturated/unsaturated medium, can be adequately simulated, with NUFT [4] or TOUGH [21]. Convection, conduction, and radiation in flow channels can be calculated with commercial codes such as ANSYS [22], an engineering simulation package, or FLUENT [23], a CFD software. However, the coupled solution of large, independent codes may require unacceptably long computational time.

BRIEF SUMMARY OF THE INVENTION

The present invention solves the problem of providing a modeling method for multiphase physical transport systems which can meaningfully reduce computational time, especially, but not exclusively, when modeling with coupled simulations.

To solve this problem, the invention provides, in one aspect a method of modeling a physical transport system wherein a physical entity is transported in a physical phase to provide a model for solving a time -and space-variable entity transport problem, the method comprising:
 a) providing a numerical transport code having multiple time-variable inputs and at least one time-variable output;
 b) generating a numerical transport code functionalization to represent the numerical transport code, the numerical transport code functionalization defining relationships between the multiple time-variable inputs and the at least one time-variable output; and
 c) employing the numerical transport code functionalization to build a numerical transport code functionalization model of the physical transport system.

The physical transport system can comprise a system wherein multiple physical entities are transported in one or more physical phases and wherein the transport problem relates to the transport of each of the multiple physical entities. Also, the physical transport system may comprise multiple phases wherein multiple physical entities are in the system and wherein, optionally, at least two of the entities are coupled, transport of one coupled entity transported affecting the transport of the other coupled entity.

The physical transport system comprises multiple phases wherein multiple physical entities are transported in the system and wherein, optionally, at least two of the entities are coupled, transport of one coupled entity affecting the transport of the other coupled entity.

In preferred embodiments, the numerical transport code functionalization comprises a linear or non-linear, algebraic or differential, closed-form, multi-variable operator equation or set of equations. The numerical transport code functionalization model can also comprises an algebraic or differential matrix operator equation or set of equations having numerical coefficients for adjustment to represent a corresponding numerical transport code. A numerical-computational procedure is described herein to determine a multi-dimensional functional or an operator for the representation of the computational results of a numerical transport code.

Preferably, the method comprises determining the numerical transport code functionalization model numerically by iteratively or repetitively solving the numerical transport code and evaluating outputs for a set of multiple inputs optionally with determination of the applicable terms and the numerical values of free coefficients in the numerical transport code functionalization model.

Employing preferred embodiments of the invention, modeling efficiency and availability can be increased, while computational complexity and cost are decreased. In one preferred embodiment, the invention provides, for the first time, a multiphase, coupled hydrothermal-ventilation simulation code. In addition, the coupled solution of large, independent codes may require extremely long computational time. With preferred embodiments of the inventive NTCF modeling method, it is possible to solve, for example, large-scale, three-dimensional, time-dependent heat, and coupled hydrothermal/moisture transport and other problems, with little training and affordable CPU time.

BRIEF DESCRIPTION OF THE SEVERAL VIEWS OF THE DRAWING

Some embodiments of the invention, and of making and using the invention, as well as the best mode contemplated of carrying out the invention, if not described above, are described in detail below, by way of example, with reference to the accompanying drawings, in which like reference characters designate the same or similar elements throughout the several views, and in which:

FIG. 16(a) illustrates one embodiment of stepwise and piecewise input approximations for NTCF algorithm tests;

FIG. 16(b) illustrates the results of three different embodiments of NTCF post-processing methods;

FIG. 17 illustrates stepwise input temperature variations used for NTCF models identification;

FIG. 18 illustrates stepwise input temperature variations used for NTCF functional model fitness tests;

FIG. 19 illustrates a comparison between the 1st, 2nd, and 3rd-order NTCF model results and the NTC (NUFT) results for heat flux: the upper set of graphs, set (a), shows back-calculated results used for model identification, the middle and lower sets of graphs, sets (b) and (c), show two sets of NTCF model fitness test results against direct NTC (NUFT) results;

FIG. 20 is a view similar to FIG. 19 showing three sets of graphs (a)-(c) illustrating comparable back calculated and fitness test result comparisons for moisture flux;

FIG. 21 illustrates the variations with time of two piecewise-linear input temperatures;

FIG. 22 illustrates the results of the piecewise-linear input temperature variations $T_a$ (upper graph) and $T_b$ (lower graph) shown in FIG. 21 for heat fluxes $qh_a$ and $qh_b$;

FIG. 23 illustrates the results of the piecewise-linear input temperature variations $T_a$ (upper graph) and $T_b$ (lower graph) shown in FIG. 21 for moisture fluxes $mh_a$ and $mh_b$;

FIG. 24 shows air temperature history comparisons at intervals along an airway between a NUFT-based method according to the invention and two other methods;

FIG. 25, is a schematic illustration of time discretization of a stepwise approximation of a boundary function useful in an inverse convolution function that can be employed in the practice of the invention, for example, in embodiments such as that illustrated in FIG. 16(a); and FIG. 26 illustrates use of discretization such as is shown in FIG. 25 in determining the response of heat flux, or other time-sensitive physical entity to input temperature variation, the upper graph illustrating the variation an input temperature T with time, and the lower graph showing the output T along with time descretization and the unknown unit flux response, function $A(\tau)$.

DETAILED DESCRIPTION OF EMBODIMENTS OF THE INVENTION

Figure 1A:
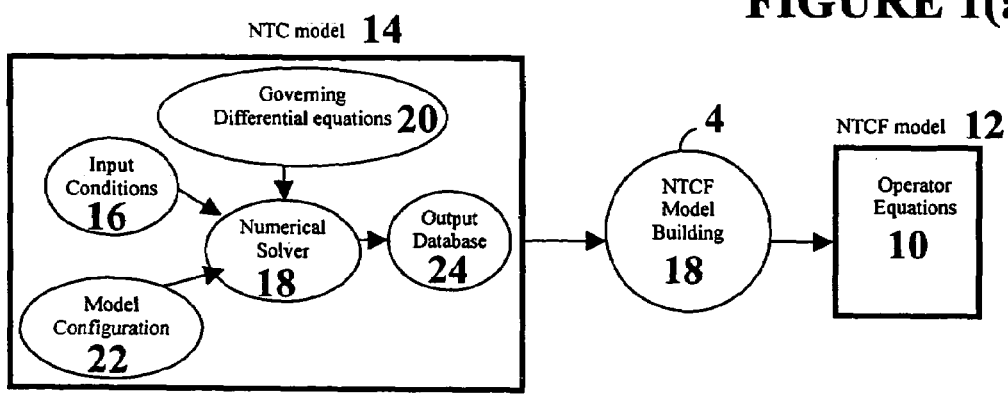
FIG. 1(a) is a logical flow chart of a NCTF model building method according to one embodiment of the invention for building a model of a multiphase physical transport process.
Figure 1B:
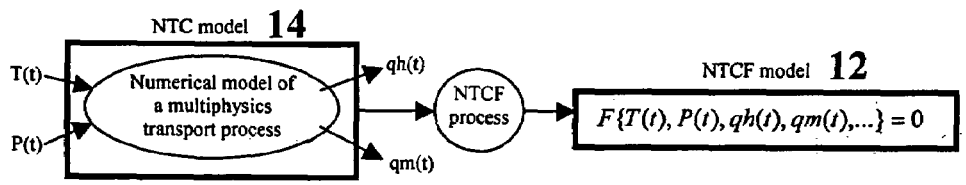
FIG. 1(b) is a data flow chart of the NCTF model building method shown in FIG. 1(a)

In preferred embodiments, the inventive method includes the use of a linear or non-linear, algebraic or differential, general mathematical model, herein referenced a "numerical transport code functionalization" ("NTCF" hereinafter) model as a surrogate to represent a corresponding available numerical transport code "NTC", or codes for the exact or approximate solution of an original time- and space-variable transport problem involving multiphase physical transport.

In other words, the preferred inventive modeling methods and systems employ a mathematically derived functionalization model of the or each numeric transport code, NTCF, conventionally used to model a natural or manmade system, in place of the numeric transport code itself, to provide novel physical system models. Preferred embodiments of the inventive novel physical system models can, be as detailed and accurate as, and can be processed more rapidly, in some cases far more rapidly, as much as two or three orders of magnitude more rapidly, than the corresponding numeric transport code.

The NTCF procedure of the invention can be developed to determine a model for the representation of the code for a variety of input functions. Coupled solutions of multiphysics problems often require repeated, iterative calculations for the same model domain and with the same code, but with different boundary condition values. The NTCF technique allows for reducing the number of runs with the original numerical code to the number of runs necessary for NTCF model identification.

More particularly, the invention relates to novel processes and systems for high speed modeling of complex multiphase physical transport problems that employ data derived from real-world physical systems and provide outputs that can be utilized to adapt the real-world physical systems to yield different more desirable outcomes to events occurring in those systems. One such problem is that of modeling heat, moisture and air flows in nuclear waste repositories to develop temperature and other predictions over extended periods of time. For example, a model outcome indicating favorable temperature projections for a critical time period of 0-300 years or 0-5000 years of a particular nuclear waste repository storage architecture may enable adjustments to be made and a more intensive, less costly storage architecture to be adopted.

Preferred embodiments of the invention provide useful models and favorable management outcomes derived from application of data generated by the inventive models to solve relatively large scale geological and hydrological problems including waste storage, mine reclamation, pollution tracking and other such problems that entail fluid flow of heat, water or other fluids, moisture, air or other gases, or chemicals in complex domains such as a geological environment. Other embodiments provide useful models, data, management outcomes and beneficially modified products in materials science, engineering, controlled nuclear fusion and controlled nuclear fission for power generation.

Various transport codes are known or can readily be devised for quantitatively modeling physical fluxes such as fluxes of mass, momentum, energy, subatomic particles in solid, liquid, gaseous, intermediate or mixed media and may be employed in the present invention. Some examples of such transport codes include: numerical codes such as ANSYS (trademark) simulation software or NUFT 3D multi-phase non-isothermal flow and transport model developed by John Nitao of Lawrence Livermore National Laboratory (LLNL); formula-based, analytical-numerical solutions to the problem using textbook equation(s); TOPAZ (trademark) thermal transport code available from Lawrence Livermore National Laboratory, Livermore, Calif. TOUGH-2 (trademark) multiphase, multidimensional flow and transport code LBL-29400, Lawrence Berkeley Laboratory, Berkeley, Calif.; and GTRAN2 neutron transport code as disclosed in Vujic U.S. Pat. No. 5,267,276; and any other transport codes specifically described herein. These and other such quantitative transport codes are referenced "numeric transport codes" or "NTC" herein.

The output of available software codes for modeling physical problems governed by conservation laws in the form of differential equations, such as the aforementioned NTCs, can be processed into closed-form operator equations with the inventive method.

One preferred embodiment of NTCF model according to the invention is a linear or nonlinear, multi-variable operator equation or set of such equations which may be in the form of an operator differential equation. The NTCF model defines relationships between general, time-variable inputs and outputs considered as boundary values. Typically, some of the inputs and outputs will be known and some will be unknown. In solving general applications of a boundary-value problem, a user of an inventive NTCF model can work directly with the processed model output, instead of having to run the original numerical transport code. Furthermore, the NTCF technique can provide simplified ways of using numerical transport and other models. The inventive NTCF model can be determined numerically, based on a system of solutions of an NTC, by evaluating outputs for a given set of inputs.

One embodiment of the NTCF model is an algebraic or differential matrix operator equation or set of equations having numerical coefficients for adjustment in order to represent a corresponding NTC. The invention also provides software functions that enable the determination of the applicable terms as well as the numerical values of the free coefficients in the NTCF model.

The NTCF model as shown in FIGS. 1(a) and (b), is preferably given in an implicit operator equation, defining a closed-form relationship between general input and output functions. Referring to FIG. 1(a), the illustrated embodiment of the NTCF model building method of the invention comprises five steps which may be performed in the sequence described, or in another sequence as will be apparent to those skilled in the art. Step (1) comprises selection of one or more mathematical defining equations 10 to define the NTCF model 12 being built. Defining equations 10 may comprise a linear or nonlinear operator equation or set of equations 10 and represent a suitable NTC model 14 in analytical form.

Step (2) comprises definition of suitable physical system input conditions 16 for NTCF model 10 to establish the boundary conditions and input parameters for the calculations. NTC model 14 comprises a numerical solver 18 into which are input a set of governing differential equations 20, a suitable model configuration 22 and the input conditions 16. Numerical solver 18 of NTC model 14 generates an output database 24.

Step (3) comprises configuration of the NTC model 14, which may be a conventional NTC model or may be modified or developed for the purposes of the present invention, to generate an NTC output database 24. Preferably, a sufficient number of repetitions or iterations is run, each reflecting a variation in one or more of the input conditions 16, to provide a set of input variations adequate for complete identification of NTCF model 12 within and, more preferably, throughout the expected regime of input boundary variations.

Step (4) comprises the process of building NTCF model 12 from NTC output database 24. This can be done by determination of the free constants in operator equations 10 of the NTCF model 12 to fit the NTCF modeling results to the NTC output database 24. Preferably, step (4) includes optimizing the fitting conditions and calculating fitting errors.

Step (5) comprises iteration of steps (1)-(4) if refinement to reduce fitting errors is desired.

The invention also provides NTCF software functions or computer codes or programs to perform the various steps (1)-(5) of the NTCF model building method, either under the control of a user, or automatically on appropriate computer equipment.

Some suitable mathematical methodology useful in practicing the invention is described hereinbelow with reference to FIGS. 5-26.

Linearized NTCF Applications

A first-generation NTCF method according to the invention can be used to solve large-scale, coupled, convection-advection-conduction-radiation problems. Specifically, time-dependent heat, moisture, and ventilation air fluxes can be simulated in and/or around a subsurface opening in three dimensions using MULTIFLUX (trademark) [2, 3], a coupled, ventilation-hydrothermal model and code developed at University of Nevada Reno which can be employed in the practice of the invention. MULTIFLUX™ comprises two independent elements: the first can be formulated using NUFT [4] for generating an NTCF model for the rock mass, and the second is a computational fluid dynamics ("CFD" hereinafter) solver for the airway. NUFT is a hydrologic, hydrothermal and scalar pollutant numerical transport code (NTC) developed at the Lawrence Livermore National Laboratory.

Matrix models of time-dependent heat flow in the rock based on analytical solutions have been used previously [5, 6], but the more complex geometry and the presence of coupled heat and moisture processes in the several fluxes around a subsurface opening require the application of a numerical code, for example, in MULTIFLUX™ with an NTCF. The gain of using an NTCF model instead of a NUFT model directly in a hydrothermal-ventilation simulation is that the NTCF matrix-employing model can work much faster for calculating heat and moisture flux results. The matrices employed represent the general rock mass responses to variations in temperature and vapor pressure with time on the surface of the air-rock interface. The NTCF model results are used as a surrogate for a three-dimensional NUFT code results during a search for a coupled solution with the CFD solver. The CFD model evaluates the heat and mass transport within a ventilated tunnel that includes the heat sources, thermal radiation, free or forced convection and conduction within a wall lining, as well as free or forced vapor transport in the air. The CFD can also be functionalized with the NTCF, or used as a direct runtime input-output numerical model [7]. A matrix model has been used previously to represent a generalized convective boundary condition [8], based on a differential heat transport coefficient [9]. This methodology can be applied in MULTIFLUX™ software to represent a simplified NTCF model for the CFD-element.

Figure 2:
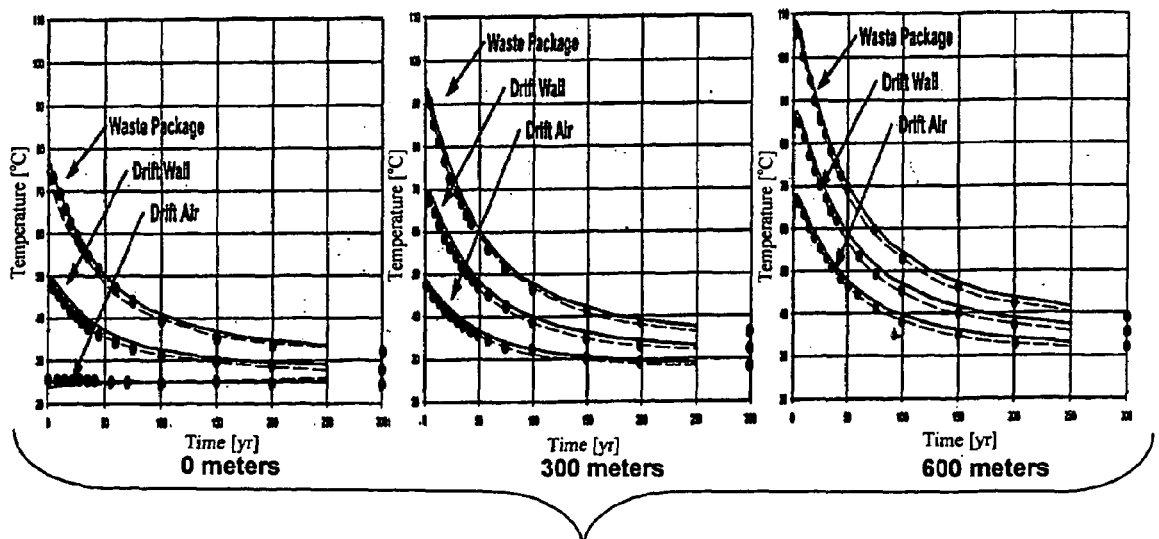
FIG. 2 illustrates the results of calculation of a ventilation model employing a NTCF model produced by the method shown in FIG. 1(a) (solid lines), compared with a prior art ANSYS model (dots)

An independent industry group, Bechtel-SAIC Corp. (BSC), Yucca Mountain Project, Nevada, has compared NTCF-based MULTIFLUX™2.0 (MF2.0) results with the results using a conventional ANSYS solution for a ventilation test problem [10]. A comparison of temperature results is shown in FIG. 2 where the solid lines indicate the NTCF-based results and the broken line indicates the ANSYS results. FIG. 2 shows the decline in temperatures of a waste package, a drift wall and the drift air, over a period of 250 years at respective locations of 0, 300 and 600 meters along the ventilation tunnel, with the exception, of the drift air at 0 meters which remains substantially constant. This study shows that the transport processes in the rock were correctly modeled through the application of the inventive NTCF methodology and that correct balancing can be achieved between the NTCF and CFD modules. Three repetitions of the functionalization, as outside iterations, can be employed to accommodate model non-linearities.

The ANSYS solution took approximately 84 effective working hours totaling over 10 days, providing only temperatures and heat flows without moisture being involved [111]. Using MULTIFLUX™ version 2.4 ("MF2.4" hereinafter) for the same problem balanced results for heat and moisture flows are obtained in approximately 15 minutes, giving a three order-of-magnitude decrease in computational time versus the ANSYS-based BSC ventilation model. MF 2.4 applies a second-order polynomial operator equation in the NTCF model in order to represent NUFT over wide temperature and humidity regimes. The functionalization does not need to be repeated, unlike in the linear, first-order model in MF2.0 that may require iterative refinements.

Figure 3:
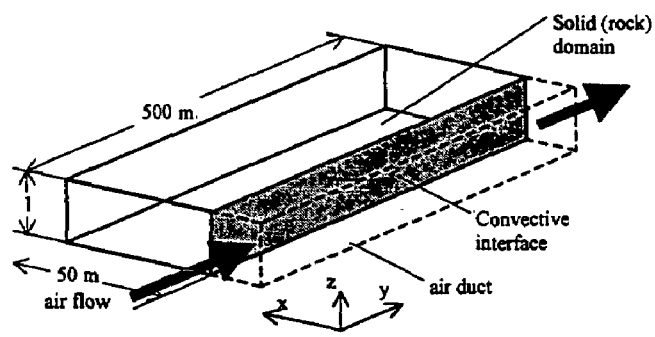
FIG. 3 illustrates application of the NTCF model produced by the method shown in FIG. 1(a) to a simple model geometry.
Figure 4:
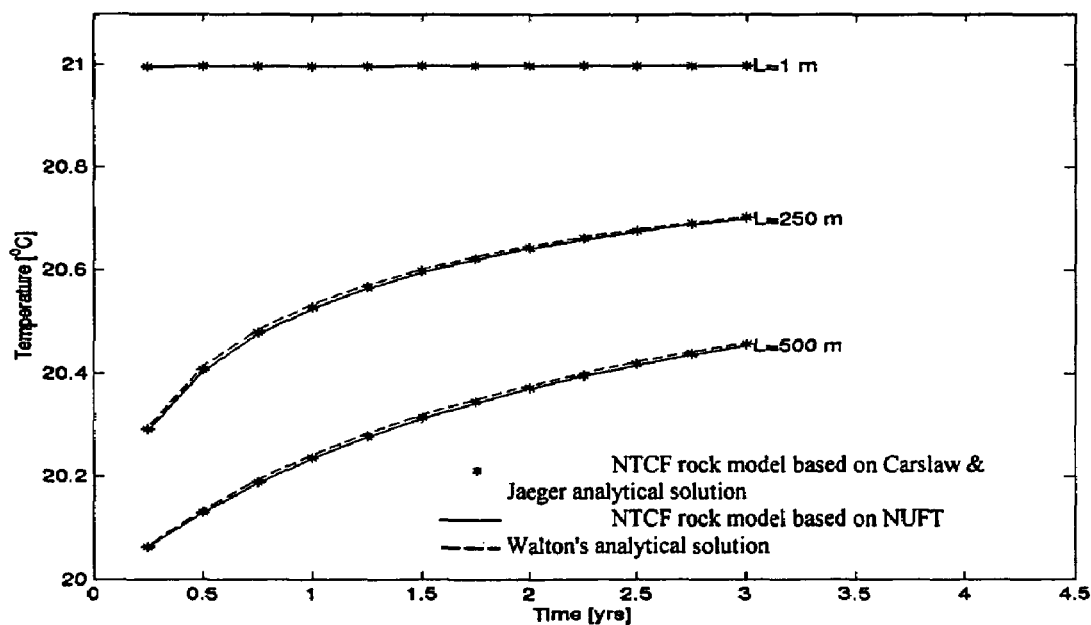
FIG. 4 illustrates air temperature comparisons at 1 m, 250 m and 500 m distance along an airway between results obtainable from an NTCF model produced by the method shown in FIG. 1(a) and two prior art solutions.

MF2.4 can also be applied in a qualification test against a known, analytical solution. The test case model [13], shown in FIG. 3, is a convection-conduction problem. Two rock models are used in MF2.4, one using NUFT with a configuration of minimized moisture effects, and one based on an analytical solution according to Carslaw and Jaeger [14]. The MF2.4 results based on the NTCF procedure are compared to a reference solution obtained by Walton [13], using an analytical-numerical solution to the test problem. The results of the comparison for air temperature variations are shown in FIG. 4. As depicted, the NTCF model-based results agree excellently with the direct analytical-numerical reference results, demonstrating the correctness of the NTCF procedure. In the numerical solution, the domain in the y direction is divided into 500 slices, each 1 m in thickness. The NTCF model is generated for only one slice; and the same matrix model is used along the entire length of 500 m in the y direction. The central value variation representing the temperature history is first taken as a guessed function with time. After the first calculation, the task is repeated using three different NTCF models, which are based on three different temperature histories as central values taken at the y=1, 250, and 500 m locations.

This exercise demonstrates the independence of the NTCF model from the central temperature history, according to a comparison of the air temperature variations for the three different runs: the results overlap almost perfectly, according to the curves already shown in FIG. 4. This agreement shows that one NTCF model represented the rock adequately in this linear case, irrespective of the temperature variation. Since the model is a simple matrix equation, its application 500 times along the length accelerates the calculation by a factor of 145 in the example. For example, a 3.15 hours runtime can be achieved versus 19 days that would be needed to run NUFT 500 times, each with iterations for finding the balance between conduction and convection fluxes.

Mathematical Methodology Useful in Practicing the Invention

The time-variable relationship between the input (driving force) and output (resulting flux) of a transport model can be expressed in the form of a matrix-vector equation. For example, if q=A(t) is the heat flux density at time t on the surface of a solid in which the initial heat flux is zero while the surface is kept at unit temperature from time zero, then the solution of the problem when the surface is kept at temperature T(t) is given by the Duhamel's theorem [15]:

$$q(t) = \int_{\tau=0}^{t} T(\tau) \frac{\partial}{\partial t} A(t-\tau) d\tau + T(t)A(0) \qquad (1)$$

Temporal discretization of t by divisions $t_1, t_2, \ldots t_N$ can be used to eliminate the time variable and replace it with an N-dimensional space in which the q and T vectors of the same dimension are related. Using Eq. (1) for $t=t_i$ and assuming a stepwise approximation of T with $T_j$ constant temperature in each $[t_{j-1}, t_j]$ interval, the $q_i=q(t_i)$ component of q can be written as a summation:

$$q_i = \sum_{j=1}^{i} h_{ij} T_j, \text{ where } h_{ij} = \int_{t_{j-1}}^{t_j} \frac{\partial}{\partial t} A(t_i - \tau) d\tau \qquad (2)$$

In a vector-matrix notation for i=1 ... N, the following equation is obtained:

$$q=[h_{ij}] \cdot T \qquad (3)$$

In Eq. (3), q and T are n-element vectors, and $H=[h_{ij}]$ is an N×N matrix. It may be recognized based on this example, that a linear, time-dependent transport problem can be expressed by a matrix equation in which the input and output variables are vectors of time-variable elements at discrete time points, while the transport process with the geometry and transport properties are represented by a matrix of constant coefficients. The example also shows that no pre-assumption is needed to form the mathematical model regarding the function type of the output. Another recognition is that the same type of matrix equation, but with different numerical value of its elements, may be obtained for different geometry, transport properties, or even the physical meaning or chemical substance of which the transport is being modeled. This generality of equation (3) enables the invention to use algebraic or differential operator equation or set of equations as a general, surrogate model of any NTC, and also to find the numerical coefficients in the operator equation(s) using a number of numerical runs with the NTC in order to fit the inventive NTFC model results to the NTC results.

A one-dimensional, single-variable, linear NTCF model example for non-steady-state heat conduction will now be described in more detail, referring to the five-step inventive modeling method.

Step 1. The operator equation is algebraic and linear, in the form Eq. (3).

Step 2. The NTCF model input is temperature variation with time at a boundary. The time regime is discretized into N time intervals, and a central temperature vector, Ti, i=1 . . . N is selected. A sufficient set of input variations is generated by creating N number of linearly independent column vectors from Tb for N runs. This is accomplished by arranging $T_b$ into a $[T_{ij}]$=TT matrix according to the schematic as follows:

$$TT = \begin{pmatrix} T_1 & T_1 & T_1 & \ldots & T_1 \\ T_1 & T_2 & T_2 & \ldots & T_2 \\ T_1 & T_2 & T_3 & \ldots & T_3 \\ \vdots & \vdots & \vdots & \ddots & \vdots \\ T_1 & T_2 & T_3 & \ldots & T_N \end{pmatrix} \quad (4)$$

Using each column as an input boundary condition, N number of independent runs can be made, in order to provide input data for identification of H with a unique solution.

Step 3. The set of organized, numerical runs with the NTC is comprised of using the N boundary condition histories represented by the N column vectors in the TT matrix. The NTC can be a numerical code, such as ANSYS or NUFT, or a formula-based, analytical-numerical solution to the problem using textbook equation(s). The results of the N runs are N heat flux histories [qhij] that can be arranged into a QH matrix, QH=[qhij].

Step 4 and Step 5. A perfect fit can be made with no fitting error between the NTCF matrix operator model and the NTC results in this simple case. Since QH=hh*TT, hh can be expressed as follows:

$$hh = QH * \text{inv}(TT) \quad (5)$$

The hh matrix will be a lower-triangle matrix, satisfying the expectation that only past and present boundary condition values may affect a present response. It can be shown by direct integration of Eq. (1) that hh obtained from Eq. (5) is identical to the solution based on Eq. (3) for a linear system with a stepwise temperature variation on the boundary, if each element of the [qhij] heat flux is calculated at the end of the corresponding [ti−1 ti] time interval.

An intuitive variation option can been made to the NTCF procedure to use the average of the [qhij] over the [ti−1 ti] time period, Mi[qhij], instead of the value at the end-point. It can be shown mathematically that hh obtained from Eq. (5) based on the averaged Mi [qhij] responses is identical to the solution for a linear system with a piecewise-linear temperature variation on the boundary, provided that the time division is equidistant. However, if the time division varies, the simple averaging becomes inadequate and variable-interval averaging must be used described later in the submission.

The novel NTCF modeling method is quite different from conventional control theory, artificial intelligence and neural network methods. Whereas a system response in the form of an A indicinal admittance, as a general, and complete representation of a linear system is used in Eq. (1), this may be contrasted with the inventive use of a system operator in the form of an hh matrix. This is because non-linearities and cross-effects between multiple boundary variables, are difficult to incorporate in the A, whereas stable hh, hm, etc. matrices with adjusted coefficients to non-linearities around central boundary values can be identified using the NTCF technique.

In some known neural network models numerical coefficients of system responses are identified from experiments that may possibly although, not necessarily, be regarded as numerical. However, these models have the drawback that a large number of training runs is usually needed for identifying a few coefficients. In contrast, the inventive NTCF modeling technique described herein is advantageous in being able to identify large number of coefficients in the matrices of the operator(s) from a relatively small number of numerical runs.

From another perspective, the NTCF procedure may be considered a special, inventive, nonlinear NTC system identification which results in matrix polynomials of operators, or differential operators.

a. Improved Algorithm Description in the Time-Domain

First, an improved, but more complex algorithm is described for processing the H matrix with the use of the one-dimensional, single-variable example. The new algorithm is advantageous to determine the matrices of the NTCF operators for piece-wise and higher order boundary-value variations in the time domain. A complementary form of the convolution integral in Eq. (1) is used to derive the basic equations for the new algorithms based on integrals as follows:

$$q(t_n) = \int_0^{t_n} A(t_n - \tau) T'(\tau) d\tau + A(t_n) T(0) \quad (6)$$

Since T' is the slope, the integral can be directly evaluated in each time interval. After summation, the result is as follows:

$$q(t_n) = m_1 \int_0^{t_1} A(t_n - \tau) d\tau + \\ m_2 \int_{t_1}^{t_2} A(t_n - \tau) d\tau + \ldots + m_n \int_{t_{n-1}}^{t_n} A(t_n - \tau) d\tau \\ = T_1 M[A]_{t_n - t_1}^{t_n} + (T_2 - T_1) M[A]_{t_n - t_2}^{t_n - t_1} + \ldots + \\ (T_n - T_{n-1}) M[A]_0^{t_n - t_{n-1}} \quad \text{where} \quad (7)$$

$$M[A]_{t_n - t_i}^{t_n - t_j} = \int_{t_n - t_i}^{t_n - t_j} A(\lambda) d\lambda \quad (8)$$

According to Eq. (7), the averaging time intervals in the M[A] integral mean values generally do not coincide with the time division intervals, unless the division is equidistant. In a matrix-vector form:

$$\begin{bmatrix} q_1 \\ q_2 \\ \vdots \\ q_N \end{bmatrix} = \begin{bmatrix} M[A]_0^{t_1} & 0 & & 0 \\ M[A]_{t_2-t_1}^{t_2} - M[A]_0^{t_2-t_1} & M[A]_0^{t_2-t_1} & & 0 \\ \vdots & & & \vdots \\ M[A]_{t_n-t_1}^{t_n} - M[A]_{t_n-t_2}^{t_n-t_1} & M[A]_{t_n-t_2}^{t_n-t_1} - M[A]_{t_n-t_3}^{t_n-t_2} & \ldots & M[A]_0^{t_n-t_{n-1}} \end{bmatrix} \begin{bmatrix} T_1 \\ T_2 \\ \vdots \\ T_N \end{bmatrix} = H \begin{bmatrix} T_1 \\ T_2 \\ \vdots \\ T_N \end{bmatrix} \quad (9)$$

The H matrix in Eq. (9) is fundamentally different from that in Eq. (5) in that it represents piece-wise linear connections, instead of steps. The first advantage of the result is that the piece-wise connection between the $T_1 \ldots T_n$ boundary values is generally a better approximation than the step-wise variation for a smooth boundary function. The second advantage is that the NTC input boundary function variation is still a step-wise, namely, a discretized input for generating the required output for the application. In order to evaluate the integral mean values in Eq. (9), the A(t) function has to be numerically determined at fine time sub-divisions in each time interval from the NTC run. Since the constant A(t) function is applicable only to a strictly linear case, generalization is needed for non-linear models. This is accomplished using a series if $A_i(t)$ functions and a generalized input variation matrix according to Eqs. (11) and (12), described later in detail.

Higher-order polynomial connection between base points in the time domain can also be used. The algorithms are derived based on quadratic and higher-order boundary function interpolation polynomials as follows:

$$T(t) = L_0(T_i, T_{i+1}, \ldots) + L_1(T_i, T_{i+1}, \ldots) \cdot t + L_2(T_i, T_{i+1}, \ldots) \cdot t^2 + \quad (10)$$

where $L_0, L_1, L_2, \ldots$ are linear functions of $T_i$, $i = 1 \ldots N$. Substituting Eq. (10) into Eq. (6) and performing partial integration, the non-liner terms will yield interval-dependent constants, and the final result will still be a linear matrix operator in the T domain.

In summary, a new method is shown to apply a step-wise boundary condition application in the NTC runs, and an averaged post-processing evaluation of the responses in order to represent piece-wise linear, or higher-order polynomial boundary variations in the time domain. The averaging schematics are implemented using numerical integrals in the NTCF procedure. The NTCF runtime organizer collects responses at fine time sub-divisions from the NTC, and the post-processor evaluates the NTCF matrices based on Eq. (9).

Figure 8:
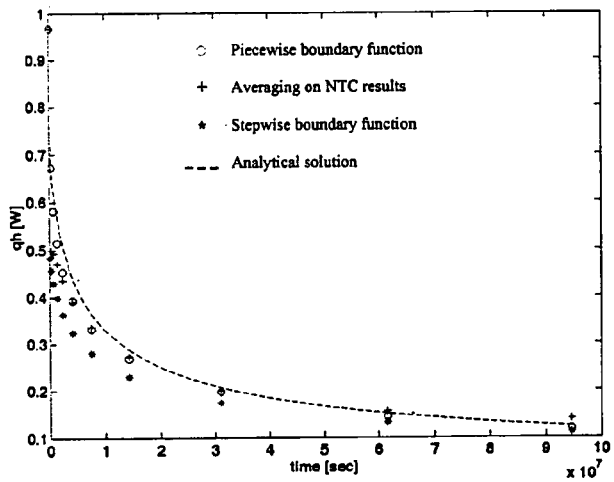
FIG. 8 illustrates input variations (a) and model responses (b) obtainable using three different NTCF post-processing methods.

An example is given for comparing step-wise and piece-wise approximation results for a simple heat conduction used in [13]. The input variations and the responses are shown in FIG. 8. In FIG. 8: the piecewise boundary function is an approximation realized by averaging of NTC results over modified time intervals; the averaging of the NTC results is an initial, simple averaging of NTC results over original time intervals; the stepwise boundary function is an approximation with no averaging of NTC results; and the analytical solution is an analytical solution to desired boundary function variation.

The new, averaging schematic according to Eq. (9) is shown to be superior to other representations involving simple averaging and end-point responses. The test example uses an analytical solution, instead of an NTC. This methodology is considered advantageous for it is efficient and convenient. Emulating an NTC with a fast-running and precise analytical-based numerical solution is advantageous for algorithm testing.

b. Improved Algorithm Description for Linearization Around a Boundary-Value Variation Second, the generalization of $A_i(t)$ with the application of an $A_1(t), A_2(t), \ldots$ series is described for non-linear cases in the boundary variable, e.g., T domain. The step-wise input variation along the columns in Eq. (4) is modified, by generalization, in order to narrow the range of variation in T around the $T^c = [T_1, \ldots, T_N]^T$ central values. With an appropriate selection of the $f_1, \ldots, f_{N-1}$ functions (e.g., constant multiplication factors will be sufficient), the step-wise variations in the columns can be made close to, but linearly independent from, the central values, while keeping the determinant of TT non-zero. Narrowing the regime of T will provide a linearized hh operator defined around $T^c$. The generalized input matrix is as follows:

$$TT = \begin{bmatrix} T_1 & T_1 & T_1 & \ldots & T_1 \\ f_1(T_2) & T_2 & T_2 & \ldots & T_2 \\ f_1(T_3) & f_2(T_3) & T_3 & \ldots & T_3 \\ \vdots & \vdots & \vdots & \ddots & \vdots \\ f_1(T_N) & f_2(T_N) & f_3(T_N) & \ldots & T_N \end{bmatrix} \quad (11)$$

The NTCF runtime organizer provides a set of $qh(\tau_i)$ results matrices obtained as responses from the NTC for the TT boundary conditions according to the columns in Eq. (11). The $\Sigma_i$ parameters are varied in the [0, 1] interval (excluding zero), where $\tau_i = 1$ defines qh responses at time-division end-points, while $\tau_i < 1$ defines response at time sub-division i, a mid-point in each time interval.

The $hh(\tau_i)$ matrix (an intermediate result) is evaluated for each i time sub-division from Eq. (4), that is, $hh(\tau_i) = qh(\tau_i) * inv(TT)$. The $A_1(\tau_i)$ function is determined based on the definition of the indicinal admittance, being a response to a unit boundary value change. Multiplying the $hh(\tau_i)$ matrix with a unit step vector at $t_1$, the result will be a vector $[A_1(t_1 - \tau_i * t_1), A_1(t_2 - \tau_i *(t_2 - t_1)), \square, A_1(t_N - \tau_i *(t_N - t_{N-1}))]^T$, constituting $A_1(\tau_i)$. The union of $A_1(\tau_i)$ for $i = 1 \square M$ is taken to form a representation of $A_1(t)$ for the entire time regime given at fine time divisions. Finally, the process is repeated with unit step vectors at $t_2, \square, t_N$, for obtaining $A_2(t), \square, A_N(t)$, the functions needed for the averaging schematic in order to obtain piece-wise linear (or higher-order) connection in the time domain. Instead of using Eq. (9), the final hh matrix for the non-linear model, processed around the $T^c$ central vector in this generalized case, is evaluated as follows:

$$hh = \begin{bmatrix} M[A_1]_0^{t_1} & 0 & & 0 \\ M[A_1]_{t_2-t_1}^{t_2} - M[A_1]_0^{t_2-t_1} & M[A_2]_0^{t_2-t_1} & & 0 \\ \vdots & & & \vdots \\ M[A_1]_{t_n-t_1}^{t_n} - M[A_1]_{t_n-t_2}^{t_n-t_1} & M[A_2]_{t_n-t_2}^{t_n-t_1} - M[A_2]_{t_n-t_3}^{t_n-t_2} & \cdots & M[A_N]_0^{t_n-t_{n-1}} \end{bmatrix} \quad (12)$$

The new NTCF method uses NTC responses at fine time sub-divisions, allowing for the determination of $A_1(t), \ldots, A_N(t)$ generator functions, based on a series of $hh(\tau_i)$ matrices, identified in a narrow vicinity of a $T^C$ central boundary variation with time. The $A_i(t)$ generator functions, different in each column in Eq. (12), are used to generate the final hh operator for this case.

Figure 5:
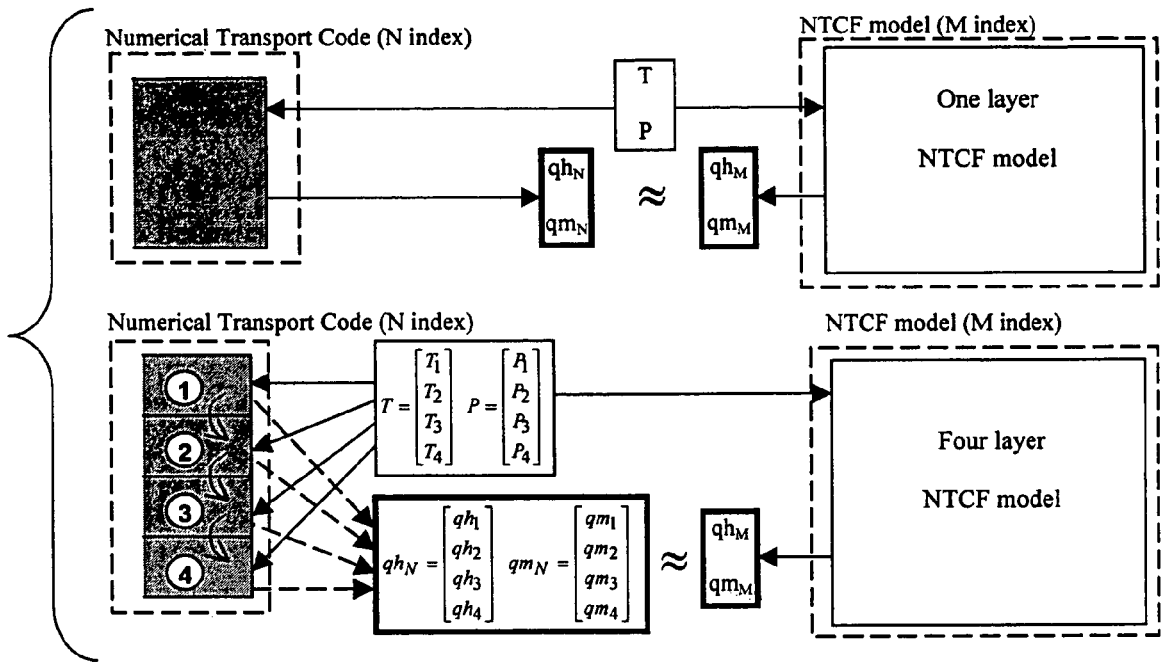
FIG. 5 illustrates application examples of a NTC model (N index) and a corresponding NTCF model (M index) produced by the method shown in FIG. 1(a), for (a) a one-layer and (b) a four-layer model.
Figure 6:
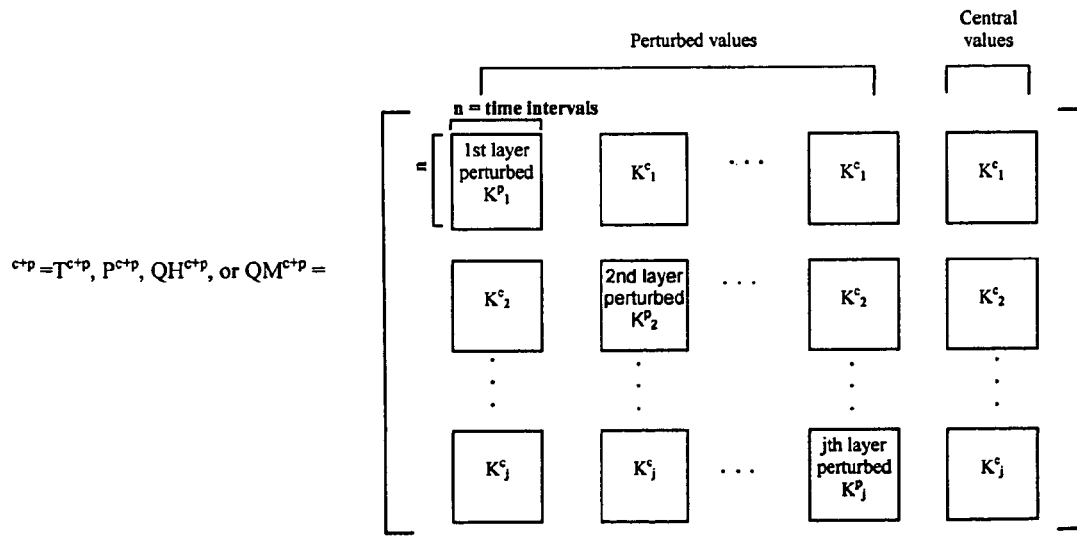
FIG. 6 illustrates one possible format of TT, PP, QH, or QM, super-matrices for a j-layer model useful in practicing the embodiment of invention shown in FIG. 1(a)
Figure 7:
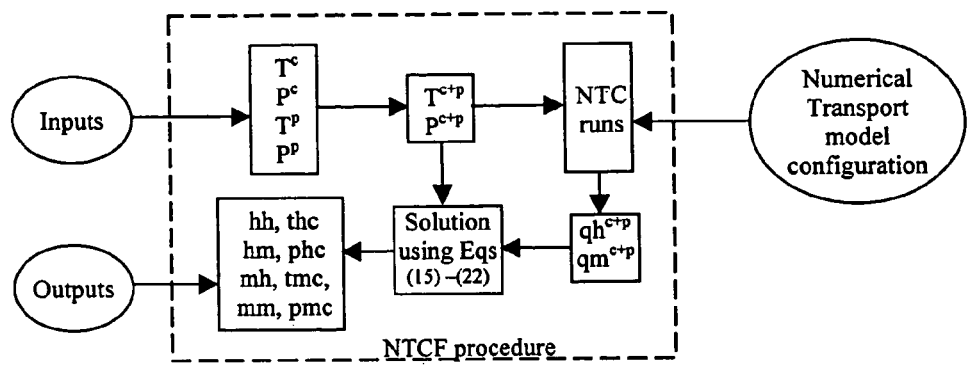
FIG. 7 illustrates one embodiment of preparatory runs and post-processing functions that can be employed in an NTCF model produced by the method shown in FIG. 1(a)

Similar treatment can be used for more than one variable and for domains of more than one layer, generating central-value and perturbed blocks according to FIGS. 5 and 6. The NTCF linearized model around $T^C$ can be determined using the central and perturbed boundary functions for the narrowed interval.

c. NTCF Model-Building Method Description.

Steps 1 and 2 of the NTCF model-building method are explained in more general terms and detail. The type of mathematical model used in the NTCF model depends on the transport problem. The hh matrix in the simple model example represents an operator, completely independent from the values used in the boundary conditions in a linear system. In general, the constant coefficients in the matrix or matrices are linearized response admittances around the central history of the driving-force boundary conditions. Re-functionalization around changing central values in a coupled boundary-value problem is needed in a non-linear system. Non-linearities can be treated with either point-to-point linearization, or with higher-order matrix polynomial terms in the matrix equation. The comparison results in FIG. 2 for the MULTIFLUX™ full case involved nonlinearities due to hydrothermal and variable-saturation effects. Further development of non-linear functionalization and verification are described in the submission.

The matrix solution is not reduced to parabolic problems, typically governed by the Laplace or Fourier Equations for conduction-diffusion. A matrix operator model was built for simulating pressure and velocity transients in pipeline flow governed by hyperbolic partial differential equations [16]. Cross-effects call for more than one coefficient matrix, such as in Onsager's transport law [17]. Each NTC in a multi-variable, boundary-coupled NTCF model can be represented with corresponding matrix equations with constant-coefficient matrices, valid at least around the central histories. Therefore, the coupled solution of a numerical model having S independent NTCs can be reduced to the solution of a set of S matrix equations. It is especially advantageous to process the NTCF model for the entire time interval as a one-time code pre-processing (on a workstation, supercomputer, or parallel computers), and to use the matrix equations for determining the particular solution to the coupled problem on a slower local workstation or PC.

A coupled heat and mass transport NTCF example with two variable functions involves two matrix equations between the input and output vectors. The time-dependent heat and moisture flux vectors, qh and qm, may be expressed in operator equation forms as responses to temperature T and partial vapor pressure P variations at the boundary of the rock domain[1, 2]:

$$qh = hh \cdot [T-thc] + hm \cdot [P-phc] \quad (13)$$

$$qm = mh \cdot [T-tmc] + mm \cdot [P-pmc] \quad (14)$$

In Eqs. (13) and (14), the thc, phc, tmc, and pmc are constant intercept vectors for temperature and vapor pressure-driven heat and moisture fluxes, and are all subject to numerical identification. The physical meaning of these constants in a strictly linear model is that they represent initial conditions. The hh, hm, mh, and mm are square matrices, representing the time-dependent heat and moisture transport admittances for heat driven by temperature and pressure, and moisture driven by temperature and pressure, respectively. During model identification, $TT^c$ and $PP^c$ input boundary condition matrices are used, based on central values, using the structure in Eq. (4), in order to obtain $QQh^c$ and $QQm^c$ central responses. Another set, $TT^p$ and $PP^p$, called perturbed input boundary conditions, are also needed to obtain additional responses for unique identification of the four admittance matrices and four initial condition constants as intercepts of the linearized model fitted to numerical data.

A domain with a single boundary is depicted in FIG. 5.a. For this case, a one-layer NTCF model is identified wherein according to equations 13 and 14:

qh=hh(T−tc)+hm(P−pc)

qm=mh(T−tc)+mm(P−pc)

where (T, P, qh, qm)$\in R^n$ vectors n is number of time intervals $R^n$ is n dimensional space of real numbers.

Steps 3 through 5 in more general terms are explained as follows. It is not possible to achieve perfect fit between the NTC and the NTCF model results if a higher number of input data is available than the number of unknown elements in the matrices of the operators, and the problem is over-determined. This, otherwise advantageous, situation would be detrimental to model identification. The inventive method applies five rules (a) through (e) as conditions for constants determination during NTCF model fit to NTC data. Using the rules, the redundancy due to over-determination increases the stability and predictive power of the NTCF model.

Conditions (a) through (e) are used as follows for the determination of the hh, hm, mh and mm matrices as well as the thc, phc, tmc, and pmc constant vectors in Eqs. (13) and (14) in the NTCF post-processor:

(a)—(perfect fit rule) perfect agreement must be obtained between the matrix equation (M subscript) and NTC (N subscript) results for the heat and moisture flux matrices for the central values © superscript) for any initial condition intercept vectors:

$$[QQh]_M^C = [QQh]_N^C \tag{15}$$

$$RMS_m = \left(\frac{1}{r \times s}\sum_{r \times s}([qm]_M^{P+C} - [qm]_N^{P+C})^2\right)^{1/2} \tag{16}$$

(b)—(time-cone rule) all elements above the main diagonal of the hh, hm, mh and mm matrices must be zero; this assures that only past and present boundary condition values, and not future ones, may affect present responses. Triangularization is built in as a condition, constraining optimizations in conditions (c) and (d).

(c)—(least-square-fit rule) least square fit (LSQ) agreement must be obtained between the matrix equation and NTC results for the heat and moisture flux matrices for the central and perturbed values (P superscript) taken together:

$$RMS_h = \left(\frac{1}{r \times s}\sum_{r \times s}([qh]_M^{P+C} - [qh]_N^{P+C})^2\right)^{1/2} \tag{17}$$

$$RMS_m = \left(\frac{1}{r \times s}\sum_{r \times s}([qm]_M^{P+C} - [qm]_N^{P+C})^2\right)^{1/2} \tag{18}$$

$RMS_h$=function(hh, hm)→minimized with constraint for conditions (c) and (d) (19)

$RMS_m$=function(mh, mm)→minimized with constraint for conditions (c) and (d) (20)

where r and s are the number of rows and columns in the qh and qm matrices, and the square and square root operations are applied to the matrices element-by-element.

(d)—(condition rule) minimized matrix condition numbers must be achieved for the hh and hm matrices in the determination of the initial condition intercept vectors thc, phc, tmc, and pmc:

cond(hh)=function (thc, phc)→minimized with constraint for conditions (c) and (d) (21)

cond(hm)=function (tmc, pmc)→minimized with constraint for conditions (c) and (d) (22)

Alternatively, the RMS error, instead of the matrix conditions, may be used for the determination of the best initial condition intercept vectors thc, phc, tmc, and pmc.

(e)—(stability rule) an additional, stability condition is applied to correct the main diagonal of the hh or mh matrices if a negative admittance value is detected. Such error may be caused by numerical uncertainties and/or rounding errors in the NTC results. The error correction is based on the assumption that a small deviation can be made in the input data set to compensate for the NTC error before feeding the data to the post-processor. The amount of compensation needed for avoiding stability degradation of the hh or mh matrices is automatically determined. The input data patch-up compensation is made for improving the quality of the functional for stability, if this feature is selected. The stability rule does not compromise the perfect-fit and time-cone rules, but constraints the LSQ-rule.

Equations (15)-(22) are iteratively applied when solving for the unknown hh, hm, mh, mm matrices and thc, phc, tmc, and pmc vectors.

Functionalized, operator models can also be built for interconnected domains with cross-effects between them, such as occurring in three-dimensional problems. Four interconnected domains, called layers, are shown in FIG. 5.b as an example. In this four-layer model, equations 13 and 14 can still be applied with the appropriate size of vectors and matrices:

qh=hh(T−tc)+hm(P−pc)
qm=mh(T−tc)+mm(P−pc)
where (T, P, qh, qm)∈$R^{n \times j}$ vectors
j: number of layers (e.g., j=4)
n: number of time intervals; the size of the square matrices is j×n by j×n.

The Jacobian operator, i.e., the sensitivity matrix, is used to model response fluxes between the interacting domains. Perturbations are used in each time interval by altering the central boundary values individually, each layer at a time, in order to identify the Jacobian components in the operator numerically. Assuming j number of sub-domains with different boundary condition histories but iso-values within the sub-domains boundaries, the J Jacobian is a j×j matrix for each time interval. The temporal and spatial model-elements are combined with j number of central-value matrices $TT^c$ and $PP^c$, and an additional j×j combinations of one perturbed and j−1 unperturbed boundary condition matrices $TT^p$ and $PP^p$. From the NTC runs, QH and QM will be filled with j unperturbed, and j×j blocks of perturbed responses. The evaluation procedure involves a lengthy algebraic solution. An example of four-layer model formation for a simple, end-point processing and a single-variable is given in Appendix 1.

Using super-matrices with N by N blocks of matrices, the format of the IT, PP, QH, or QM super-matrices are identical, shown in FIG. 6, where K denotes any of the component matrices; an example of $k_1^*$ for a central input temperature vector composed of $T_1 \ldots T_N$ components is already given in Eq. (4) or Eq. (11) for a non-linear case.

Using the QH, QM, 7T, or PP matrices, the NTCF procedure evaluates main- and cross-effect transfer matrices hh, and hm for heat, as well as mh, and mm for moisture, each (j*N)×(j*N) in size using conditions similar to conditions (a)-(e) discussed for a one-layer model. The corresponding matrix equations for heat and moisture formally agree with those in Eqs. (14) and (15) but using super-vectors of time histories from layer 1 to layer j in one column, e.g., $[T_1(t_1), T_1(t_2), \ldots, T_1(t_N), T_2(t_1), T_2(t_2), \ldots, T_2(t_N), \ldots, T_j(t_1), T_j(t_2), \ldots, T_j(t_N)]^T$, shown in FIG. 5.b. A seven-layer, three-dimensional NTCF model for two variables can be used. A summary of the preparatory runs and post-processing functions of the NTCF method is given in FIG. 7 for two variables.

Figure 9:
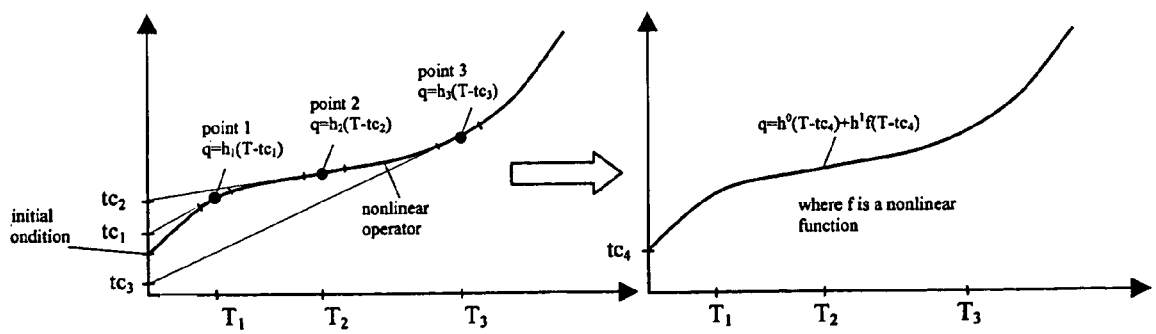
FIG. 9 illustrates a geometrical interpretation of non-linear processing for an example of three base points useful in the NTCF model produced by the method shown in FIG. 1(a)

The linear matrix equation represents a first-order polynomial approximation. Higher-order polynomial approximations can also be constructed to represent a non-linear algebraic operator model. A non-linear operator model be defined and identified based on a series of $T^C$ vectors, considered as N-dimensional points, and the corresponding, linearized matrix models identified for the $T^C$ vectors. The simplified, geometrical interpretation of an example with three points is shown in FIG. 9. First, three linearized models are determined with the results of $h_1, h_2, h_3, tc_1, tc_2, tc_3$. Second, a non-linear interpolation operator equation with linear operators $h^0$, $h^1$ and constant vector $tc_4$ is determined according to Eq. (23) which relates inputs and outputs:

$$h_1, h_2, h_3, tc_1, tc_2, tc_3, \rightarrow \tag{23}$$

$$\begin{cases} h_1(T_1 - tc_1) = h^0(T_1 - tc_4) + h^1 f(T_1 - tc_4) \\ h_2(T_2 - tc_2) = h^0(T_2 - tc_4) + h^1 f(T_1 - tc_4) \\ h_3(T_3 - tc_3) = h^0(T_3 - tc_4) + h^1 f(T_1 - tc_4) \end{cases} \rightarrow h^0, h^1, tc_4$$

The f function can be a power function with even a fractional power index, applied to each element of the matrices. The user may experiment with various power indices as well as exponential and logarithm function for achieving well-conditioned, non-linear operator equations. The final, non-linear operator equation is expressed with $h^0$, $h^1$, that are still linear operators.

d. Description of Differential NTCF Models

Transport processes with strong non-linearity may require the application of non-linear, differential operator model. The method is described for a one-dimensional problem with a single variable for brevity. Differentiation of Eq. (3) gives:

$$dq = [h_{ij}] \cdot dT \tag{24}$$

It is convenient to assume that non-linearity results in a modified, non-constant matrix in the equation as follows:

$$dq = [a_{ij} + b_{ij} \cdot \langle T_j \rangle] \cdot dT \tag{25}$$

In Eq. (25), the $[a_{ij}]$ and $[b_{ij}]$ are constant-coefficient matrices while $\langle T_j \rangle$ is a diagonal matrix composed of the $T_c$ central values of the input boundary condition. The non-linear NTCF model can be identified with the general NTCF method. First, a $T_c$ central-value boundary variation and two different $dT_c$ differential perturbations are defined. Second, the TT and the TT+dTT matrices are constructed for two generalized input matrices analogously to Eq. (11) with both perturbations. Third, the output q and q+dq matrices are determined from the NTC runs for the input variables for both perturbations. Fourth, the two dq output results for both perturbations are calculated from the q and q+dq matrices by subtraction.

The unknown elements of the $[a_{ij}]$ and $[b_{ij}]$ matrices in Eq. (25) are determined from set of equations is as follows:

$$dq_1 = [a_{ij} + b_{ij} \cdot \langle T_j \rangle] \cdot dT_1 \tag{26}$$

$$dq_2 = [a_{ij} + b_{ij} \cdot \langle T_j \rangle] \cdot dT_2 \tag{27}$$

A non-linear function of the $\langle T_j \rangle$ diagonal matrix, $f(\langle T_j \rangle)$, can also be used for increasing the generality of the model:

$$dq = [a_{ij} + b_{ij} \cdot f(\langle T_j \rangle)] \cdot dt \tag{28}$$

A polynomial series of functions of $\langle T_j \rangle$ with more than two constant-coefficient matrices may also be used:

$$dq = [a_{ij} + b_{ij} \cdot \langle T_j \rangle^m + c_{ij} \cdot \langle T_j \rangle^n + \ldots] \cdot dT \tag{29}$$

In Eq. (29), the m, n, or other power indices may be any number, including fractional values. The value of m=1 and n=0 reduces Eq. (29) into Eq. (25). The number of independent perturbations has to be increased in order to identify uniquely the unknown coefficients in the matrices. If more numerical results are available than necessary for unique identification, the problem becomes over-determined, and the solution described earlier with the five fitting rules will be applied.

The non-linear differential NTCF model is a matrix differential equation in the time domain:

$$\frac{dq}{dt} = [a_{ij} + b_{ij} \cdot \langle T_j \rangle^m + c_{ij} \cdot \langle T_j \rangle^n + \ldots] \cdot \frac{dT}{dt} \tag{30}$$

The application of the NTCF model involving differential operator equations requires numerical differentiation for evaluating dT/dt, and integration, for evaluating q(t) from dq/dt obtained from Eq. (30). The free constant vector in the integral evaluation (at dT=0) is represented by the result for the central values in the form of another operator equation:

$$q_c = [h_{ij}] \cdot T_c \tag{31}$$

The other elements of the solution apply standard mathematical procedures and therefore do not require further explanation; the solution techniques of multi-variable differential equation sets or matrix differential equations can be used without modification.

e. Description of Partitioned NTCF Models

Partitioned functionalization models can be obtained by approximating the responses of an NTC with a linear, (or linearized or nonlinear) heat, mass or momentum transport network solutions or solutions, whereas the network's transport elements or some of the elements are identified numerically by matching the numerical solution of the NTC with the solution of the transport network.

An example of a transport network is a heat flow resistance network to simulate/calculate heat conduction. Heat convection or heat radiation problems are also often calculated in the literature using heat flow network solutions. The elements of such a heat flow network are connections between network nodes, representing passive resistances (the reciprocal of admittances) across which heat flows are driven by temperature differences. In case of a continuum, spatial discretization is used to generate lumped nodes while the transport connections (with resistances) between nodes are determined based on the constitutive equations of the relevant transport processes in the analogous form of Ohm's law known for electrical networks.

The computational solution of the network model includes (1) generating the network elements between nodes and (2) solving the network based on Kirchhoff's Laws known for electrical networks. The network model, if applied to a problem of heat, mass, and momentum transport, represents a lumped-parameter CFD. MULTIFLUX™ has two lumped-parameter CFD's, one for heat and one for moisture transport calculations in the airway or tunnel with a heat source distribution and moist wall. The steady-state solutions of the CFD for heat flow is expressed in the form of a matrix equation:

For heat:

$$T = \mathrm{inv}(irh)(qh + \langle irg \rangle Tg) \tag{32}$$

where:
T=the (unknown) node temperature vector
irh=the admittance matrix of the heat flow network representing heat conduction, convection radiation and capacitive airflow; it is the summation of the component matrices including the irt and ird matrices with special di-pole and tri-pole elements, described later in detail
qh=the heat source (or sink) vector
irg=the admittance diagonal matrix representing network connection elements to the known boundary condition
Tg=the boundary condition, that is, a given generator temperature The steady-state solution of the CFD for moisture flow is expressed in the form of a similar matrix equation:

$$P = \mathrm{inv}(irm)(qm + \langle irmg \rangle Pg) \tag{33}$$

where:
P=the (unknown) node partial vapor pressure vector
irm=the admittance matrix of the moisture/vapor flow network representing diffusion, convection, and capacitive airflow; it is the summation of the component matrices including the irt and ird matrices with special di-pole and tri-pole elements, described later in detail
qm=the moisture source (or sink) vector
irmg=the admittance diagonal matrix representing network connection elements to the known boundary condition
Pg=the boundary condition, that is, a given partial vapor pressure vector The solution to an unsteady-state problem requires the application of capacitances at the nodes of the network. A numerical, finite-difference solution, applying i.e., the solution technique of matrix differential equations, can be obtained for such a problem using published results in the technical literature.

A similar matrix-vector equation can be written for the air flow pressure and air mass flow rates but not given here for brevity. The elements of the admittance matrices are iteratively re-calculated in the numerical solution since they are dependent upon T and P (and the air mass flow rates related to velocities, affecting the transport connection elements in the equations). Therefore, the solution of a non linear problem can be provided with the repeated use of the linear matrix equations.

MULTIFLUX™ couples the functionalized solution of the PMC and the CFD for heat and CFD for moisture using a direct iteration and successive Approximation (DISAC) coupler. During iterations, the admittance matrices are re-calculated. It is important to point out that the lumped-parameter CFD solutions can also be functionalized using the technique described before. This method was tried out but was found to be time-intensive. Therefore, MULTIFLUX™ re-calculates the T and P from the direct matrix equations, that is, it generates the solutions of the lumped-parameter network models during coupling iterations and successive approximation. This method provides fast convergence to the correct solution since the nonlinear network elements are re-calculated.

This efficient lumped-parameter network solution can be used for partitioned functionalization. Non-steady-state solutions can similarly be applied to partitioned functionalization of differential NTCF operator models.

MULTIFLUX™ applies two unique network elements, specifically, (1) a di-pole active network-element to model capacitive convective heat flow (called controlled convection, due to e.g., moving air), and (2) a tri-pole active network-element to support partitioned functionalization of another CFD numerical code for heat convection modeling. This tri-pole element is used e.g., when the lumped-parameter CFD solution must be enhanced by a differential-parameter CFD solution, and the solution need to be imported into the lumped-parameter network.

The inventive application of the di-pole and tri-pole active network elements in MULTIFLUX™ allows for applying these elements in the closed-form matrix equation solution for T and P given in equations (32) and (33).

The preferred application embodiment of partitioned functionalization applies di-pole and tri-pole elements.

Figure 14:
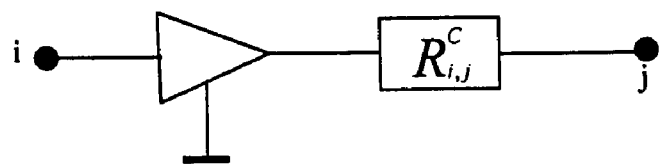
FIG. 14 illustrates a novel application of a di-pole controlled element between nodes i and j useful in the practice of the invention.

A di-pole controlled element between nodes i and j is shown in FIG. 14.

The corresponding terms in the ird admittance matrix due to this element are:

$$j\left[-\frac{1}{R_{i,j}^C} \quad +\frac{1}{R_{i,j}^C}\right] = ird \quad (34)$$

A typical relationship for heat capacitance resistance in airflow is:

$$R_{i,j}^C = \frac{1}{c_p \cdot \phi_{i,j}} \quad (35)$$

where $\phi_{i,j}$ is the air mass flow rate flowing from node I to node j, and $c_p$ is the specific heat.

Di-pole elements are automatically calculated in MULTIFLUX™ by calling the "h_400" sub-function. A user's interface is provided to select and program the generation of these elements dynamically during MULTIFLUX™ iterations.

Similarly, di-pole controlled elements for moisture transport are generated by the "m_400" sub-function. The generation of the ird matrices (referenced as irh4 and irm4 for heat and moisture) in MULTIFLUX™ is provided by the "admit_h" for the heat, and by "admit_m" for moisture transport CFD modules. The ird matrices are added to other admittance matrices for generating a full transport model automatically. The calling of the sub-functions are optimized by bundling the generation of matrices with the same type of elements. Out of the 7 different types in MULTIFLUX™, the di-pole and tri-pole elements are considered new in the admittance matrix equations.

Figure 15:
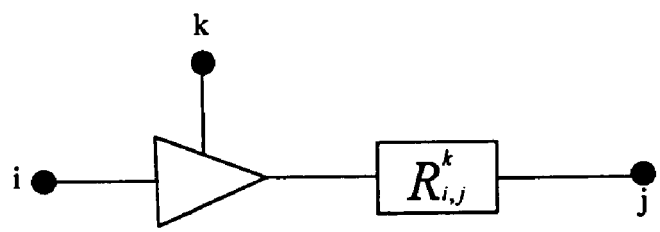
FIG. 15 illustrates a novel application of a tri-pole controlled element between nodes i, j, and k useful in the practice of the invention.

A tri-pole controlled element between nodes i, j, and k is shown in FIG. 15 between nodes i, j, and k. The corresponding terms in the irt admittance matrix due to this element are:

$$\begin{array}{c} \quad\quad i \quad\quad j \quad\quad k \\ j\left[-\frac{1}{R_{i,j}^k} \quad +\frac{1}{R_{i,j}^k} \quad \right] \\ k\left[\frac{1}{R_{i,j}^k} \quad -\frac{1}{R_{i,j}^k} \quad \right] \end{array} = irt \quad (36)$$

With the use of tri-pole elements, a differential-parameter CFD solution of heat (and/or moisture) convection can be imported into the lumped-parameter network solution using partitioned functionalization. The advantage of applying tri-pole elements is that it eliminates the occurance of negative admittances (or resistances) that may otherwise be obtained form the NTCF procedure. Negative numerical coefficients in the main diagonal of the NTCF matrices may de-stabilize iterations in model applications. In this preferred application, the connection between nodes i and j represents convective heat transport in the boundary layer from node i to node j (driven by their temperature difference), while the connection to node k facilitates the transport of the heat flow from node j to node k, which represents the bulk air flow.

The relationship for the tri-pole resistance in this application is expressed by the physical heat transport coefficient, also known as the adiabatic heat transport coefficient, $hp_j$:

$$R_{i,j}^k = \frac{1}{hp_j \cdot A_j} \quad (37)$$

where $hp_j$ is the transport coefficient and $A_j$ is the convective surface at node j. The definition of hp at node j is given as the derivative of the heat flux $qh_j$ with respect to the surface temperature $T_j$:

$$h_p = \frac{d(qh_j)}{d(T_j)} \quad (38)$$

The complete model of convective heat transport between nodes i, j, and k has another element, a conventional heat convection resistance between nodes j and k. It is defined by the following formula:

$$R_{j,k} = \frac{(T_j - T_k)}{qh_j - \frac{(T_j - T_i)}{R_{i,j}^k}} \quad (39)$$

The relationship between $R_{j,k}$ and a modified heat transport coefficient, $h_j$ is as follows:

$$h_j = \frac{A_j}{R_{j,k}} \quad (40)$$

MULTIFLUX™ uses the $h_j$ and $hp_j$ coefficients in the lumped-parameter CFD modules to model heat convection over a surface of variable temperature. Analogously, $hm_j$ and hpm$_j$ coefficients are used for moisture transport over surfaces at variable vapor pressure. The h$_j$ and hp$_j$ coefficients can be determined from the numerical results of an NTC (e.g., FLUENT), using equations (37)-(40) developed for heat. The inputs for this partitioned functionalization are the surface temperature distribution, T$_i$ (and T$_j$), the bulk (mixed) air temperature distribution T$_f$, the surface heat flux distribution qh$_j$, and it's derivative, expressed in Equation (38). The outputs of the partitioned functionalization are the h$_j$ and hp$_j$ coefficients, substituted into the admittance coefficient matrices. With the coefficients of h$_j$ and hp$_j$ included inside a network matrix equation, the complete, functionalized NTCF model is partitioned into two parts: the NTC-based coefficients, and an analytical-based matrix model. Similar treatment can be made for non-steady-state cases.

Description of NTCF Software Function Examples

An advantageous implementation of the NTCF procedure is described with the help of an example regarding an application in the hydrothermal-ventilation model MULTIFLUX™, developed as part of the invention. The NTC is NUFT in the example. Two software functions, called nuftfun1, explained with flow chart in FIG. 10, and nuftfun2, explained with flow chart in FIG. 11, are examples of the data generator software function used for the generation of NTC data. These software functions are documented in a controlled document. Three other software functions, called n2m2, nuft2mp, and nuft2mpc are examples of the post-processor software functions used for the determination of the matrix representation of the functional F by way of determining numerically the elements of the coefficient matrixes based on the NTC run data using the five NTCF model fitting rules.

A low-level interface is provided to prepare input data for the NTCF applications. The user input data format in the fun_in.dat data file for running the nuftfun1.m and nuftfun2.m is as follows:

| Field | Format | Description |
| --- | --- | --- |
| 1 | Integer | Two Boolean flags, one for temperature and one for pressure perturbation, separated by space. |
| 2 | Integer | Number of time intervals (N) and number of ticks (nticks). |
| 3 | Integer | Number of layers (j). Layers can be subdrifts, sections or representative segments. Layers are nodes that are at the same temperature and vapor pressure. |
| 4 | Float | Time interval vector values. |
| 5 | Float | Vector of barometer pressure with each element related to each time interval. |
| 6 | Float | Central wall temperatures. Central values define an expected temperature history for each layer. The number of elements is N _j. The columns are separated by space and the rows are separated by new line. The functionalization takes place around the central history, defined first by the user, and refined iteratively by the software. |
| 7 | Float | Temperature perturbation vector related to time intervals. Perturbations are deviations from the central values. |
| 8 | Float | Central wall vapor pressures. The number of elements is N _j. The columns are separated by space and the rows are separated by new line. |
| 9 | Float | Vapor pressure perturbation vector related to time intervals. |

The output format of the nuftfun1 and nuftfun2 functions consists of 4 super matrices; namely q$_h$ for heat flux, q$_m$ for moisture flux and their corresponding temperature matrix T and vapor pressure matrix P. The format of the matrices follow the schematic given in FIG. 6.

The T and P matrices are composed of the input data according to the symmetrical structure given in Equation (1); while the q$_h$ and q$_m$ matrices are unprocessed results of organized NUFT runs.

The input of the NTCF post-processor function includes the output data of the nuftfun1 or nuftfun2 functions in addition to process control parameters. The output format of the NTCF post-processor function is in the form of the hh, hm, mh, mm square matrices with dimensions N_j and the thc, tmc, phc, and pmc vectors each of length N_j.

Figure 10:
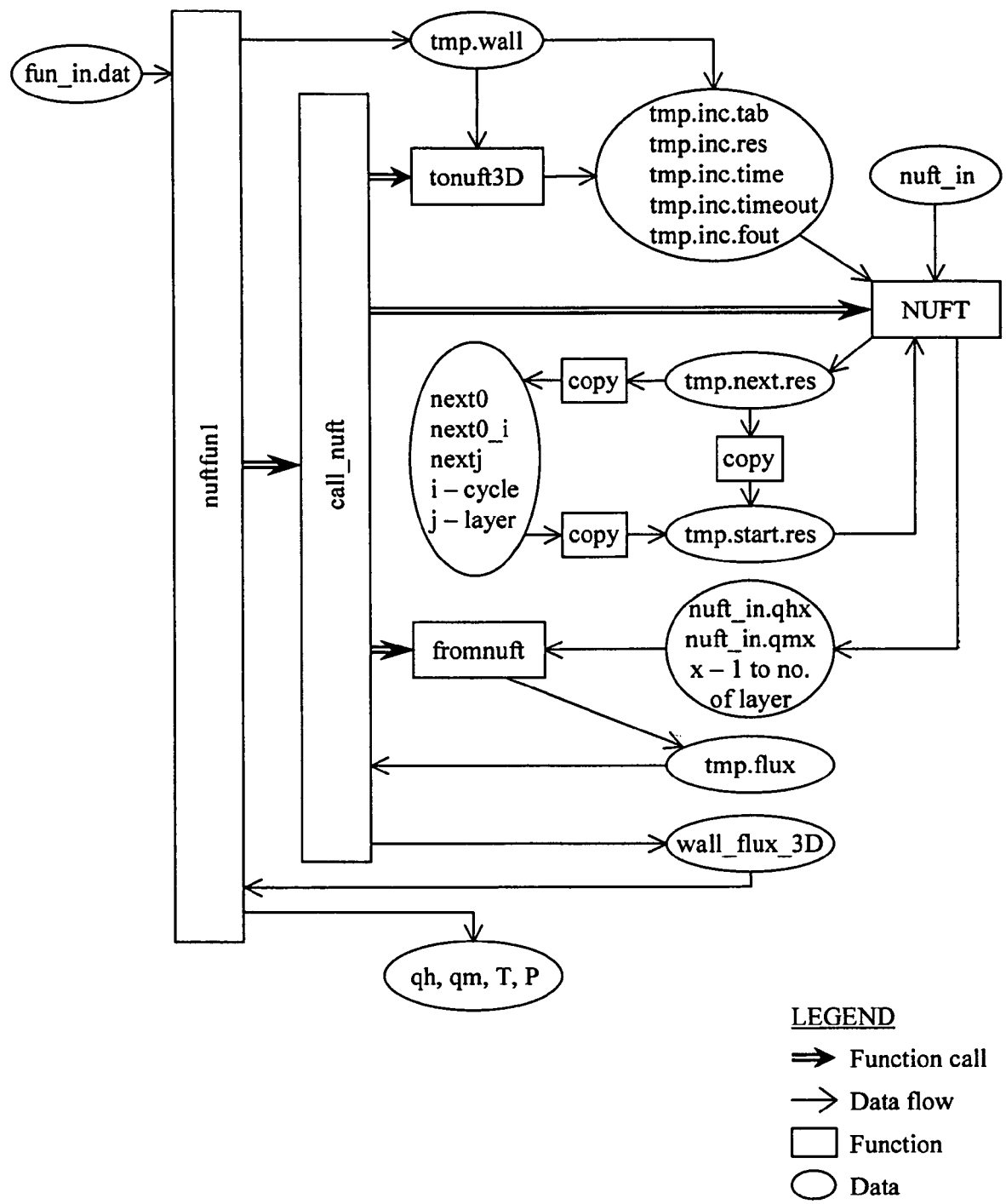
FIG. 10 illustrates a logic and data flow chart of a Nuftfun1 software function useful the modeling method illustrated in FIG. 1(a)
Figure 11:
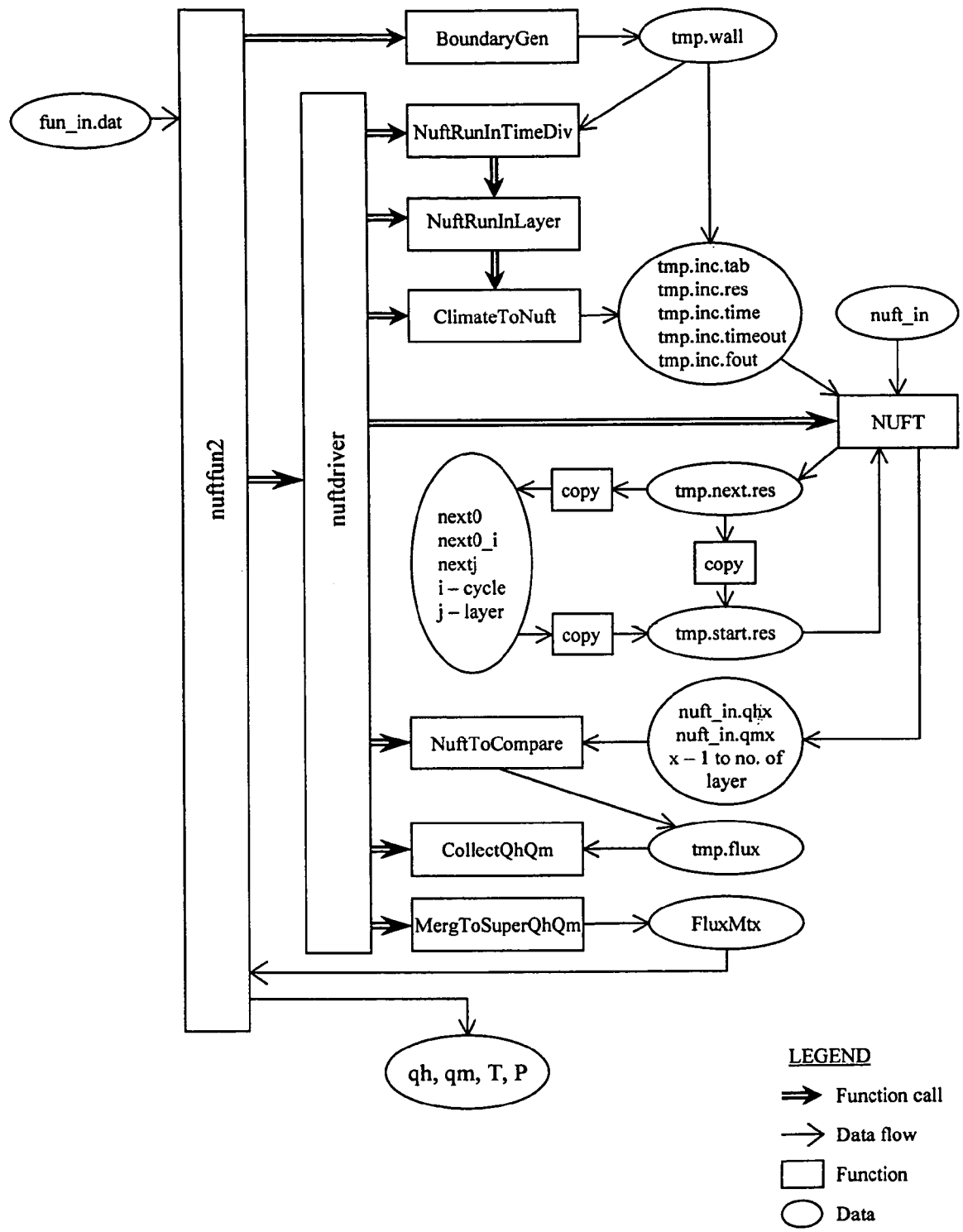
FIG. 11 illustrates a logic and data flow chart of a Nuftfun2 software function useful the modeling method illustrated in FIG. 1(a)
Figure 12:
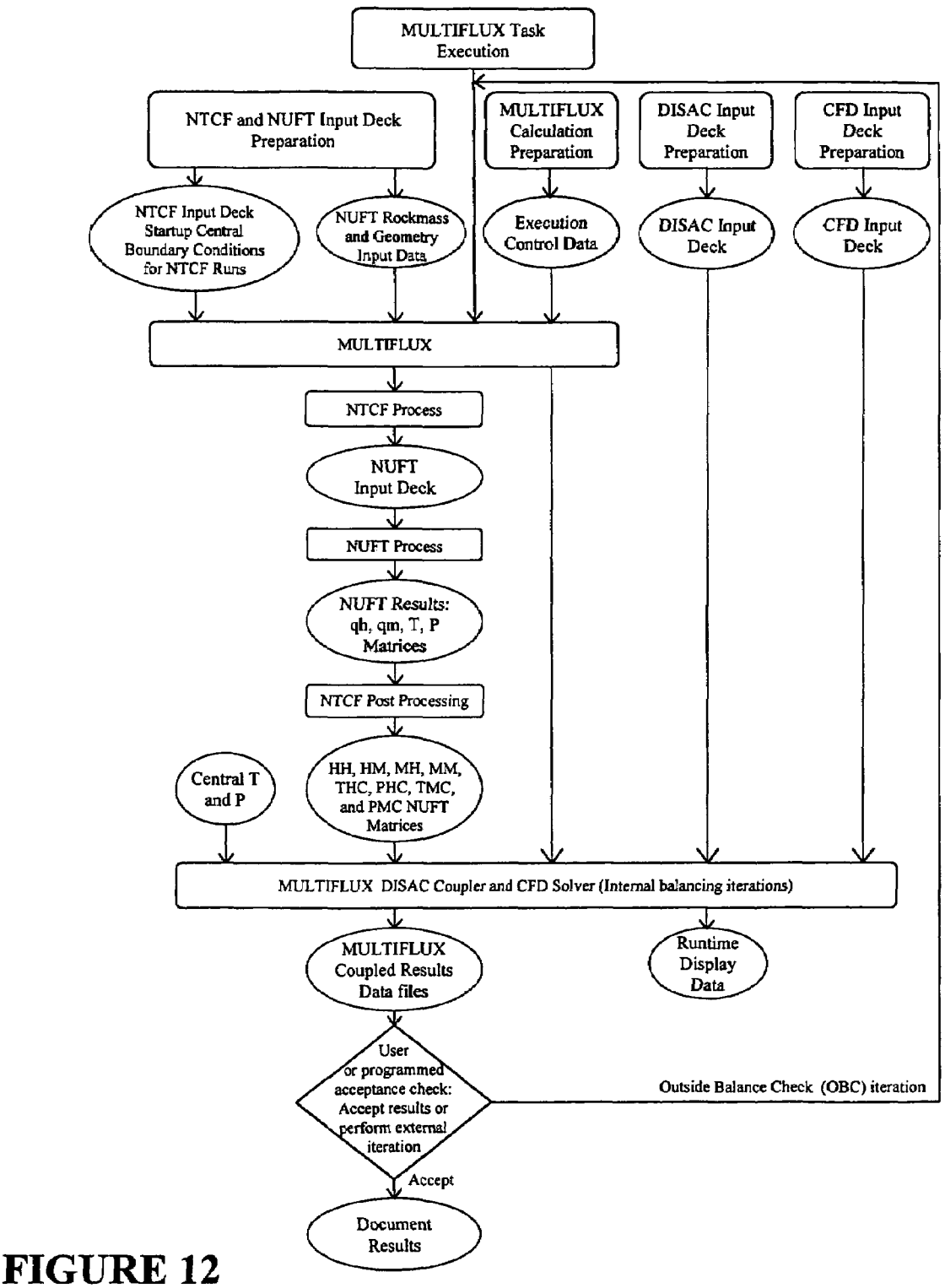
FIG. 12 is a main data and logic flow chart of an embodiment of the modeling method illustrated in FIG. 1(a) employing MULTIFLUX™ ventilation software with NTCF.

The application of the NTCF method in the ventilation modeling software MULTIFLUX™ is described with flow charts in FIGS. 10 through 12. FIG. 12 explains the role of the central value: an assumption that is checked and corrected, if necessary. Since the acceptance check is based on the central values of T and P, it is necessary to enforce the perfect-fit role in the NTCF procedure to avoid distortion between the functional and the original NTC at the central values.

Figure 13:
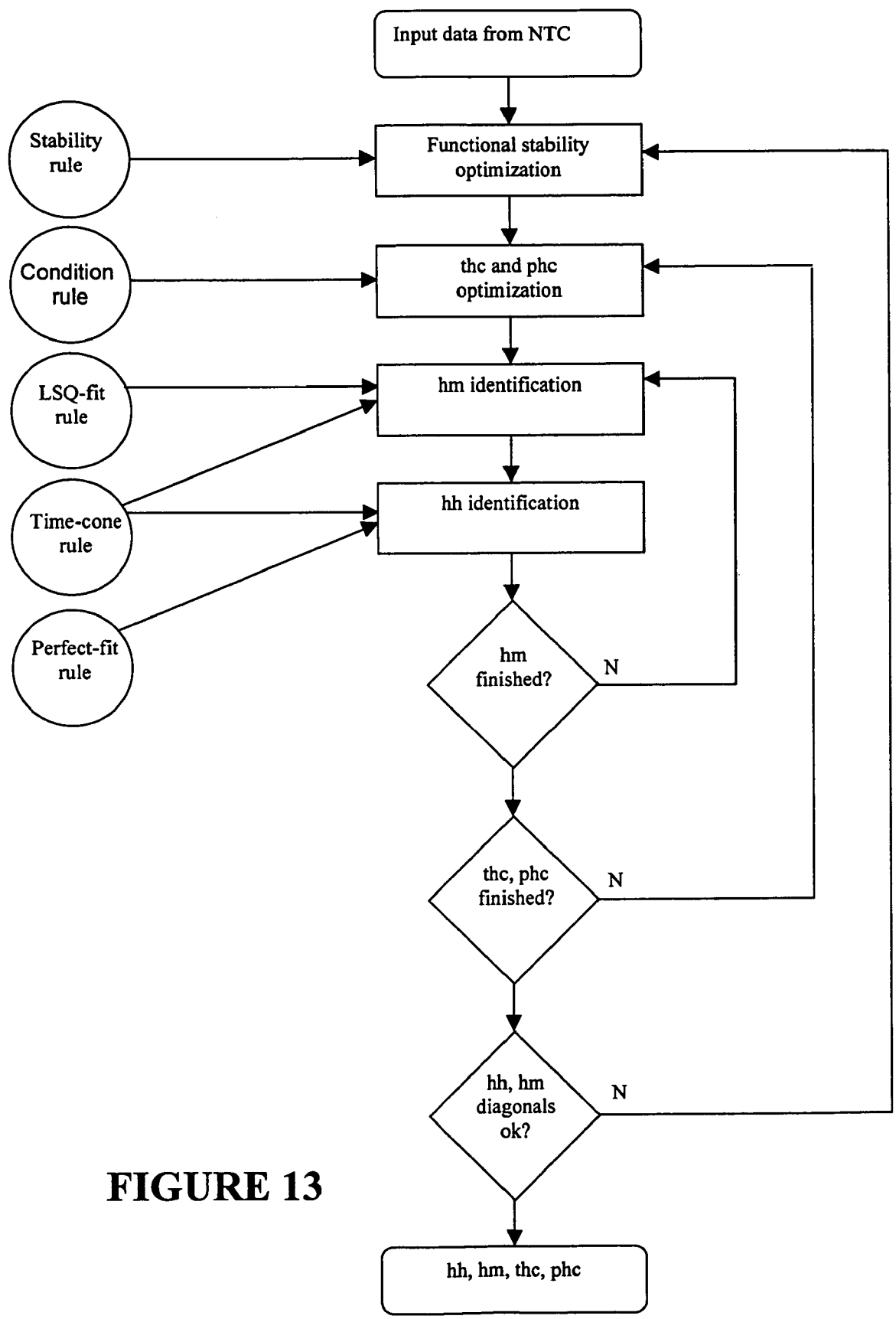
FIG. 13 is a logic flow chart of an NTCF model fitting procedure for a 2D, heat flow model example.

FIG. 13 is a logic flow chart of the NTCF model fitting procedure for a 2D, heat flow model example used in the n2m2 post-processor software function of MULTIFLUX™.

f. Compressed and Partitioned NTCF Models and Algorithms

A further embodiment of the functionalization procedure based on the use of nuftfun2 with a compressed, perturbed input data set. The compressed data set is advantageous to reduce the number of NTC runs, thus the computer time for functionalization. A slightly compressed data set may result in an excellent NTCF model, while the reduction in computational time may be significant. A fully-compressed data set in 3D can also be used for 3D, diagonal functionalization. This embodiment represents the most time-efficient procedure, however, for the cost of reduced model flexibility regarding the prediction of cross-flows between layers at deviated temperature histories from the central values. A fully-compressed, diagonal NTCF model may include negative main-diagonal elements that are detrimental to convergence if iteration is required in NTCF modelk applications. In this case, a partitioned and compressed NTCF model may provide a sufficient and economic solution.

In the compressed approach, a reduced set of independent input dataset is created by having more than one perturbation per layer in each NUFT run. The compression reduces the number of runs and hence computer time when compared to the regular approach in which one perturbation per layer is used. The compressed dataset is expanded up to a full size set using a function to generate the T, P, qh and qm matrices equivalent in size used in the uncompressed format. Nuft2mp is used to prepare the input equilibrium constants thc, phc, tmc and pmc which are then applied in running Nuft2mpc for obtaining hh, hm, mh, and mm transport matrices. Since the compressed functionalization still applies the perfect-fit rule for the central values, the NTCF model results are correct and not compromised in precision at the central boundary conditions. However, a compressed NTCF model has to be re-functionalized using iteration until the boundary variations agree with those used for central values during model identification. An example of the compression-expansion procedure for a four-layer, three-dimensional compressed NTCF model is given in Appendix 2.

The interactions between neighboring layers can be built artificially into a compressed NTCF model that lacks the information due to elimination of some or all of the spatial perturbations. A practical implementation of the determination of an artificial NTCF component can be accomplished using an approximate analytical or transport network model-element. This technique leads to a partitioned NTCF model in which one part of the NTCF model is determined based on the compressed numerical NTC results, while another part is determined using an analytical or numerical network model for prediction of the missing model-element due to compression. The added, approximate analytical or transport network model-element must give zero output results for the central input values in order to eliminate model error when the NTCF model is applied to the central input values.

Non-Linear NTCF Functional Model Using Volterra Series Solution

The invention also provides an expanded NTCF model capable of fitting over a wide range of boundary value variation, which is obtained by applying a Volterra series expression, for example as described in Eykhoff reference 28 hereinbelow, a generalization of the single integral in Eq. (1):

$$q(t) = \int_{\tau=0}^{t} T(\tau) \frac{\partial}{\partial t} A_1(t-\tau) d\tau + \qquad (41)$$

$$\int_{\tau=0}^{t} \int_{\tau=0}^{t} T(\tau_1) T(\tau_2) \frac{\partial^2}{\partial t^2} A_2(t-\tau_1, t-\tau_2) d\tau_1 d\tau_2 +$$

$$\int_{\tau=0}^{t} \int_{\tau=0}^{t} \int_{\tau=0}^{t} \cdots$$

Useful NTCF models can be formulated by modifying Eq. (41) for example by introducing (a) factorization, (b) diagonalization, and/or (c) scaling or in other ways as will be apparent to or become apparent to those skilled in the art. A difference between the inventive NTC model-building methods and conventional, non-linear system model identification is that a comprehensive NTCF model, if desired, can be built on sparse data, that is, using data from a modest number of NTC runs. An effective NTC non-linear model can then be identified by successively improving the Volterra series with modified, approximate kernels.

(a) Factorization. One possible simplifying modification of Eq. (41) is to approximate the derivative of the second, two-variable $A_2$ kernel with a product of two, one-variable functions, followed by similar simplification in the consecutive terms. To this end, the second kernel as an example, can read:

$$\frac{\partial^2}{\partial t^2} A_2(t-\tau_1, t-\tau_2) = \frac{\partial}{\partial t} A_{2,1}(t-\tau_1) \cdot \frac{\partial}{\partial t} A_{2,2}(t-\tau_2) \qquad (42)$$

This modification changes Eq. (41). However, the new functions, $A_{2,1}$, an $A_{2,2}$ can be adjusted to accommodate the change during model fitting.

(b) Diagonalization. Another simplifying modification that can be employed in the practice of the invention, a diagonalizing modification, is to equate $A_{2,1}$ with $A_1$. This simplification may be considered to be a weighting choice: for any $A_{2,1}$, an $A_{2,2}$ can be determined. Therefore, the unknown in the second kernel reduces to a one-variable function. Similar simplifications can be made in the consecutive kernels in the higher-order terms, re-using the previous kernels and each time adding a new one-variable function.

After re-naming $A_{2,2}$ for $A_2$, the first two terms of the modified Volterra equation read:

$$q(t) = \int_{\tau=0}^{t} T(\tau) \frac{\partial}{\partial t} A_1(t-\tau) d\tau + \qquad (43)$$

$$\int_{\tau=0}^{t} T(\tau) \frac{\partial}{\partial t} A_1(t-\tau) d\tau \int_{\tau=0}^{t} T(\tau) \frac{\partial}{\partial t} A_2(t-\tau) d\tau + \ldots$$

The justification for the simplification of the kernel, shown for the second term, is that it may not be possible to identify a two-variable $A_2(t, \tau_1, \tau_2) \in R^2$ function from the result of a single $q \in R^1$ output variation. However, a "diagonal" approximation can be used as shown, based on a simplifying restriction regarding the function form.

The $A_1(t, \tau)$ function in the first factor of the second Volterra term is a mere weighting choice. Flexibility in the selection of the function form for the derivative of $A_1$ allows for other choices than the one described. Modification, e.g., with an additive constant, may be needed for avoiding zero values of the first integral that would result in a singularity for the determination of the $A_2$ function from the second integral. For brevity, it will be assumed in the following description that the integrals do not vanish in the (0, t] interval.

c. Scaling. A third modification can be employed, if desired, a scaling modification, to make the modified Volterra series successive. This scaling modification enables the model fit to be improved with additional terms, while keeping the previous terms unchanged. For this condition, the T boundary function can be measured as a difference from the corresponding input boundary variation that is associated with a particular term. It is assumed that $T_0(t)$, $T_1(t)$, $T_2(t)$, ... are used for generating the $^N q_0(t)$, $^N q_1(t)$, $^N q_2(t)$, ... NTC outputs at fine $\tau_1$ time divisions. The following scaling can be used in the integrals with the first, second, third, etc kernels:

$$I(T-T_0, A'_1, t) = \int_{\tau=0}^{t} [T(\tau) - T_0(\tau)] A'_1(t-\tau) d\tau \qquad (44)$$

$$I(T-T_1, A'_2, t) = \int_{\tau=0}^{t} [T(\tau) - T_1(\tau)] A'_2(t-\tau) d\tau \qquad (45)$$

$$I(T-T_0, A'_3, t) = \int_{\tau=0}^{t} [T(\tau) - T_3(\tau)] A'_3(t-\tau) d\tau \qquad (46)$$

With the notations used in Eqs. (20)-(22), the modified Volterra series is as follows:

$$q(t) = q_0(t) + I(T-T_0, A'_1, t) + I(T-T_0, A'_1, t) \cdot I(T-T_1, A'_2, t) + I(T-T_0, A'_1, t) \cdot I(T-T_1, A'_2, t) \cdot I(T-T_2, A'_3, t) + \qquad (47)$$

In Eq. (47), the initial $T_0$ may be zero, constant, or a "virgin value" variation, caused by another process. For $T=T_0$, $q=q_0$, that may be non-zero, if the NTC model defines a non-homogeneous initial and boundary condition problem. As seen in Eq. (47), $T_1$ affects only second term, $T_2$ only the second and third terms, etc. This property allows for the explicit determination of the $A_1, A_2, \ldots$ successively from a forward progression.

The first term in Eq. (47) is identical to the NTC result for the $T_0$ input. Therefore, $q_0(t) = {}^N q_0(t)$. The $A_1(t)$ in the second term of Eq. (47) is identified using the $T_1$ input and the $^N q_1(t)$ output. Accordingly, Eqs. (20) and (23) give:

$$^Nq_1(t) - {}^Nq_0(t) = \int_{\tau=0}^{t} [T_1(\tau) - T_0(\tau)]A'_1(t-\tau)d\tau \quad (48)$$

The $A_1(t)$ generator function in Eq. (48) can be determined using inverse convolution. Some useful embodiments of inverse convolution are further described hereinbelow and in Appendix 7.zzz Since the $T_1(t)-T_0(t)$ function is stepwise, changing only at $t_1, t_2, \ldots, t_N$ time instants, the integral can be decomposed, and $A_1(\tau)$ be determined at fine $\tau$ sub-divisions from the NTC results. Using the notation of Eq. (A3) in Appendix I:

$$A_1(t) = \text{iconv}[{}^Nq_1(t) - {}^Nq_0(t), T_1(t) - T_0(t)] \quad (49)$$

The $A_2(t)$ function in the third term of Eq. (23) is identified using the $T_2$ input and the ${}^Nq_2(t)$ output. Using Eqs. (21) and (23), the convolution integral with the unknown $A_2(t)$ function can be expressed:

$$\frac{{}^Nq_2(t) - {}^Nq_0(t)}{I(T_2 - T_0, A'_1, t)} - 1 = \int_{\tau=0}^{t} [T_2(\tau) - T_1(\tau)]A'_2(t-\tau)d\tau \quad (50)$$

From Eq. (26), $A_2(\tau)$ is determined by inverse convolution:

$$A_2(t) = \text{iconv}\left[\frac{{}^Nq_2(t) - {}^Nq_0(t)}{I(T_2 - T_0, A'_1, t)} - 1, T_2(t) - T_1(t)\right] \quad (51)$$

The procedure for the third and higher Volterra series terms can be repeated. Each time, a new NTC run can be used for input. The general equation for the third term is:

$$\frac{{}^Nq_3(t) - {}^Nq_0(t)}{I(T_3 - T_0, A'_1, t)I(T_3 - T_1, A'_2, t)} - \frac{1}{I(T_3 - T_1, A'_2, t)} - 1 = \int_{\tau=0}^{t} [T_3(\tau) - T_2(\tau)]A'_3(t-\tau)d\tau \quad (52)$$

$A_3(\tau)$ is determined by inverse convolution from the left hand side of Eq. (28):

$$A_3(t) = \text{iconv}\left[\frac{{}^Nq_3(t) - {}^Nq_0(t) - I(T_3 - T_0, A'_1, t)}{I(T_3 - T_0, A'_1, t)I(T_3 - T_1, A'_2, t)} - 1, T_3(t) - T_2(t)\right] \quad (53)$$

When suitably executed, these steps are effective to complete the first four elements of the third-order, modified, approximate Volterra series functional model. The successive procedure may be continued by adding new terms.

A few examples will be described below with first-, second-, and third-order Volterra series NTCF models. In addition, the first-order Volterra series solution can be useful in providing a test for a simple NTCF model. Suitable NTCF model tests can use NUFT as an NTC, for example for calculating temperature-driven, time-dependent heat and moisture fluxes on the surface of a conceptual emplacement tunnel for nuclear waste or other purposes, such as an emplacement tunnel at Yucca Mountain, Nevada. The set-up of the NTC model can be identical to the test cases used in reference number [32] hereinbelow for Yucca Mountain. Nearly linear and slightly non-linear models can be expected, respectively, for the heat and the moisture fluxes. FIG. 18 shows an example of stepwise input temperature variations, $T_0, T_1, T_2,$ and $T_3$, that can be used for the various NTCF models identification. FIG. 18 depicts two Different input temperature variations, $T_a$, and $T_b$, both still stepwise, for NTCF functional model fitness tests. As may be seen from the graphs, both $T_a$, and $T_b$ are significantly different in shape from the $T_0, T_1, T_2,$ and $T_3$ inputs to provide for NTCF model validation or verification.

An exemplary comparison between the predictions of the three NTCF models and the NTC (NUFT) results for heat is shown in FIG. 19. FIG. 19 demonstrates that the NTCF models employed can achieve a close fit for the NTC heat fluxes used as input data for model identification. The agreements obtainable demonstrate that the identification procedure is effective and the models can reproduce the values used for their identification as inputs. The middle and lower graph sets shown in FIG. 19, sets (b) and (c), show exemplary results for three different NTCF models against the direct NTC results for the two different model fitness tests; the results yield excellent agreement for all models.

The three NTCF models and the NTC (NUFT) results for moisture flux are shown in FIG. 20(a)-(c). FIG. 19(a) demonstrates that the NTCF models can achieve an excellent fit to the NTC results, Verifying the algorithms. FIGS. 20(b) and (c) show the fitness test results of three different NTCF models against the direct NTC results for the two different model fitness tests; the results show that the NTCF models improve with increasing order; however, the $2^{nd}$-order model is nearly as good as the $3^{rd}$-order model.

Non-linear NTCF Matrix Model Using Volterra Series Solution. The above-described methods using piecewise-linear or higher-order polynomial connections between base points of the boundary values can be used to transform the continuous-time functional model into a discrete-time matrix model. For piecewise approximation, Eq. (13?) can directly be applied to form $h_1, h_2, h_3, \ldots$ matrices from the $A_1, A_2, A_3, \ldots$ generator functions. With this, the NTCF matrix model from the Volterra functional can be as follows:

$$q = q_0 + h_1(T-T_0) + [h_1(T-T_0)]*[h_2(T-T_1)] + [h_1(T-T_0)]*[h_2(T-T_1)]*[h_3(T-T_2)] + \quad (54)$$

The star sign in Eq. (54) denotes an element-by-element multiplication between vectors.

Two examples are given using NTCF matrix operator models based on the previous examples. Suitable input temperature variations are shown in FIG. 21, piecewise-linear for temperatures $T_a$, and $T_b$. The NTCF model results versus the NTC (NUFT) piecewise-linear input boundary function results are shown in FIG. 22 for heat fluxes $qh_a$ and $qh_b$ and in FIG. 23 for moisture fluxes $mh_a$ and $mh_b$ for the two temperatures $T_a$, and $T_b$ respectively. The results show excellent agreement between the NTCF models and the NTC results for heat for all the models used. For moisture flux, a $2^{nd}$, or $3^{rd}$-order model is seen to be more effective for efficient modeling with good predictive power. However, all models show a good fit for the input variations used in the model identification. In practice, a trade-off between more frequent re-functionalization versus an increase in the nonlinear NTCF order can be carefully weighed to provide an effective model for a given situation.

It will be understood that the described Volterra series solutions, and other generalizations of the single integral in Eq. (1) can be broadly employed in the application of the NTCF physical entity transport modeling methods of the invention, as described herein or as will be or become apparent to those skilled in the art.

Inverse Convolution. As suggested hereinabove, an inverse convolution function can be useful for Volterra model identification and/or for stabilizing the results in a noisy, nonlinear case. For example, the A(t) indicinal admittance function can be determined numerically in a linear case by inverse convolution, decomposing the $q(t_1)$, $q(t_2)$, ..., $q(t_n)$, ..., $q(t_N)$ responses obtained for a stepwise boundary function. The input T and output q responses are illustrated in FIG. 25. The inverse convolution may be obtained from the convolution equations as follows:

$$q(t_1) = A(t_1)T_1 \tag{55}$$

$$q(t_2) = [A(t_2) - A(t_2 - t_1)]T_1 + A(t_2 - t_1)T_2$$

$$\vdots$$

$$q(t_N) = [A(t_N) - A(t_N - t_1)]T_1 +$$
$$[A(t_N - t_1) - A(t_N - t_2)]T_2 + \ldots + A(t_N - t_{N-1})T_N$$

Assuming an equidistant time division, the inverse convolution equations read:

$$A(t_1) = q(t_1)/T_1 \tag{56}$$
$$A(t_2) = [q(t_2) - A(t_1)(T_2 - T_1)]/T_1$$
$$\vdots$$

Based on Eq. (56), an inverse convolution procedure iconv can be realized. The procedure can be applied to a stepwise input function T(t) and NTC output result function q(t) sampled at $t\in(0,t_N]$ time instants. The result is the indicinal admittance A(t). The notation of such an inverse convolution procedure is as follows:

$$A(t) = iconv[{}^N q_1(t) - {}^N q_0(t), T_1(t) - T_0(t)] \tag{57}$$

The procedure is generalized to provide finer sampling time discretization for $A(\tau)$, where $\tau\in(0,t_N]$, but it includes time interval sub-divisions called time "ticks". Typically, each $(t_{n-1}, t_n]$ interval is sub-divided into 100 sub-intervals, as shown schematically in FIG. 25.

Numerical Stability. As illustrated in FIG. 26, the inverse convolution described in Eq. (56) is preferably used with an equidistant $\tau$ time division. In one useful embodiment of the invention, an input, stepwise T function as illustrated in FIG. 25 (upper) can be employed. The graph in the lower portion of FIG. 25 depicts a corresponding output q response and unit response function $A(\tau)$. For the sake of simplicity only the first four variable time intervals are shown, subdivided into 3 time ticks.

The procedure utilized may be a successive forward progression in which the previous $A(\tau_n)$ values are used for the determination of $A(\tau_m)$ where $\tau_m > \tau_n$. If the $\tau\in(0,t_N]$, temporal discretization is arbitrary, the inverse convolution will involve the interpolation or even the extrapolation of $A(\tau)$ during the progression. This fact may make the procedure prone to numerical instability. Accumulation of error may cause oscillation in A during a procedure of several thousands steps, which would be a typical useful number of time ticks.

Stabilization of the Inverse Convolution. A novel least-square fit procedure can be utilized for stabilization as will now be described. For example, a set of $C(\tau)$ can be determined with a reduced number of elements relative to $A(\tau)$. $C(\tau)$ will be sparse representation of $A(\tau)$, that is, $C(\tau_c) = A(\tau_c)$ for $\tau_c$ being a time division for C, (called c_time) somewhat coarser than the $\tau$ time ticks.

Useful foundation equations for this purpose can be derived in three steps, as follows:

Step One: A matrix-vector equation is expressed between the $q(\tau)$ NTC output and $A(\tau)$ unknown function as two long vectors:

$$q = T_w A \tag{58}$$

In Eq. (58), $T_w$ is a coefficient matrix that is composed of the weighted values of the input function, $T(\tau)$. The definition of $T_w$ is as follows:

$$T_w = \sum_{i=1}^{N} T_{wi} \tag{59}$$

Where $T_{w1}$ is an M×M matrix, where M is the total number of ticks. The upper left-hand corner of $T_{w1}$ is an NT×NT matrix where NT is the number of ticks in each base time interval $(t_{n-1}, t_n]$.

$$T_{w1}(i, j) = \begin{bmatrix} T_1 - T_0 & 0 & 0 \\ 0 & T_1 - T_0 & 0 \\ 0 & 0 & \ddots \end{bmatrix} \quad (i, j) \in [1, NT]$$

and the other elements are $$T_{w1}(i,j) = 0 \quad (i,j) \notin [1,NT] \tag{60}$$

The second $T_{w2}$ matrix involves weight factors. For non-zero elements:

$$T_{w2}(i,j) = [(T_2-T_1)w_{a1}{}^i (T_2-T_1)w_{a2}{}^i (T_2-T_1)w_{a3}{}^i \ldots (T_2-T_1)w_{aM}{}^i] i\in[NT+1,2NT] j\in[1,M] \tag{61}$$

whereas the other elements are zero:

$$T_{w2}(i,j) = 0 \quad i \notin [NT+1, 2NT] j \in [1,M] \tag{62}$$

The $T_{w3}$ and higher-indexed elements follow the same trend, as may be understood by those skilled in the art.

Step two: The weight factors $w_{a1}{}^8$, $w_{a2}{}^i$, ... are defined for each $i^{th}$ row in each $T_{wi}$ matrix. These weight factors can be arranged in a matrix form, W. In a simple representation of such an exemplary procedure the weight factors express a linear interpolation of the left and right neighbors. For line i in the W matrix the non-zero neighbors are $$W_{i-1} = \frac{t - \tau(i-1)}{\tau(i) - \tau(i-1)}, \quad W_i = 1 - W_{i-1} \tag{63}$$

Where $t = (\tau(i) - t_n)$, $n = int(i/NT)$

Step three: A matrix-vector relationship is defined between the $A(\tau)$ and $C(\tau_c)$ vectors using another interpolation weight factor matrix, V:

$$A(\tau) = V \cdot C(\tau) \tag{64}$$

The V matrix is an M×$N_c$ matrix where M is the number of ticks and $N_c$ is the number of $\tau_c$ divisions. V in a simplest implementation is a sparse matrix with only two non-zero elements in each $i_{th}$ row:

$$V(i, j-1) = \frac{\tau_c(j) - \tau(i)}{\tau_c(j) - \tau_c(j-1)}, \quad V(i, j) = 1 - V(i, j-1) \tag{65}$$

$i \in [1, M]$ and $\tau_c(j-1) \leq \tau_c(i) \leq \tau_c(j)$

The combination of Eqs (58) and (64) gives:

$$q = T_w V C \tag{66}$$

The result for the determination of the $C(\tau_c)$ reduced-number vector can be made by generating a least-square fit solution of Eq. (66). This can be accomplished using standard technique:

$$C = ((T_w V)^T T_w V)^{-1} (T_w V)^T q \tag{67}$$

Finally, the $A(\tau)$ is restored from the $C(\tau_c)$ vector again using linear interpolation according to Eq. (64):

$$C=V((T_wV)^TT_wV)^{-1}(T_wV)^Tq \quad (68)$$

NTCF Model for Multivariate, Multi-dimensional problems. Similar treatment to that described above in connection with singular cases can be used for more than one variable and for domains of more than one layer in the NTC model. A typical example for a two-variable, one-layer quasi-linear model is the transport of heat and moisture in a two-dimensional domain:

$$qh=hh(T-T_0)+hm(P-P_0) \quad (31)$$

$$qm=mh(T-T_0)+mm(P-P_0) \quad (32)$$

The heat and moisture fluxes as time-dependent vectors, qh and qm, are functions of both temperature and partial vapor pressure vectors, T and P. Four coefficient matrices can be determined using the NTCF procedure, employing built-in functions in MULTIFLUX™ [33]. The model in this simple, quasi-linear form captures both temperature-driven main effects, and vapor pressure-driven cross effects. Other forms with user-defined equations may also be used, as will be apparent to or may become apparent to those skilled in the art.

Validation tests of the MULTIFLUX code with an NTCF method according to the present invention were made prior to the present application and are described in references 31 and 32 hereinbelow. One set of tests, reference 31, was made using a quasi-three-dimensional convection-conduction ventilation problem for comparison. The method employed compared solutions to the test problem with the use of MULTIFLUX to the reference, analytical solution. The reference calculation was generated by John Walton, Professor, University of Texas, El Paso, using a Carslaw and Jaeger analytical solution, reference 31. The other solution was made with MULTIFLUX. First, a linearized NTCF odel was identified for an arbitrary, small $T^C$ temperature variation within the expected mregime using NUFT. Second, a simple CFD model for the air convection was configured within MULTIFLUX, using 500 longitudinal divisions, as cells, along the air flow. Third, the NTCF wall model and the airflow model were coupled, by equating the temperature and heat flux at each division point and time interval. FIG. 24 shows air temperature history comparisons at a distance L=1 m, 250 m and 500 m along the airway between the MULTIFLUX and other reference solutions, reference 31. The test demonstrated that the linearized NTCF model in MULTIFLUX was capable of accurately modeling the time dependent heat flow. Re-functionalization was not needed in this low-temperature, nearly linear case. Since only one functionalization was necessary, the MULTIFLUX code produced results faster than the analytical solution, re-using the same matrix model in each cell, although numerical coupling and iterations were employed between the convection in the air channel and the conduction in the wall.

In thermohydrologic-ventilation simulations, the present invention contemplates that the NTCF method may reduce the complete simulation time from several years to a few days or weeks assuming the same computer simulation platform, see reference 33.

In summary, the invention provides a new modeling approach, as a sub-set of system identification, to model an existing NTC model. Thus, the invention provides simple, linear, or linearized models employing known techniques, together with a novel approach employing higher-order interpolation in the boundary-value variations in the NTC model. One embodiment of the invention employs methods of stepwise variation of the boundary condition in the NTC model. The invention includes embodiments wherein the NTCF model is presented in a matrix-vector form for efficient computation; in the exemplary embodiments, the NTCF model represents a piecewise-linear connection between the base points of the input boundary variation. It may be advantageous to run a NTC computational model using stepwise boundary variation, and to provide a response result belonging to piecewise-linear boundary variation. This internal transformation from stepwise to piecewise-linear variation can be built into the NTCF model itself. A higher-order, polynomial connection between the base points of the input boundary function can also be constructed and built in the NTCF model formulation. A person skilled in the art will understand how to derive or develop such an NTCF model, and to provide variations of same within the spirit of the invention, in light of the disclosure herein.

The invention also provides a simplified, successive Volterra series NTCF model useful for non-linear applications, which can be embodied in both time-continuous functional, as well as in discretized, matrix operator forms. The employment of a diagonal approximation and a weighting choice used in the formulation can provide increased modeling efficiency. Adding new terms in the Volterra series derived from new NTC results can provide useful compensations, for example for unduly rough approximations yielded by imperfect terms in the series. The accuracy of the NTCF model can be increased by increasing the number of NTC runs used for NTCF model identification.

Numerical examples of physical applications are presented using heat and moisture fluxes of NTCF model outputs as responses to inputs of first-kind temperature and partial vapor pressure boundary conditions. This input-output selection is used as an example. The invention also provides, or can employ, an inverse NTCF model in which second-kind input boundary conditions are applied. For example, boundary heat flux may be an NTCF model input for which surface temperature will become an output. Such an inverse NTCF model can be derived, if desired, by directly inverting the NTCF matrix equation. For example, $T=h^{-1}*q$ may directly be obtained from Eq. (4). by a method such as is disclosed in reference 7, hereinbelow, which describes NTCF model applications in MULTIFLUX™.

The scope of the invention includes not only the novel modeling methods, software and computerized implementations of software described herein, but also the useful results obtained or obtainable and novel real world physical constructions or configurations of matter that are advantageously adapted according to the results of the inventive modeling methods, for example novel subterranean or in-ground airways, driftways, mine shafts, and their configuration for nuclear waste emplacement or other purposes, to novel configurations of such nuclear waste or other materials, to novel configurations of pumping apparatus for mine reclamation and to other physical world applications of the invention such as are described herein or suggested by this disclosure.

In another embodiment, the inventive modeling method can be applied to provide solutions to the problem of configuring systems for dewatering large areas for mine reclamation. In order to pump out disused mine workings, such systems may employ as many as one hundred pumping stations with high running costs that could be of the order of millions of $US per month. Optimal siting and configuration of the pumping stations provides an opportunity for substantial cost savings. The inventive methods can be applied to provide beneficial solutions employing as input for modeling parameters such as water flows, water levels at the workings, electrical power utilized, and pump speed, choices of pumps to operate and so on. Another hydrological application includes the modeling and prediction tracking of the migration of pollution through watersheds and into drinking water.

The invention can be implemented on any suitable computer systems, as will be apparent to those skilled in the art.

For example, the model building process of the invention may be run on a high end machine, e.g a supercomputer or parallel processing computers. It is a particular benefit of the invention that useful embodiments of the inventive models, once built can be used to generate numeric solutions running on a present-day personal computer. For example, MULTI-FLUX™ may be run on a laptop computer with a one gigahertz processor and solve in 15 minutes a nonlinear ventilation, heat and moisture flow problem that would otherwise take months, or even years to solve without using the inventive NTCF method. To this end the methods, procedures and components thereof can be implemented in software which software can be stored in computer readable media. Those skilled in the art will understand that suitable software can be written employing languages such as Microsoft C or MAT-LAB.

List of Software Function Examples

Appendices 3-5 are MATLAB source-code scripts that define examples of software functions and algorithms used for the determination of user-configured NTCF models in MULTIFLUX™. Appendix 6 is an application software example for the solution of a ventilation problem that includes a CFD model for the heat and moisture transport in an airway and a non-linear NTCF model for the heat and moisture transport in the rock mass surrounding the said airway. Appendix 7 illustrates one example of an inverse convolution code that can be employed in conjunction with a Volterra series function.

INDUSTRIAL APPLICABILITY

The inventive method described for the determination of linear or non-linear operator model(s) results in a NTCF model that has a wide input variable domain and does not have to be frequently re-evaluated even in nonlinear applications. This advantage can be very beneficial to numerical modelers in many fields. If a model domain is the same but only the physical boundary conditions are varied from task-to-task, a general NTCF model for that problem can replace the numerical code, based on a one-time model identification procedure. Accordingly, the invention has numerous possible applications in environmental, hydrologic, technical computing and other fields. The inventive NTCF model, a matrix equation, or a set of equations, or matrix polynomial of such equation(s), may be several orders of magnitude faster to evaluate than the original NTC, and may use simpler and smaller computational platforms. Furthermore, complex problems may become solvable within an acceptable computational time frame, or precision may be enhanced for a given task using a more economic and accurate solution.

Modelers employing the invention can focus on model applications, given in the simple form of matrix equation or equations, which are nevertheless general enough to be capable of seeking particular solutions for any given boundary values. The NTCF model provides a general, fast communication link between various, non-linear NTC components, to the benefit of users with limited time and resources. With a parallel, nonlinear NTCF technique, an independent transport model component can be efficiently and precisely coupled for forming a balanced, equilibrium solution on specified boundaries. Preferred methods of the invention significantly simplify and accelerate the computation by (1) eliminating the need for writing codes into one model-element's source code to cooperate with another code, thus reducing the preparation time, and (2) reducing the number of actual runs on each component code, that is, the number of tryouts necessary to find a balanced solution. Since coupling is made on the user's surface and not at the source-code level, high-performance computing of multiphase modeling methods, as well as network computing of same, become possible with the use of the inventive NTCF modeling method.

Furthermore, the inventive NTCF-based method has applications in education reducing the time and complexity associated with numerical model applications. The NTCF model representation is educational, providing an insight into the behavior of the system being modeled through its selected form. For example, Eqs. (13) and (14) show the effects of two independent driving forces, T and P upon the resulting fluxes; the coefficient matrices show the weights of these driving forces in the result. Comprehensive modeling studies may be possible using simpler, slower and less expensive computational platforms, than hithertofore, applying NTCF models that are generated at a remote location, e.g., on a web server.

While illustrative embodiments of the invention have been described above, it is, of course, understood that various modifications will be apparent to those of ordinary skill in the art. Many such modifications are contemplated as being within the spirit and scope of the invention.

REFERENCES CITED

The following documents may have been referenced hereinabove by number. However no assertion or admission is made by the mere citation of such document hereinabove or hereinbelow, that any particular document has been published.

1 Danko, G., (2001), Numerical Transport Code Functionalization Procedure and Software Functions, Provisional Patent Application, University of Nevada, Reno.
2 Danko, G., (2002), MULTIFLUX V2.0, Software Configuration Management, Yucca Mountain Project—STN: 10485-2.0-00, University of Nevada, Reno, Yucca Mountain Project Record Information System (RIS), ACC: MOL.20020409.0366.
3 G. Danko, D. Bahrami, (2001), "Ventilation Analysis of a Cold Conceptual Repository using MULTIFLUX with NUFT", Proceedings, $9^{th}$ International high-Level Radioactive Waste Management Conference (IHLRWM), April $9^{th}$-May $3^{rd}$, Alexis Park Resort, Las Vegas, Nev., pp. 1-5.
4 Nitao, J., (2000), "NUFT Flow and Transport code V3.0s", Software Configuration Management, Yucca Mountain Project—STN: 10088-3.0S-00 Prepared by Lawrence Livermore National Laboratory, September 2000.
5 Danko, G. and Mousset-Jones, P., (1992). "Coupled Heat and Moisture Transport Model for Underground Climate Prediction" Proceedings, Third International High Level Nuclear Waste Conference, April, Las Vegas, Nev., pp. 790-798.
6 G. Danko, (1993). "Thermal Loading Studies Using Cooling Enhancement and Ventilation," Nuclear Technology, Vol. 104, December, pp. 358-371.
7 G. Danko and D. Bahrami, (2002), "The Application of CFD to Ventilation Calculations at Yucca Mountain", WM 02' Conference, Feb. 24-28, 2002, Tucson, Ariz., Session 39B, Paper 12, Abs. 243, pp. 1-11.
8 Danko, G., (1986), "Formation of the Generalized Convective Boundary Condition with the Physical Heat Transfer Coefficient," Proc. of the $8^{th}$ Int. Heat Transfer Conference, EF-23. San Francisco.
9 Danko, G., (1983), "The Possibility of Determining and Using a New Local Heat Transfer Coefficient," International Journal of Heat Mass Transfer, Vol. 26, No. 11, pp. 1679-1684.
10 BSC (Bechtel SAIC Company), 2002, Ventilation Model, ANL-EBS-MD-000030 REV 01, Las Vegas, Nev.: Bechtel SAIC Company, ACC.
11 . . . (2001), Personal Communications with BSC, EBS Modeling Group, Project Manager Dr. James Blink, Modeler Dr. Hang Yang, (702)295-7860.

12 Danko, G., (2002), "Cooperation between UNR and ANSYS in modeling acceleration," seminar and demonstration, September 16, ANSYS, Canonsburg, Pa.
13 Danko, G., Walton, J, and Bahrami, D., (2002), "Ventilation Study, Test Case 1 Report," Nye County, Department of Natural Resources and Federal Facilities, Pahrump, Nev., pp. 1-15.
14 Carslaw, H. S., Jaeger, J. C., (1986), Conduction of Heat in Solids, $2^{nd}$ edition, Oxford: Clarendon Press, New York, Oxford University Press, pp. 60-61.
15 Advanced Engineering Mathematics, Sixth Edition (1995) by C. Ray Wylie, C. R., Barrett, L. C., (1995), McGraw-Hill, Inc., pp. 661.
16 Danko, G., (1974), "Matrix Analysis of Transient Phenomena in Pipeline Flow," Periodica Polytechnica Electrical Engineering, Vol. 18. No. 2, University of Technology, Budapest, Hungary, pp. 167-189.
17 Bird, R. B., Stewart, W. E., Lightfoot, E. N., (1960), "Transport Phenomena," John Wiley and Sons, New York, N.Y., pp. 563-567.
18 G. Danko, D. Bahrami, P. Leister, J. Croise, (2003), "Temperature and Humidity Control for Underground Spent Fuel Storage", Submitted for publication, $10^{th}$ International high-Level Radioactive Waste Management Conference (IHLRWM), March 30-Apr. 3, 2003.
19 MATLAB, (2002), "User's Reference Manual," Version 6.0, The Math Works, Inc., Natick, Mass.
20 Danko, G., (1999), MULTIFLUX Four Layer Test, Scientific Notebook: SN-M&O-UNR-024-V1, pp. 35-73, ACC: MOL.20020126.0044.
21 TOUGH2 V2.0, Lawrence Berkeley National Laboratory, December 1999.
22 ANSYS 6.1, ANSYS, Inc., Canonsburg, Pa., 1999.
23 FLUENT 5.5, Fluent Inc., Lebanon, N.H., 1997.
24 FEMLAB 2.3, Multiphysics Modeling Software, COMSOL, Inc., Los Angeles, Calif., 2002.
25 Grubisic, V., (2002), "Advanced Computing in Environmental Sciences (ACES)," NSF EPSCoR Computational Science Program in Nevada, http://www.nevada.edu/epscor/aces.html.
26 Danko, G., (2001), "REKA V1.1 software qualifications," University of Nevada, Reno, Yucca Mountain Project Record Information System (RIS), ACC: MOL.20010212.0299.
27 Roosa, M., (2002), "Software Management," University and Community System of Nevada Quality Assurance Procedure, QAP-3.2 Revision 7, hhttp://hrcweb.nevada.edu/qa/qa.htm
28. Eykhoff, P., 1974. "System Identification, Parameter and State Estimation.", John Wiley & Sons, (2e)
29. DeFigueiredo, R. J. P., Dwyer, T. A. W, III, 1980. "A Best Approximation Framework and Implementation for Simulation of Large-Scale Nonlinear Systems." IEEE Transactions on Circuits and Systems, vol. CAS-27, No. 11, November 1980.
30. Carslaw, H. S., Jaeger, J. C. (1986), Conduction of Heat in Solids (2e) supra, p. 30.
31. Danko, G., 2003. "Coupled Hydrothermal-Ventilation Studies for Yucca Mountain." Annual Report for 2003. NWRPO-2003-05, Pahrump, Nev.: Nye County Department of Natural Resources.
32. Danko, G., Bahrami, D., and Lanka, S., 2003. "Technical Support Services for the MULTIFLUX Software." MOL.20031208.0025, Final Report, submitted to BSC, Nevada: Bechtel SAIC Company.
33. Danko, G., 2004. "Heat and Moisture Flow Simulation with MULTIFLUX." Proceedings of ASME, Heat Transfer/Fluid Engineering, Jul. 11-15, 2004, Charlotte, N.C., USA.

Appendix 1: NTCF Model Algorithm Example for a Four-Layer Domain

The unperturbed heat flux as functions of boundary temperature histories are as follows:

$$qqh_0^1 = hh^{1-1}(TT_0^1 - T_e) + hh^{1-2}(TT_0^2 - TT_0^1) + hh^{1-3}(TT_0^3 - TT_0^1) + hh^{1-4}(TT_0^4 - TT_0^1) \quad (A_1\text{-}1)$$

$$qqh_0^2 = hh_2^{-1}(TT_0^1 - TT_0^2) + hh^{2-2}(TT_0^2 - T_e) + hh^{2-3}(TT_0^3 - TT_0^2) + hh^{2-4}(TT_0^4 - TT_0^2) \quad (A_1\text{-}2)$$

$$qqh_0^3 = hh^{3-1}(TT_0^1 - TT_0^3) + hh^{3-2}(TT_0^2 - TT_0^3) + hh^{3-3}(TT_0^3 - T_e) + hh_3^{-4}(TT_0^4 - TT_0^3) \quad (A1\text{-}3)$$

$$qqh_0^4 = hh^{4-1}(TT_0^1 - TT_0^4) + hh^{4-2}(TT_0^2 - TT_0^4) + hh^{4-3}(TT_0^3 - TT_0^4) + hh^{4-4}(TT_0^4 - T_e) \quad (A1\text{-}4)$$

Where $TT_0^i$ (i=1, 2, 3, 4) are n×n temperature history matrices given Equation (A1-5).

$$TT_0^i = \begin{bmatrix} T_0^i(1) & T_0^i(1) & T_0^i(1) & \ldots & T_0^i(1) \\ T_0^i(1) & T_0^i(2) & T_0^i(2) & \ldots & T_0^i(2) \\ T_0^i(1) & T_0^i(2) & T_0^i(3) & \ldots & T_0^i(3) \\ \vdots & \vdots & \vdots & \vdots & \vdots \\ T_0^i(1) & T_0^i(2) & T_0^i(3) & \ldots & T_0^i(N) \end{bmatrix} \quad (A1\text{-}5)$$

As shown, each $TT_0^i$ matrix is generated by a $T_0^i(j)$ (=1, 2, . . . , 4) temperature vector with N elements. These temperature vectors are called wall temperatures at each layer.

Similarly the perturbed heat fluxes can be expressed in matrix equations.

The first layer heat flux due to perturbation at the first layer is:

$$qqh_1^1 = hh^{1-1}(TT_T^1 - T_e) + hh^{1-2}(TT_0^2 - TT_T^1) + hh^{1-3}(TT_0^3 - TT_T^1) + hh^{1-4}(TT_0^4 - TT_T^1) \quad (A1\text{-}6)$$

The first layer heat fluxes due to perturbation at the second through fourth layers are different. For example, the first layer heat flux due to perturbation at second layer is as follows:

$$qqh_2^1 = hh^{1-1}(TT_0^1 - T_e) + hh^{1-2}(TT_T^2 - TT_0^1) + hh^{1-3}(TT_0^3 - TT_0^1) + hh^{1-4}(TT_0^4 - TT_0^1) \quad (A1\text{-}7)$$

Equation (A1-7) can be simplified using equation (A1-1):

$$qqh_2^1 = qqh_0^1 + hh^{1-2}(TT_T^2 - T_0^2) \quad (A1\text{-}8)$$

$$qqh_2^1 - qqh_0^1 = hh^{1-2}(TT_T^2 - T_0^2) \quad (A1\text{-}9)$$

For layers 3 and 4 the equations can be derived similarly giving the following results:

$$qqh_3^1 - qqh_0^1 = hh^{1-3}(TT_T^3 - TT_0^3) \quad (A1\text{-}10)$$

$$qqh_4^1 - qqh_0^1 = hh^{1-4}(TT_T^4 - TT_0^4) \quad (A1\text{-}11)$$

The left hand side of the Equation (A1-6) can be modified to be similar to those in the Equations (A1-9)-(A1-11) with the use of Equation (A1-1). After some re arrangements, Equation (A1-6) can be written as follows:

$$qqh_1^1 - qqh_0^1 = (hh^{1-1} - hh^{1-2} - hh^{1-3} - hh^{1-4})(TT_T^1 - TT_0^1) \quad (A1\text{-}12)$$

The $hh^{1-1}$ matrix can be eliminated from Equation (A1-12) using Equation (A1-1) in order to enforce the validity of the unperturbed equation, after some re-arrangement:

$$qqh_1^1 - qqh_0^1 = [qqh_0^1 - hh^{1-2}(TT_0^2 - TT_0^1) - hh^{1-3}(TT_0^3 - TT_0^1) - hh^{1-4}(TT_0^4 - TT_0^1)]inv[TT_0^1 - T_e] + (hh^{1-2} + hh^{1-3} + hh^{1-4})(TT_0^1 - TT_T^1) \quad (A1\text{-}13)$$

This procedure can be repeated for $qqh_j^i$ (i=2, 3, 4); the resulting four equations can be compressed into one matrix equation, with the use of super matrices which have elements of matrices. The result is as follows:

$$\begin{bmatrix} qqh_1^1 - qq_0^1 - qqh_0^1 inv(TT_0^1 - T_c) \\ qqh_2^1 - qqh_0^1 \\ qqh_3^1 - qqh_0^1 \\ qqh_4^1 - qqh_0^1 \end{bmatrix} = \begin{bmatrix} TT_0^1 - TT_T^1 & TT_0^1 - TT_T^1 & TT_0^1 - TT_T^1 \\ -(TT_0^2 - TT_0^1)inv(TT_0^1 - T_c) & -(TT_0^2 - TT_0^1)inv(TT_0^1 - T_c) & -(TT_0^2 - TT_0^1)inv(TT_0^1 - T_c) \\ TT_1^2 - TT_0^2 & [0]_{i \times j} & [0]_{i \times j} \\ [0]_{i \times j} & TT_T^3 - TT_0^3 & [0]_{i \times j} \\ [0]_{i \times j} & [0]_{i \times j} & TT_T^4 - TT_0^4 \end{bmatrix} \times \begin{bmatrix} hh^{1\_2} \\ hh^{1\_3} \\ hh^{1\_4} \end{bmatrix} \quad (A1\text{-}14)$$

Equation (A14) has $hh^{1\_2}$, $hh^{1\_3}$ and $hh^{1\_4}$ unknown matrices, where the two other super matrices are known. The three unknown matrices are over-determined by Equation (A1-14). A least square function (LSF) solution technique is used for the determination of the unknown matrices. During the solution, a constraint is enforced to obtain lower-triangular matrices, which are to have zero elements above the main diagonal. A simple LSF method would give full, instead of triangular, matrices. Triangulation is achieved solving the set of equations line-by-line, enforcing zero elements in the unknown matrices over the main diagonal. The set of equations is still over-determined with the triangulation constraint. The LSF technique contributes to achieve a smoothed functionalized solution. The $hh^{1\_1}$ matrix can be determined from Equation (A12) after the $hh^{1\_2}$, $hh^{1\_3}$ and $hh^{1\_4}$ are determined.

The same procedure is repeated for the second, third and fourth layers. Thus, the complete hh super matrix is determined. The transport equation with the complete hh super matrix is as follows:

$$\begin{bmatrix} qh^1 \\ qh^2 \\ qh^3 \\ qh^4 \end{bmatrix} = hh \begin{bmatrix} T_1 - T_c \\ T_2 - T_c \\ T_3 - T_c \\ T_4 - T_c \end{bmatrix} \quad (A1\text{-}15)$$

where $$hh = \begin{bmatrix} hh^{1\_1} - hh^{1\_2} - hh^{1\_3} - hh^{1\_4} & hh^{1\_2} & hh^{1\_3} & hh^{1\_4} \\ hh^{2\_1} & hh^{2\_2} - hh^{2\_1} - hh^{2\_3} - hh^{2\_4} & hh^{2\_3} & hh^{2\_4} \\ hh^{3\_1} & hh^{3\_2} & hh^{3\_3} - hh^{3\_1} - hh^{3\_2} - hh^{3\_4} & hh^{3\_4} \\ hh^{4\_1} & hh^{4\_2} & hh^{4\_3} & hh^{4\_4} - hh^{4\_1} - hh^{4\_2} - hh^{4\_3} \end{bmatrix} \quad (A1\text{-}16)$$

Appendix 2: Compression-Expansion Example for a Four-Layer, Three-Dimensional NTCF Model The uncompressed input format for T, P, qh and qm are given as follows as an example:

Uncompressed Input Format for T and P According to FIG. 6:

| $p_{i1}$ | $u_{i1}$ | $u_{i1}$ | $u_{i1}$ | $u_{i1}$ | (A2-1) |
|---|---|---|---|---|---|
| $u_{i2}$ | $p_{i2}$ | $u_{i2}$ | $u_{i2}$ | $u_{i2}$ | |
| $u_{i3}$ | $u_{i3}$ | $p_{i3}$ | $u_{i3}$ | $u_{i3}$ | |
| $u_{i4}$ | $u_{i4}$ | $u_{i4}$ | $p_{i4}$ | $u_{i4}$ | | where $u_{i1}$, $u_{i2}$, $u_{i3}$ and $u_{i4}$ are the unperturbed results at the unperturbed layers for uncompressed input T and P.

$P_{i1}$, $p_{i2}$, $p_{i3}$ and $p_{i4}$ are the perturbed results at the perturbed layers for uncompressed input T and P.

Uncompressed Output Format for qh and qm:

| $p_{r1}$ | $N_{r1}$ | $N_{r1}$ | $N_{r1}$ | $n_{r1}$ | (A2-2) |
|---|---|---|---|---|---|
| $N_{r2}$ | $p_{r2}$ | $N_{r2}$ | $N_{r2}$ | $n_{r2}$ | |
| $N_{r3}$ | $N_{r3}$ | $p_{r3}$ | $N_{r3}$ | $n_{r3}$ | |
| $N_{r4}$ | $N_{r4}$ | $N_{r4}$ | $p_{r4}$ | $n_{r4}$ | |

Where $n_{r1}$, $n_{r2}$, $n_{r3}$, $n_{r4}$, are the unperturbed results at the unperturbed layers $N_{r1}$, $N_{r2}$, $N_{r3}$, $N_{r4}$, are the perturbed results at the unperturbed layers $p_{r1}$, $p_{r2}$, $p_{r3}$, $p_{r4}$, are the perturbed results at the perturbed layers The 4 layer compressed format is expanded into the format below using a weight factor.

Input Format for Compressed T and P:

| $\rho_{i1}$ | $\eta_{i1}$ | $\eta_{i1}$ | (A2-3) |
|---|---|---|---|
| $\eta_{i2}$ | $\rho_{i2}$ | $\eta_{i2}$ | |
| $\rho_{i3}$ | $\eta_{i3}$ | $\eta_{i3}$ | |
| $\eta_{i4}$ | $\rho_{i4}$ | $\eta_{i4}$ | |

Where $\eta_{i1}$, $\eta_{i2}$, $\eta_{i3}$, $\eta_{i4}$, are the unperturbed inputs at the unperturbed layers for the compressed input T and P $\rho_{i1}$, $\rho_{i2}$, $\rho_{i3}$, $\rho_{i4}$, are the perturbed inputs at the perturbed layers for the compressed input T and P Compressed Output Format for qh and qm:

$$\begin{array}{ccc} \rho_{r1} & \Pi_{r1} & \eta_{r1} \\ \Pi_{r2} & \rho_{r2} & \eta_{r2} \\ \rho_{r3} & \Pi_{r3} & \eta_{r3} \\ \Pi_{r4} & \rho_{r4} & \eta_{r4} \end{array} \quad (A2\text{-}4)$$

Where $\eta_{r1}$, $\eta_{r2}$, $\eta^{r3}$, and $\eta_{r4}$, are the unperturbed results at the unperturbed layers from the compressed approach $\Pi_{r1}$, $\Pi_{r2}$, $\Pi_{r3}$, and $\Pi_{r4}$, are the perturbed results at the unperturbed layers from the compressed approach $\rho_{r1}$, $\rho_{r2}$, $\rho_{r3}$, and $\rho_{r4}$, are the perturbed results at the perturbed layers from the compressed approach Expanded Format of qh and qm for NTCF Model Post-Processing:

$$\begin{array}{ccccc} \rho_{r1} & w(\eta_{r1},\Pi_{r1}) & \eta_{r1} & \eta_{r1} & \eta_{r1} \\ w(\eta_{r2},\Pi_{r2}) & \rho_{r2} & w(\eta_{r2},\Pi_{r2}) & \eta_{r2} & \eta_{r2} \\ \eta_{r3} & w(\eta_{r3},\Pi_{r3}) & \rho_{r3} & w(\eta_{r3},\Pi_{r3}) & \eta_{r3} \\ \eta_{r4} & \eta_{r4} & w(\eta_{r4},\Pi_{r4}) & \rho_{r4} & \eta_{r4} \end{array} \quad (A2\text{-}5)$$

Where, $\eta_{r1}$, $\eta_{r2}$, $\eta^{r3}$, and $\eta_{r4}$, are the unperturbed results at the unperturbed layers from the compressed approach $\Pi_{r1}$, $\Pi_{r2}$, $\Pi_{r3}$, and $\Pi_{r4}$, are the perturbed results at the unperturbed layers from the compressed approach $\rho_{r1}$, $\rho_{r2}$, $\rho_{r3}$, and $\rho_{r4}$, are the perturbed results at the perturbed layers from the compressed approach The weighted average for q and B in the expanded format is calculated according to the relation:

$$w(a,b) = w_1 * \eta_{ri} + w_2 * \Pi_{ri} \quad (A2\text{-}6)$$

where $w_1$ and $w_2$ are constant weight factors, selected to achieve best model performance. A starting selection of $w_1 = w_2 = 0.5$ can be used.

Appendix 3: Post-Processing Function: nuft2 mpc.m

Main processing function to solve for hh and hm (or mh and mm) from qqh=hh*(TT−Thc)+hm*(PP−Phc) (or qqm=mh*(TT−Tmc)+mm*(PP−Pmc)) with perfect-fit, LSQ-fit, and time-cone rules for given Thc, Phc (or Pmc, Tmc) for three-dimensional model.

```
%nuft2mPC.m
%----------------------------------------------------------------
%----------------------------------------------------------------
%              nuft2mPC
% Generate mm, hm, hh, mh matrices for heat & moisture emulating NTC
% Usage:
% nuft2mPC('dataDir', thc,phc,tmc,pmc,numIter)
% nuft2mPC('dataDir', tc_h,pc_h,tc_m,pc_m,numIter,ndia)
%       dataDir-- the directory holds the data
%       thc   -- h_const temperature
%       phc   -- h_const pressure
%       tmc   -- m_const temperature
%       pmc   -- m_const pressure
%       numIter-- number of iterations
%       ndia -- functionalization method, 1 - full(default) ; 0 - diagonal
% Designer: George Danko Machay School of Mines Univ. of Reno
% Programmers: Yongmian Zhang, Fangxiao Xu
%          07/23/98
%----------------------------------------------------------------
%----------------------------------------------------------------
% 9/30/98: uses only TP data, pre-set t26 and p2000 constants
% 10/03/98: got the matrix with minimum error automatically
% Modifications:
% 7/19/99: Davood Bahrami
function nuft2mPC(varargin)
%Command Line proccessing
if nargin ~=6 & nargin ~=7
   feval('help',mfilename);
   return
else
   dataDir=varargin{1};
   tc_h=varargin{2};
   pc_h=varargin{3};
   tc_m=varargin{4};
   pc_m=varargin{5};
   numIter=varargin{6};;
   ndia=1;
end
if nargin ==7
        ndia=varargin{7};
else
end
%--- set constant for t26 and p2000
pDir = sprintf('%s/', dataDir);
%---- Temperature and pressure perturbation together
fin = [pDir 'T'];
if(~exist(fin,'file')),fprintf('Could not open file: %s\n',fin);return,end
```

```
T=mread(fin);
[m,n]=size(T);
timeDiv=m-n
layers=n/timeDiv
fin= [pDir 'P'];
if(~exist(fin,'file')),fprint('Could not open file: %s\n',fin);return,end
P=mread(fin);
fin = [pDir 'qh'];
if(~exist(fin,'file')),fprintf('Could not open file: %s\n',fin);return,end
qh=mread(fin);
fin = [pDir 'qm'];
if(~exist(fin,'file')),fprintf('Could not open file: %s\n',fin);return,end
qm=mread(fin);
maxRow = timeDiv*layers;
maxCol = maxRow;
t_t = T;
p_p = P;
qhp = qh;
qmp = qm; % P, qh, qm from matrix?_?TP
% average perturbed and unperturbed blocks
if layers == 1
   temp=t_t;
   %t_t(1:timeDiv,:)=temp(timeDiv+1:2*timeDiv,:);
   t_t(timeDiv+1:2*timeDiv,:)=(temp(1:timeDiv,:)+temp(timeDiv+1:2*timeDiv,:))/2;
   temp=p_p;
   %p_p(1:timeDiv,:)=temp(timeDiv+1:2*timeDiv,:);
   p_p(timeDiv+1:2*timeDiv,:)=(temp(1:timeDiv,:)+temp(timeDiv+1:2*timeDiv,:))/2;
   temp=qhp;
   %qhp(1:timeDiv,:)=temp(timeDiv+1:2*timeDiv,:);
   qhp(timeDiv+1:2*timeDiv,:)=(temp(1:timeDiv,:)+temp(timeDiv+1:2*timeDiv,:))/2;
   temp=qmp;
   %qmp(1:timeDiv,:)=temp(timeDiv+1:2*timeDiv,:);
   qmp(timeDiv+1:2*timeDiv,:)=(temp(1:timeDiv,:)+temp(timeDiv+1:2*timeDiv,:))/2;
end
%swap ends
qqhp = qhp(1:maxRow,1:maxRow);
qqmp = qmp(1:maxRow,1:maxRow);
tt=t_t(1:layers*timeDiv,1:layers*timeDiv);
t_t0=stransp(t_t,timeDiv,layers,1);
pbar=1e5;
%--- calculate hh hm matrix
%---
fprintf('\nStart to find hh and hm\n');
hmn=zeros(maxRow,maxRow);
hhh=[ ];
hhm=[ ];
%find best hh hm for the best central values
for (nl=1:numIter)
   tci(nl)=tc_h;
   pci(nl)=pc_h;
   dt = t_t - tc_h*ones(maxRow+timeDiv, maxRow);
   tin=stransp(dt, timeDiv, layers, 1);
   dp=p_p-ones((layers+1)*timeDiv,layers*timeDiv)*pc_h;
   pin = stransp(dp, timeDiv, layers,1);
   dp=(p_p)-ones((layers+1)*timeDiv,layers*timeDiv)*pc_h;
   pinp = stransp(dp, timeDiv, layers,1);
   qin = qhp-stransp(hmn*pin, timeDiv, layers, 2);
   hh_iter = hh_mh(t_t, qin, tc_h, timeDiv, layers, ndia);
   dq = qhp-stransp(hh_iter*tin, timeDiv, layers, 2);
   if layers == 1
      p_p_s=p_p;
      p_p_s(timeDiv+1:2*timeDiv,:)=p_p_s(1:timeDiv,:);
      dq_s=dq;
      dq_s(timeDiv+1:2*timeDiv,:)=dq_s(1:timeDiv,:);
   end
   hm_iter = hh_mh(p_p_s, dq_s, pc_h, timeDiv, layers, ndia);
   %hm_iter = hh_mh(p_p, dq, pc_h, timeDiv, layers, ndia);
   qc=stransp(hh_iter*tin+hm_iter*pinp, timeDiv, layers, 2);
   dqp=qhp-qc;
   nmax=(maxRow+timeDiv)*maxRow;
   %   if (ndia==0)
   %      dqp=dqp(maxRow+1:maxRow+timeDiv,:);
   %      nmax=timeDiv*maxRow;
   %end
erra1(nl) = sqrt(sum(sum((dqp.*dqp)))/(nmax));
erra2(nl) = abs( mean(mean(dqp))/mean(mean(qhp)) )*100;
fprintf('nuft2m: t26 = %f p2000 = %f err = %f\n', tc_h, pc_h, erra1(nl));
hmn=0.5*hm_iter+0.5*hmn;
hhh=[hhh hh_iter];
```

```
hhm=[hhm hm_iter];
end %end of nl loop
[min_err, m_i] = min(erra1);
tc_h = tci(m_i);
pc_h = pci(m_i);
hh = hhh(:,(m_i−1)*maxRow+1:(m_i)*maxRow);
hm = hhm(:,(m_i−1)*maxRow+1:(m_i)*maxRow);
%plot error if necessary
subplot(2,2,1);
plot(erra1)
%save erra
fid = fopen('err1_h', 'w');
for ( n=1:size(erra1,2) )
    fprintf(fid, '%f ', erra1(n));
end
fclose(fid);
fid = fopen('err2_h', 'w');
for ( n=1:size(erra2,2) )
    fprintf(fid, '%f ', erra2(n));
end
fclose(fid);
%--- write tConst_h and tConst_m to file
fin =fopen('h_const', 'w');
fprintf(fin, '%f\n', tc_h);
fprintf(fin, '%f\n', pc_h);
fclose(fin);
mwrite('hh',hh);
mwrite('hm',hm);
%compare qhc with qhp
qcp=stransp(hh*tin+hm*pinp, timeDiv, layers, 2);
%write('qhc',qcp);
err_qh = abs( (qcp−qhp)/mean(mean(qhp)) )*100;
mwrite('err_qh',err_qh);
subplot(2,2,2);
plot(err_qh);
%--- calculate mm mh matrix
%---
fprintf('\nStart to find mm and mh\n');
mmn=zeros(maxRow,maxRow);
mmm=[ ];
mmh=[ ];
%find best hh hm for the best central values
for (nl=1:numIter)
    tci(nl)=tc_m;
    pci(nl)=pc_m;
    dt = t_t − tc_m*ones(maxRow+timeDiv, maxRow);
    tin=stransp(dt, timeDiv, layers, 1);
    dp=p_p−ones((layers+1)*timeDiv,layers*timeDiv)*pc_m;
    pin = stransp(dp, timeDiv, layers,1);
    dp=(p_p)−ones((layers+1)*timeDiv,layers*timeDiv)*pc_m;
    pinp = stransp(dp, timeDiv, layers,1);
    qin = qmp−stransp(mmn*pin, timeDiv, layers, 2);
    mh_iter = hh_mh(t_t, qin, tc_m, timeDiv, layers, ndia);
    dq = qmp−stransp(mh_iter*tin, timeDiv, layers, 2);
    if layers == 1
        p_p_s=p_p;
        p_p_s(timeDiv+1:2*timeDiv,:)=p_p_s(1:timeDiv,:);
        dq_s=dq;
        dq_s(timeDiv+1:2*timeDiv,:)=dq_s(1:timeDiv,:);
    end
    mm_iter = hh_mh(p_p_s, dq_s, pc_m, timeDiv, layers, ndia);
    %hm_iter = hh_mh(p_p, dq, pc_h, timeDiv, layers, ndia);
    qc=stransp(mh_iter*tin+mm_iter*pinp, timeDiv, layers, 2);
    dqp=qmp−qc;
    nmax=(maxRow+timeDiv)*maxRow;
    %    if (ndia==0)
    %        dqp=dqp(maxRow+1:maxRow+timeDiv,:);
    %        nmax=timeDiv*maxRow;
    %end
errb1(nl) = sqrt(sum(sum((dqp.*dqp)))/(nmax));
errb2(nl) = abs( mean(mean(dqp))/mean(mean(qmp)) )*100;
fprintf('nuft2m: t26 = %f p2000 = %f err = %f\n', tc_m, pc_m, errb1(nl));
mmn=0.5*mm_iter+0.5*mmn;
mmm=[mmm mm_iter];
mmh=[mmh mh_iter];
end %end of nl loop
[min_err, m_i] = min(errb1);
tc_m = tci(m_i);
pc_m = pci(m_i);
```

-continued

```
mm = mmm(:,(m_i−1)*maxRow+1:(m_i)*maxRow);
mh = mmh(:,(m_i−1)*maxRow+1:(m_i)*maxRow);
%plot error if necessary
subplot(2,2,3);
plot(errb1)
%save errb
fid = fopen('err1_m', 'w');
for ( n=1:size(errb1,2) )
    fprintf(fid, '%f ', errb1(n));
end
fclose(fid);
fid = fopen('err2_m', 'w');
for ( n=1:size(errb2,2) )
    fprintf(fid, '%f ', errb2(n));
end
fclose(fid);
%--- write tConst_h and tConst_m to file
fin = fopen('m_const', 'w');
fprintf(fin, '%f\n', tc_m);
fprintf(fin, '%f\n', pc_m);
fclose(fin);
mwrite('mh',mh);
mwrite('mm',mm);
%compare qhc with qhp
qcp=stransp(mh*tin+mm*pinp, timeDiv, layers, 2);
%write('qhc',qcp);
err_qm = abs( (qcp−qmp)/mean(mean(qmp)) )*100;
mwrite('err_qm',err_qm);
subplot(2,2,4);
plot(err_qm);
return;
```

Internal Function: hh_mh.m   30
  Main internal processing function to solve for hh (or mh) from qqh=hh*(TT−Thc) (or qqm=mh*(TT−Tmc) with perfect-fit, LSQ-fit, and time-cone rules for given Thc (or Tmc) for three-dimensional model

```
function hh = hh_mh(t, qht, tConst, timeDiv, layers, ndia)
t26 = tConst*ones(timeDiv, timeDiv);
if ( ndia ~= 0 )
    ndia = 1;    %ndia = 0, diagnal; ndia=1, non-diagnal
end
HT = [ ];
for(ly=1:layers)
    x = (ly−1)*timeDiv+1;
    y = ly*timeDiv;
    TT0 = t(layers*timeDiv+1:(layers+1)*timeDiv, x:y);
    TTti = t(x:y, x:y);
    TT = TT0 − TTti;
    ip = inv(TT0−t26);
    T = zeros(timeDiv*(layers−1), timeDiv*layers);
    for(i=1:ly−1)
        temp1 = t((i−1)*timeDiv+1:i*timeDiv, (i−1)*timeDiv+1:i*timeDiv);
        temp2 = t(layers*timeDiv+1:(layers+1)*timeDiv,(i−1)*timeDiv+1:i*timeDiv);
        T((i−1)*timeDiv+1:i*timeDiv,(i−1)*timeDiv+1:i*timeDiv) = temp1 − temp2;
    end
    for(i=ly+1:layers)
        temp1 = t((i−1)*timeDiv+1:i*timeDiv, (i−1)*timeDiv+1:i*timeDiv);
        temp2 = t(layers*timeDiv+1:(layers+1)*timeDiv, (i−1)*timeDiv+1:i*timeDiv);
        T((i−2)*timeDiv+1:(i−1)*timeDiv, (i−1)*timeDiv+1:i*timeDiv) = temp1 − temp2;
    end
    j = 1;
    for(i=1:layers)
        if ( i == ly );
        else
            TT0i = t(layers*timeDiv+1:(layers+1)*timeDiv, (i−1)*timeDiv+1:i*timeDiv);
            T((j−1)*timeDiv+1:j*timeDiv,x:y) = TT + (TT0i−TT0)*ip*TT;
            j = j + 1;
        end
    end
end
Q = zeros(timeDiv, timeDiv*layers);
QC = zeros(timeDiv, timeDiv*layers);
```

-continued

```
qh0 = qht(layers*timeDiv+1:(layers+1)*timeDiv, x:y);
for(i=1:layers)
    Q(1:timeDiv,(i-1)*timeDiv+1:i*timeDiv) = qht((i-1)*timeDiv+1:i*timeDiv, x:y)-qh0;
    if(i==ly)
        Q(1:timeDiv,(i-1)*timeDiv+1:i*timeDiv) = Q(1:timeDiv,(i-1)*timeDiv+1:i*timeDiv)+qh0*ip*TT;
    end
end
if (layers ~=1)
    H = zeros(timeDiv, timeDiv*(layers-1));
    for(i=1:timeDiv)
        %fprintf('Layer %d timeDiv %d\n', ly, i);
        Y = [ ]; A = [ ];
        for(j=1:layers)
            Y = [Y Q(i,(j-1)*timeDiv+1:(j-1)*timeDiv+i)];
        end
        for(j=1:layers-1)
            temp = [ ];
            for(l=1:layers)
                temp = [temp T((j-1)*timeDiv+1:(j-1)*timeDiv+i,(l-1)*timeDiv+1:(l-1)*timeDiv+i)];
            end
            A = [A; temp];
        end
        if (ndia == 0)
            X = A(:,1)*0;
            X = X';
        else
            X=Y/A;
        end
        for(l=1:layers-1)
            H(i,(l-1)*timeDiv+1:(l-1)*timeDiv+i) = X((l-1)*i+1:(l-1)*i+i);
        end
    end %end of time division loop
    hh = [ ];
    j = 1;
    for(i=1:layers)
        if(i==ly)
            temp1 = zeros(timeDiv, timeDiv);
        else
            temp1 = H(1:timeDiv, (j-1)*timeDiv+1:j*timeDiv);
            j = j+1;
        end
        hh = [hh temp1];
    end
    tt = [ ];
    for(i=1:layers)
        if(i==ly)
            temp1 = zeros(timeDiv, timeDiv);
        else
            temp1 = t(layers*timeDiv+1:(layers+1)*timeDiv, (i-1)*timeDiv+1:i*timeDiv) - TT0;
        end
        tt = [tt; temp1];
    end
    hh_t = (qh0 - ndia*hh*tt)*ip;
    hh = [ ];
    j = 1;
    for(i=1:layers)
        if(i==ly)
            temp1 = hh_t;
        else
            temp1 = ndia*H(1:timeDiv,(j-1)*timeDiv+1:j*timeDiv);
            j = j+1;
        end
        hh = [hh temp1];
    end
    HT = [HT;hh];
else % layers ~=1 if
    HT=qh0*ip;
end          % end of layers ~=1 if
end   %--- end of layer loop
hhd = HT;
hh = HT;
for(i=1:layers)
    x = (i-1)*timeDiv+1;
    y = i*timeDiv;
    sum = zeros(timeDiv, timeDiv);
    for(j=1:layers)
        if(i ~= j)
            sum = sum + hhd(x:y, (j-1)*timeDiv+1:j*timeDiv);
        end
```

-continued

```
      end
      hh(x:y, x:y) = hh(x:y, x:y) − sum;
   end
return;
```

Internal Function: stransp.m

```
%-----------------------------------------------------------
% SuperTranspose:
%      transpose a super matrix mt to mtx and return mtx.
%      The element of super matrix is a sub-matrix with size of
%      (timeDiv, timeDiv)
%
% mt --- super matrix
% mtx --- transposed matrix
% fg --- flag which indicates the super matrix format
%
% fg = 0 Square matrix Super transpose to a square matrix
%
% fg = 1 mt((layers+1)*timeDiv, layers*timeDiv) super transpose
%        to mtx(layers*timeDiv, (layers+1)*timeDiv
%
% fg = 2 mt(layers*timeDiv, (layers+1)*timeDiv) super tanspose
%        to mtx((layers+1)*timeDiv, layers*timeDiv)
%-----------------------------------------------------------
function mtx = stransp(mt, timeDiv, layers, fg)
if (fg >2 | fg <0)
   fprintf('SuperTranspose: Wrong arguments');
   exit;
end
if (fg <= 1)
   mtx = zeros(layers*timeDiv, (layers+fg)*timeDiv);
   for(i = 1:layers)
      x1 = (i−1)*timeDiv+1;
      y1 = i*timeDiv;
      for(j = 1:layers+fg)
         x2 = (j−1)*timeDiv+1;
         y2 = j*timeDiv;
         mtx(x1:y1, x2:y2) = mt(x2:y2, x1:y1);
      end
   end
else
   mtx = zeros(layers*timeDiv+timeDiv, layers*timeDiv);
   for(i = 1:layers)
      x1 = (i−1)*timeDiv+1;
      y1 = i*timeDiv;
      for(j = 1:layers+1)
         x2 = (j−1)*timeDiv+1;
         y2 = j*timeDiv;
         mtx(x2:y2, x1:y1) = mt(x1:y1, x2:y2);
      end
   end
end
return;
```

Internal Function: mwrite.m

```
%mwrite.m
%this function writes a matrix into an ascii file
%Note: the percision of e makes a difference 7 digits works
%Created on 5/4/99
%
function mwrite(varargin)
if nargin ==2
   mode='w';
   sformat='%.6e ';
elseif nargin ==3
   mode=varargin{3};
   sformat='%.6e ';
elseif nargin ==4
   mode=varargin{3};
   sformat=varargin{4};
else
   disp('wrong input');
   return
end
fname=varargin{1};
a=varargin{2};
[m n]=size(a);
if issparse(a)
   [i j a]=find(a);
   a=[i j a];
   if isempty(a)
      a=[n m 0];
   end
end
[m n]=size(a);
fid=fopen(fname,mode);
if fid==(−1)
   fprintf('Could not open file: %s\n',fname);
   return;
end
for i=1:m
   fprintf(fid,sformat,a(i,:));
   fprintf(fid,'\n');
end
if isempty(a)
   fprintf(fid,sformat);
end
fclose(fid);
return
```

Appendix 4: Post-Processing Function: nuft2 mp.m

Main processing function to solve for Thc and Phc (or Tmc and Pmc) from qqh=hh*(T−Thc)+hm*(PP−Phc) (or qqm=mh*(TT−Tmc)+mm*(PP−Pmc)) with perfect-fit, LSQ-fit, and time-cone rules for three-dimensional model.

```
%nuft2mp.m
%-----------------------------------------------------------
%-----------------------------------------------------------
%          nuft2mP
% Generate mm, hm, hh, mh, h, m matrix for heat & moisture emulate
%
% Usage:
% nuft2mP('dataDir') or
% nuft2mP('dataDir'numIter)
```

-continued

```
% nuft2mP('dataDir'numIter,ndia)
%       dataDir -- the directory holds the data
%       numIter-- number of iterations, (default, 1)
%       ndia -- functionalization method, 1 - full(default) ; 0 - diagonal
% Designer: George Danko Mackay School of Mines Univ. of Reno
% Programmers: Yongmian Zhang, Fangxiao Xu
%       07/23/98
%
%---------------------------------------------------------------
%---------------------------------------------------------------
% 9/7/98: uses only TP data%
% 3/22/99: Modified to compile and run on PC; Davood Bahrami%
%Modifications:
%7/19/99          Davood Bahrami
function nuft2mP(varargin)
%Command Line proccessing
if nargin ==1
        dataDir=varargin{1};
        numIter=1;
    ndia=1;
elseif nargin ==2
        dataDir=varargin{1};
        numIter=varargin{2};
        ndia=1;
elseif nargin ==3
        dataDir=varargin{1};
        numIter=varargin{2};
        ndia=varargin{3};
else
    feval('help',mfilename);
    return
end
pDir = sprintf('%s/', dataDir);
%---- Temperature and pressure perturbation together
fin = [pDir 'T'];
if(~exist(fin,'file')),fprintf('Could not open file: %s\n',fin);return,end
T=mread(fin);
[m,n]=size(T);
timeDiv=m-n;
layers=n/timeDiv;
fin=[pDir 'P'];
if(~exist(fin,'file')),fprintf('Could not open file: %s\n',fin);return,end
P=mread(fin);
fin = [pDir 'qh'];
if(~exist(fin,'file')),fprintf('Could not open file: %s\n',fin);return,end
qh=mread(fin);
fin = [pDir 'qm'];
if(~exist(fin,'file')),fprintf('Could not open file: %s\n',fin);return,end
qm=mread(fin);
maxRow = timeDiv*layers;
maxCol = maxRow;
t_t = T;
p_p = P;
qhp = qh;
qmp = qm; % P, qh, qm from matrix?_?TP
% average perturbed and unperturbed blocks
if layers == 1
    temp=t_t;
    %t_t(1:timeDiv,:)=temp(timeDiv+1:2*timeDiv,:);
    t_t(timeDiv+1:2*timeDiv,:)=(temp(1:timeDiv,:)+temp(timeDiv+1:2*timeDiv,:))/2;
    temp=p_p;
    %p_p(1:timeDiv,:)=temp(timeDiv+1:2*timeDiv,:);
    p_p(timeDiv+1:2*timeDiv,:)=(temp(1:timeDiv,:)+temp(timeDiv+1:2*timeDiv,:))/2;
    temp=qhp;
    %qhp(1:timeDiv,:)=temp(timeDiv+1:2*timeDiv,:);
    qhp(timeDiv+1:2*timeDiv,:)=(temp(1:timeDiv,:)+temp(timeDiv+1:2*timeDiv,:))/2;
    temp=qmp;
    %qmp(1:timeDiv,:)=temp(timeDiv+1:2*timeDiv,:);
    qmp(timeDiv+1:2*timeDiv,:)=(temp(1:timeDiv,:)+temp(timeDiv+1:2*timeDiv,:))/2;
end
%swap ends
qqhp = qhp(1:maxRow,1:maxRow);
qqmp = qmp(1:maxRow,1:maxRow);
tt=t_t(1:layers*timeDiv,1:layers*timeDiv);
t_t0=stransp(t_t,timeDiv,layers,1);
pbar=1e5;
%--- calculate hh hm matrix
%---
fprintf('\nStart to find hh and hm\n');
```

-continued

```
%--- find constant for t26 and p2000
pc=-2000;
for(j=1:10)
    pc=pc+100;
    const_p(j) = pc;
    pc_h=pc;
    dp=p_p-ones((layers+1)*timeDiv,layers*timeDiv)*pc;
    pin = stransp(dp, timeDiv, layers,1);
    dp=(p_p)-ones((layers+1)*timeDiv,layers*timeDiv)*pc;
    pinp = stransp(dp, timeDiv, layers,1);
    tc = 9.0;
    for(i=1:25)
        tc = tc+1;
        const_t(i) = tc;
        tc_h=tc;
                    hmn=zeros(maxRow,maxRow);
        for (nl=1:numIter) %iteration loop
            dt = t_t - tc*ones(maxRow+timeDiv, maxRow);
            tin=stransp(dt, timeDiv, layers, 1);
            qin = qhp-stransp(hmn*pin, timeDiv, layers, 2);
            hh_iter = hh_mh(t_t, qin, tc_h, timeDiv, layers, ndia);
            dq = qhp-stransp(hh_iter*tin, timeDiv, layers, 2);
            if layers == 1
                p_p_s=p_p;
                p_p_s(timeDiv+1:2*timeDiv,:)=p_p_s(1:timeDiv,:);
                dq_s=dq;
                dq_s(timeDiv+1:2*timeDiv,:)=dq_s(1:timeDiv,:);
            end
            hm_iter = hh_mh(p_p_s, dq_s, pc_h, timeDiv, layers, ndia);
            %hm_iter = hh_mh(p_p, dq, pc_h, timeDiv, layers, ndia);
            qc=stransp(hh_iter*tin+hm_iter*pinp, timeDiv, layers, 2);
            dqp=qhp-qc;
            nmax=(maxRow+timeDiv)*maxRow;
        %      if (ndia==0)
        %          dqp=dqp(maxRow+1:maxRow+timeDiv,:);
        %          nmax=timeDiv*maxRow;
            err1(nl) = sqrt(sum(sum((dqp.*dqp)))/(nmax));
            erra2(nl) = abs( mean(mean(dqp))/mean(mean(qhp)) )*100;
            fprintf('nuft2m: t26 = %f p2000 = %f err = %t\n', tc_h, pc_h, erra1(nl));
            hmn=0.5*hm_iter+0.5*hmn;
            %hhh=[hhh hh_iter];
            %hhm=[hhm hm_iter];
        end %end of nl loop
        %[min_err, m_i] = min(erra1);
        %tc_h = tci(m_i);
        %pc_h = pci(m_i);
        %hh = hhh(:,(m_i-1)*maxRow+1:(m_i)*maxRow);
        %hm = hhm(:,(m_i-1)*maxRow+1:(m_i)*maxRow);
        err1(i,j)=erra1(nl); % picks the last error from the iteration loop.
    end
end
[m1 n1]=min(err1);
[m2 n2]=min(m1);
i=n1(n2);j=n2;
tc_h=const_t(i);
pc_h=const_p(j);
tci(nl)=tc_h;
pci(nl)=pc_h;
%find best hh hm for the best central values
        dt = t_t - tc_h*ones(maxRow+timeDiv, maxRow);
        tin=stransp(dt, timeDiv, layers, 1);
        dp=p_p-ones((layers+1)*timeDiv,layers*timeDiv)*pc_h;
        pin = stransp(dp, timeDiv, layers,1);
        dp=(p_p)-ones((layers+1)*timeDiv,layers*timeDiv)*pc_h;
        pinp = stransp(dp, timeDiv, layers,1);
        qin = qhp-stransp(hmn*pin, timeDiv, layers, 2);
        hh = hh_mh(t_t, qin, tc_h, timeDiv, layers, ndia);
        dq = qhp-stransp(hh*tin, timeDiv, layers, 2);
    if layers == 1
        p_p_s=p_p;
        p_p_s(timeDiv+1:2*timeDiv,:)=p_p_s(1:timeDiv,:);
        dq_s=dq;
        dq_s(timeDiv+1:2*timeDiv,:)=dq_s(1:timeDiv,:);
    end
    hm = hh_mh(p_p_s, dq_s, pc_h, timeDiv, layers, ndia);
        qc=stransp(hh*tin+hm*pinp, timeDiv, layers, 2);
        dqp=qhp-qc;
        nmax=(maxRow+timeDiv)*maxRow;
%      if (ndia==0)
```

-continued

```
%        dqp=dqp(maxRow+1:maxRow+timeDiv,:);
%        nmax=timeDiv*maxRow;
%     end
      erra1(nl) = sqrt(sum(sum((dqp.*dqp)))/(nmax));
      erra2(nl) = abs( mean(mean(dqp))/mean(mean(qhp)) ) *100;
      fprintf('nuft2m: t26 = %f p2000 = %f err = %t\n', tc_h, pc_h, erra1(nl));
      hmn=0.5*hm+0.5*hmn;
end %end of nl loop
[min_err, m_i] = min(erra1);
tc_h = tci(m_i);
pc_h = pci(m_i);
%plot error if necessory
subplot(2,2,1);
plot(erra1)
%save erra
fid = fopen('err1_h', 'w');
for ( n=1:size(erra1,2) )
   fprintf(fid, '%f ', erra1(n));
end
fclose(fid);
fid = fopen('err2_h', 'w');
for ( n=1:size(erra2,2) )
   fprintf(fid, '%f ', erra2(n));
end
fclose(fid);
%--- write tConst_h and tConst_m to file
fin = fopen('h_const', 'w');
fprintf(fin, '%f\n', tc_h);
fprintf(fin, '%f\n', pc_h);
fclose(fin);
mwrite('hh',hh);
mwrite('hm',hm);
%compare qhc with qhp
qcp=stransp(hh*tin+hmn*pinp, timeDiv, layers, 2);
err_qh = abs( (qcp-qhp)/mean(mean(qhp)) )*100;
mwrite('err_qh',err_qh );
subplot(2,2,2);
plot(err_qh);
return
%--- calculate mm mh matrix
%---
fprintf('\nStart to find mm and mh\n');
mmn=zeros(maxRow,maxRow);
for (nl=1:numIter)
pc=-2000;
for(j=1:10)
   pc=pc+2000;
   const_p(j) = pc;
   dp=p_p-ones((layers+1)*timeDiv,layers*timeDiv)*pc;
   pin = stransp(dp, timeDiv, layers,1);
   dp=(p_p)-ones((layers+1)*timeDiv,layers*timeDiv)*pc;
   pinp = stransp(dp, timeDiv, layers,1);
tc = 9.0;
for(i=1:25)
   tc = tc+1;
   const_t(i) = tc;
   qin = qmp-stransp(mmn*pin, timeDiv, layers, 2);
   mh = hh_mh(t_t, qin, tc, timeDiv, layers, ndia);
   dt = t_t - tc*ones(maxRow+timeDiv, maxRow);
   tin=stransp(dt, timeDiv, layers, 1);
   dq = qmp-stransp(mh*tin, timeDiv, layers, 2);
   mm = hh_mh(p_p, dq, pc, timeDiv, layers, ndia);
   qc=stransp(mh*tin+mm*pinp, timeDiv, layers, 2);
   dqp=qmp-qc;
   nmax=(maxRow+timeDiv)*maxRow;
   err1(i,j) = sqrt(sum(sum((dqp.*dqp)))/(nmax));
   fprintf('nuft2m: t26 = %f p2000 = %f err = %f\n', tc, pc, err1(i,j));
end
end
[m1 n1]=min(err1);
[m2 n2]=min(m1);
i=n1(n2);j=n2;
tc_m=const_t(i);
pc_m=const_p(j);
tci(nl)=tc_m;
pci(nl)=pc_m;
%find best mh mm for the best central values
      dt = t_t - tc_m*ones(maxRow+timeDiv, maxRow);
      tin=stransp(dt, timeDiv, layers, 1);
```

```
                dp=p_p-ones((layers+1)*timeDiv,layers*timeDiv)*pc_m;
                pin = stransp(dp, timeDiv, layers,1);
                dp=(p_p)-ones((layers+1)*timeDiv,layers*timeDiv)*pc_m;
                pinp = stransp(dp, timeDiv, layers,1);
                qin = qmp-stransp(mmn*pin, timeDiv, layers, 2);
                mh = hh_mh(t_t, qin, tc_m, timeDiv, layers, ndia);
                dq = qmp-stransp(mh*tin, timeDiv, layers, 2);
                mm = hh_mh(p_p, dq, pc_m, timeDiv, layers, ndia);
                qc=stransp(mh*tin+mm*pinp, timeDiv, layers, 2);
                dqp=qmp-qc;
                nmax=(maxRow+timeDiv)*maxRow;
%               if (ndia==0)
%                   dqp=dqp(maxRow+1:maxRow+timeDiv,:);
%                   nmax=timeDiv*maxRow;
%               end
                errb1(nl) = sqrt(sum(sum((dqp.*dqp)))/(nmax));
                errb2(nl) = abs( mean(mean(dqp))/mean(mean(qmp)) ) * 100;
                fprintf('nuft2m: t26 = %f p2000 = %f err = %f\n', tc_m, pc_m, errb1(nl));
                mmn=0.5*mm+0.5*mmn;
end     of nl loop
[min_err, m_i] = min(errb1);
tc_m = tci(m_i);
pc_m = pci(m_i);
%plot error if necessary
subplot(2,2,3);
plot(errb1);
%save errb
fid = fopen('err1_m', 'w');
for ( n=1:size(errb1,2) )
    fprintf(fid, '%f ', errb1(n));
end
fclose(fid);
fid = fopen('err2_m', 'w');
for ( n=1:size(errb2,2) )
    fprintf(fid, '%f ', errb2(n));
end
fclose(fid);
%--- write tConst_h and tConst_m to file
fin = fopen('m_const', 'w');
fprintf(fin, '%f\n', tc_m);
fprintf(fin, '%f\n', pc_m);
fclose(fin);
mwrite('mh',mh);
mwrite('mm',mm);
%compare qhc with qhp
qcp=stransp(mh*tin+mmn*pinp, timeDiv, layers, 2);
err_qm = abs( (qcp-qmp)/mean(mean(qmp)) )*100;
mwrite('err_qm',err_qm);
subplot(2,2,4);
plot(err_qm);
return;
```

Appendix 5: Post-Processing Function: n2m2.m

Main processing function to solve for Thc, Phc, hh, and hm (or Tmc, Pmc, mh, mm) from qqh=hh*(TT−Thc)+hm*(PP−Phc) (or qqm=mh*(TT−Tmc)+mm*(PP−Pmc)) with perfect-fit, LSQ-fit, and time-cone rules for two-dimensional model. Another, stability rule is added to the constraints.

```
function n2m2(wd,tcpc)
%------------------------------------------------------------
%               n2m2
% Generate mm, hm, hh, mh matrices for heat & moisture emulating NTC
% Designer: George Danko Machay School of Mines Univ. of Reno
%------------------------------------------------------------
%data input
tt=load([wd '/T']);
pp=load([wd '/P']);
qh=load([wd '/qh']);
qm=load([wd '/qm']);
%[tt pp qh qm]=ntcf_read(wd);
%tcpc=[15 35 1 800 1200 20 0]; %user-defined vector for tc and pc: all positive
                %tcpc(7): control; 1 - heat and moisture individually
                %optimized     0 - only heat flow data is optimized
%make error message if ilim, jlim are negative or if any of the tcpc(3) or
```

```
%tcpc(6) are negative
%data input finished
%main program
%uses n2m_c_d "nuft-to-matrix core, diagonal" function
%uses MATLAB's fmins 2D optimizer with a custom domain frame
%optimizes hh,hm, mh, mm matrices individually for each segment,
%   combines segments into diagonal supermatrices
%optimizes tc and pc constants for the combined segments
%provides perfect fit to central values and least-square fit
%   to perturbed and central values together
%check qh matrix and correct minimum number of under-diagonal history elements
qh0=qh;
[n m]=size(tt);
m=m/2; %size of hh and hm
p=n/m;
for i=1:p; %super loop
j1=(i−1)*m;
tcent=tt(j1+1:j1+m,m+1:2*m);
qcent=qh(j1+1:j1+m,m+1:2*m);
tpert=tt(j1+1:j1+m,1:m);
qpert=qh(j1+1:j1+m,1:m);
hh=qcent/tcent;
%check and fix diagonal - central
        dia=diag(hh);
        ip=find(dia>0);
        ipi=find(dia<=0);
        avg=mean(dia(ip));
        for i1=1:size(ipi)
                in=ipi(i1);
                q=qcent(in,1:in);
                t=tcent(1:in,1:in);
                q=q';
                t=t';
                ql=q(in,:);
                tl=t(in,:);
                qbl=q(in−1,:);
                tbl=t(in−1,:);
                qch=q;
                qch(in−1,:)=ql;
                qch(in,:)=qbl;
                tch=t;
                tch(in−1,:)=tl;
                tch(in,:)=tbl;
                qn_1=qch(1:in−1,:);
                tn_1=tch(1:in−1,1:in−1);
                tlc=tch(1:in−1,in);
                h1=inv(tn_1)*(qn_1−tlc*avg);
                h1=[h1;avg];
                q3=t*h1;
                qcent(in,in−1)=q3(in−1,1); %qcent element is replaced with q3
        end %i1 loop
        if ~isempty(ipi)
                qh(j1+1:j1+m,m+1:2*m)=qcent; %unperturbed correction
        end
 hh=qpert/tpert;
%check and fix diagonal - perturbed
        dia=diag(hh);
        ip=find(dia>0);
        ipi=find(dia<=0);
        avg=mean(dia(ip));
        for i1=1:size(ipi)
                in=ipi(i1);
                q=qpert(in,1:in);
                t=tpert(1:in,1:in);
                q=q';
                t=t';
                ql=q(in,:);
                tl=t(in,:);
                qbl=q(in−1,:);
                tbl=t(in−1,:);
                qch=q;
                qch(in−1,:)=ql;
                qch(in,:)=qbl;
                tch=t;
                tch(in−1,:)=tl;
                tch(in,:)=tbl;
                qn_1=qch(1:in−1,:);
                tn_1=tch(1:in−1,1:in−1);
                tlc=tch(1:in−1,in);
```

-continued

```
                    h1=inv(tn_1)*(qn_1-tlc*avg);
                    h1=[h1;avg];
                    q3=t*h1;
                    qpert(in,in−1)=q3(in−1,1); %qpert element is replaced with q3
        end %i1 loop
            if ~isempty(ipi)
                    qh(j1+1:j1+m,1:m)=qpert; %perturbed correction
            end
end % end of j1 correction super loop
%document changes
[i j]=find(abs(qh0−qh)~=0); %corrected indeces
chqh=[ ];
for i1=1:size(i);
    chqh=[chqh;i(i1) j(i1) qh0(i(i1),j(i1)) qh(i(i1),j(i1))];
end
%message display
if ~isempty(chqh)
    disp('WARNING: heat flux input data modified to avoid negative diagonal in hh')
    format short g
    disp(chqh)
end
%message finished
%check qm matrix and correct minimum number of under-diagonal history elements
qm0=qm;
[n m]=size(tt);
m=m/2; %size of hh and hm
p=n/m;
for i=1:p; %super loop
j1=(i−1)*m;
tcent=tt(j1+1:j1+m,m+1:2*m);
qcent=−qm(j1+1:j1+m,m+1:2*m); %sign changed: temperature drives moisture into drift
qpert=−qm(j1+1:j1+m,1:m);    %sign changed: temperature drives moisture into drift
hh=qcent/tcent;
%check and fix diagonal - central - skip the first element
        dia=diag(hh);
        ip=find(dia>0);
        ipi=find(dia<=0);
        avg=mean(dia(ip));
        for i1=2:size(ipi)
                in=ipi(i1);
                q=qcent(in,1:in);
                t=tcent(1:in,1:in);
                q=q';
                t=t';
                ql=q(in,:);
                tl=t(in,:);
                qbl=q(in−1,:);
                tbl=t(in−1,:);
                qch=q;
                qch(in−1,:)=ql;
                qch(in,:)=qbl;
                tch=t;
                tch(in−1,:)=tl;
                tch(in,:)=tbl;
                qn_1=qch(1:in−1,:);
                tn_1=tch(1:in−1,1:in−1);
                tlc=tch(1:in−1,in);
                h1=inv(tn_1)*(qn_1-tlc*avg);
                h1=[h1;avg];
                q3=t*h1;
                qcent(in,in−1)=q3(in−1,1); %qcent element is replaced with q3
        end %i1 loop
            if ~isempty(ipi)
                    qm(j1+1:j1+m,m+1:2*m)=−qcent; %unperturbed correction
            end
 hh=qpert/tpert;
%check and fix diagonal - perturbed - skip the first element
        dia=diag(hh);
        ip=find(dia>0);
        ipi=find(dia<=0);
        avg=mean(dia(ip));
        for i1=2:size(ipi)
                in=ipi(i1);
                q=qpert(in,1:in);
                t=tpert(1:in,1:in);
                q=q';
                t=t';
                ql=q(in,:);
                tl=t(in,:);
```

-continued

```
            qbl=q(in-1,:);
            tbl=t(in-1,:);
            qch=q;
            qch(in-1,:)=ql;
            qch(in,:)=qbl;
            tch=t;
            tch(in-1,:)=tl;
            tch(in,:)=tbl;
            qn_1=qch(1:in-1,:);
            tn_1=tch(1:in-1,1:in-1);
            tlc=tch(1:in-1,in);
            h1=inv(tn_1)*(qn_1-tlc*avg);
            h1=[h1;avg];
            q3=t*h1;
            qpert(in,in-1)=q3(in-1,1); %qpert element is replaced with q3
        end %i1 loop
            if ~isempty(ipi)
                qm(j1+1:j1+m,1:m)=-qpert;      %perturbed correction
        end
end % end of j1 correction super loop
%document changes
[i j]=find(abs(qm0-qm)~=0); %corrected indeces
chqm=[ ];
for i1=1:size(i);
    chqm=[chqm;i(i1) j(i1) qm0(i(i1),j(i1)) qm(i(i1),j(i1))];
end
%message display
if ~isempty(chqm)
format short g
    disp('WARNING: moisture flux input data modified to reduce negative diagonal in mh')
    disp([chqm;i(i1) j(i1) qm0(i(i1),j(i1)) qm(i(i1),j(i1))])
    format short
end
%message finished
%processing
%tc and pc optimization for heat (tcp(7)=0) and moisture (tcp(7)=1)
superr=[ ];
ilim=ceil((tcpc(2)-tcpc(1))/tcpc(3));
jlim=ceil((tcpc(5)-tcpc(4))/tcpc(6));
%hh, hm
for i=1:ilim
    for j=1:jlim
        x0=[tcpc(1)+i*tcpc(3) tcpc(4)+j*tcpc(6)];
        [se lsqp lsqc shh]=n2m_c_d(x0,tt,qh,pp);
        if min(diag(shh))<=0
            se=NaN;
        end
        superr(i,j)=se;
        disp([i j se/1e3 lsqp])
    end
end
[m j]=min(min(superr));
[m1 i]=min(superr(:,j));
%indeces: i,j
    x0=[tcpc(1)+i*tcpc(3) tcpc(4)+j*tcpc(6)];
    x=fmins('n2m_c_d',x0,'options',[ ],tt,qh,pp);
    [se lsqp lsqc shh shm]=n2m_c_d(x,tt,qh,pp);
    n2m_res=[x(1) x(2) se lsqp lsqc];
%mh, mm
if tcpc(7)==0 %use tc and pc from heat data
    [se lsqp lsqc smh smm]=n2m_c_d(x,tt,qm,pp);
    n2m_res=[n2m_res; x(1) x(2) se lsqp lsqc];
else
superr=[ ];
for i=1:ilim
    for j=1:jlim
        x0=[tcpc(1)+i*tcpc(3) tcpc(4)+j*tcpc(6)];
        [se lsqp]=n2m_c_d(x0,tt,qm_,pp);
        superr(i,j)=se;
        disp([i j se/1e5 lsqp])
    end
end
[m j]=min(min(superr));
[m1 i]=min(superr(:,j));
%indeces: i, j
    x0=[tcpc(1)+i*tcpc(3) tcpc(4)+j*tcpc(6)];
    x=fmins('n2m_c_d',x0,'options',[ ],tt,qm,pp);
    [se lsqp lsqc smh smm]=n2m_c_d(x,tt,qm,pp);
    n2m_res=[n2m_res; x(1) x(2) se lsqp lsqc];
```

-continued

```
end %end if
%check final hh diagonal and singularity
        dia=diag(shh);
        ipi=find(dia<=0);
        de=det(shh);
    if isempty(ipi) & de~=0
        disp('NTCF post-processing successfuly finished. . .')
        stat=0;
    elseif de==0
        disp('WARNING: hh is singular')
        stat=-1;
    else
        disp('WARNING: hh has negative diagonal element(s)')
        stat=-1;
    end
%results to be saved: n2m_res, chqh, chqm, shh, shm, smh, smm
mwrite([wd '/n2m_res.dat'], n2m_res);
mwrite([wd '/chqh.dat'], chqh);
mwrite([wd '/chqm.dat'], chqm);
mwrite([wd '/shh.dat'], shh);
mwrite([wd '/shm.dat'], shm);
mwrite([wd '/smh.dat'], smh);
mwrite([wd '/smm.dat'], smm);
%when returns, stat must be passed and processed
```

Appendix 6: Internal Function: n2m_c_d.m

Internal processing function to solve for hh (or mh) from qqh=hh*(TT-Thc) (or qqm=mh*(TT-Tmc)) with perfect-fit, LSQ-fit, and time-cone rules for given Thc (or Tmc) for two-dimensional model.

```
function [se,lsqp,lsqc,shh,shm]=n2m_c_d(x,tt,qh,pp)
%qh can be heat or moisture flux
%shh can be super hh or super hm
%shm can be super hm or super mm
tc=x(1);
pc=x(2);
tt=tt-tc;
pp=pp-pc;
shh=[ ]; %super hh diagonal elements
shm=[ ]; %super hm diagonal elements
shh=sparse(shh);
shm=sparse(shm);
%hhi
[n m]=size(tt);
m=m/2; %size of hh and hm
p=n/m;
for i=1:p; %super maker loop
j1=(i-1)*m;
%Step 1: initialize and calculate hh from central values, then iterate
wlp=0;
err0=1;
err1=0;
hm=zeros(m);
tcent=tt(j1+1:j1+m,m+1:2*m);
pcent=pp(j1+1:j1+m,m+1:2*m);
qcent=qh(j1+1:j1+m,m+1:2*m)-hm*pcent;
hh=qcent/tcent;
        hdmax0=max(max(abs(hh)));   %always positive
%iterate
magn=0;
neg=0;
while err1<err0 & wlp<100 & magn==0 & neg==0
%for wlp=0:10
%Step 2: lsq fit for both perturbed and unperturbed
        q=[qh(j1+1:j1+m,1:m) qh(j1+1:j1+m,m+1:2*m)];
                %heat or moisture flux
        t=[tt(j1+1:j1+m,1:m) tt(j1+1:j1+m,m+1:2*m)]; %temperature
        p=[pp(j1+1:j1+m, 1:m) pp(j1+1:j1+m,m+1:2*m)]; %vapor pressure
        qe=q-hh*t; %to be explained by pressure-driven term
        %lsq
        m1=2; %perturbed and unperturbed
```

-continued

```
hm0=hm;
hm=[ ];
        for i1=1:m
        j2=[ ];
            for j3=1:m1;
            j2=[j2 (1:i1)+(j3-1)*m];
                end
        s1=qe(i1,j2);
        s2=p(1:i1,j2);
        h1=s1/s2;
        h=[h1 zeros(1,m-i1)];
        hm=[hm;h];
    end
%Step 3: calculate fitting errors, magnitudes, and sign changes
    qcent=qh(j1+1:j1+m,m+1:2*m)-hm*pcent; %hm is relaxed
    hh0=hh;
    hh=qcent/tcent; %hh is recalculated to enforce
    perfect fit to central values
    d_hh=diag(hh);
        hh_d=hh-diag(d_hh);
        hmax=max(max(abs(hh_d)));
            %check change in sign in hh diagonal
            sgnd=max(d_hh)*min(d_hh);
            if sgnd>=0
            neg=0;
                else
            neg=1;
                end
    %check increase outside diagonal
    if hmax>hdmax0
        magn=1;
    else
        magn=0;
    end
    qcal=hh*t+hm*p;
        e=(q-qcal).*(q-qcal);
            lsq=(sum(sum(e))/(2*m*m))^.5;
    avg=mean(mean(abs(q-qcal)));
    if wlp>0
        err0=err1;
    end
    err1=lsq*avg;
    %[i wlp lsq avg err1 magn]
    wlp=wlp+1;
%repeat
end %end of while loop
hh=hh0;
hm=hm0;
```

```
shh(j1+1:j1+m,j1+1:j1+m)=hh;
shm(j1+1:j1+m,j1+1:j1+m)=hm;
end %end of super maker
%overall lsq error
qpred=shh*tt+shm*pp;
err1=qh(:,m+1:2*m)-qpred(:,m+1:2*m);
lsqc=(sum(sum(err1.*err1))/(n*m))^.5;
```

```
err1=qh(:,1:m)-qpred(:,1:m);
lsqp=(sum(sum(err1.^4))/(n*m))^.25;
se=condest(shh);
```

Appendix 7: An iconv MATLAB Code Useful in MULTIFLUX™

```
%function: new_iconv( )
%purpose: inverse convolution using Least Square (LS) optimization
%usage:   A=new_iconv(ticks,(ticks,tb,c_time,in,out)
%INPUT:
%ticks -- total set of time ticks
%tb    -- time division vector
%c_time -- time ticks corresponding to smaller number of As, used for LS
%in    -- input stairs temperature vector (ticks/NT length), constant steps over NT ticks
%out   -- difference between central and initial output values from NTC
%OUTPUT:
%A    -- generator function
%Date: 3/23/04, original version
%Date: 3/30/04, insert a small tick befor the end of each time division in
%order to fix an end-point problem.
%
function [A, TW]=new_iconv(ticks,tb,c_time,in,out)
%insert a small tick befor the end of each time division
M=length(ticks);    %total number of ticks
N=length(tb);       %number of time divisions
NT=M/N;             %ticks in one step time interval
ticks2=[ ];
for i=1:N
ticks2=[ticks2; ticks((i-1)*NT+1:i*NT-1) ;ticks(i*NT)-1e-6 ;ticks(i*NT)];
end
out2=interp1(ticks,out,ticks2);
ticks=ticks2;
out=out2;
M=length(ticks);    %total number of ticks
N=length(tb);       %number of time divisions
NT=M/N;             %ticks in one step time interval
DT=diff([0; in]);   %temperature difference vector
TW=eye(M)*DT(1);    %first step
for i=2:N %tb index starting from the second time division
    Wi=zeros(M);
    for j=(i-1)*NT+1:M    %tick index
        t=ticks(j)-tb(i-1);          %determine the position of jth tick with the tb shift
        iL=max(find(ticks<=t));      %left neighbor index
        iR=iL+1;
        wR=(t-ticks(iL))/(ticks(iR)-ticks(iL)); %calculate the weight factor to the right
        wL=1-wR;
        Wi(j,iL)=wL;
        Wi(j,iR)=wR;
    end
    TW=TW+Wi*DT(i);
end
%Least Square optimization for smaller number of As
Nc=length(c_time);
R=zeros(M,Nc);
ii=find(ticks<c_time(1));
R(ii, 1)=1;
for j=1:M    %tick index
t=ticks(j);             %determine the position of jth tick with the tb shift
iL=max(find(c_time<=t));   %left neighbor index
    iR=iL+1;
    if iR>Nc    %check for Right availability
        iL=iL-1;
        iR=iR-1;
    end
    wR=(t-c_time(iL))/(c_time(iR)-c_time(iL)); %calculate the weight factor to the right
    wL=1-wR;
    R(j,iL)=wL;
    R(j,iR)=wR;
end
R=sparse(R);
TW=sparse(TW);
C=(TW*R)\out;
```

```
-continued

A=R*C;
%remove the inserted points from the A
A(NT:NT:M)=[ ];
return
```

The invention claimed is:

1. A computer-implemented method comprising modeling on a computer the time- and space-variable flow of multiple physical entities in a physical transport system, the physical entities comprising at least heat and moisture and the physical transport system comprising at least a solid phase and a gaseous phase, wherein the transport of one of the physical entities in the physical transport system affects the transport of one or more others of the physical entities transported in the physical transport system, the method comprising:

a) providing a numerical transport code running on a computer, the numerical transport code having at least one time-variable input and a time-variable output related to the time-variable input;
   b) executing at least one calculation with the numerical transport code using a time- and space-variable input to the numerical transport code, the time- and space-variable input being related to the flow of the multiple physical entities in the physical transport system and obtaining at least one time-variable output response from the numerical transport code;
   c) identifying a mathematical functional relationship between the time- and space-variable input to the numerical transport code and the time-variable output response from the numerical transport code wherein the mathematical functional relationship identified comprises a convolution integral and the convolution integral includes a kernel function and the kernel function is identified as the indicial admittance of each of the multiple physical entities and the convolution integral is approximated with a discretized admittance comprising a sum of the product of discrete elements, each discrete element comprising the kernel function represented at one time point or spatial point, the discretized admittance being identified by a new inverse convolution from the discretized values as vectors of at least one given input and one given output; and
   d) generating a functionalized surrogate model of the physical transport system from the mathematical functional relationship identified, the functionalized surrogate model describing the time- and space-variable flow of the multiple physical entities in the physical transport system.

2. A method according to claim 1, wherein the discretized vectors of the indicial admittance, the input, and the output all have the same number of elements.

3. A method according to claim 1, wherein the input vector used for model identification is reduced in size to have coarsely spaced step changes, the step changes being fewer in number than the elements of the output vector and of the indicial admittance vector.

4. A method according to claim 1, wherein the discretized vector of the indicial admittance has a fewer number of base elements than are in the output vector, providing for redundancy in the evaluation of those said fewer base elements, and wherein redundancy is reduced during inverse convolution using reduction of the error between a prediction of the functionalized surrogate model and the given output vector with a least-square-fit solution.

5. A method according to claim 4, wherein the values of the indicial admittance at intermittent points between the elements of the said fewer number of base elements are interpolated internally during the process of inverse convolution with the least-square-fit solution.

6. A method according to claim 5, wherein said interpolation is linear.

7. A method according to claim 1 wherein the numerical transport code comprises ANSYS (trademark) simulation software, a multi-phase non-isothermal flow and transport model "NUFT", a TOUGH (trademark) multi-phase transport model, a formula-based, analytical-numerical transport code, or a combination of two or more of the foregoing numerical transport codes.

8. A method according to claim 1 wherein the at least one time-variable input comprises data derived from the physical transport system, the method comprising modifying the physical transport system according to output received from the functionalized surrogate model.

9. A method according to claim 1 wherein the physical transport system is selected from the group consisting of geological storage systems, hydrological systems, nuclear waste repository systems, waste storage systems, mine reclamation systems and pollution tracking systems.

10. A method according to claim 1 wherein the physical transport system comprises a nuclear waste repository, the physical entities further comprise water and air, the solid phase comprises rock, the gaseous phase comprises air and the functionalized surrogate model provides a future temperature prediction for a nuclear waste storage architecture for the nuclear waste repository.

11. A method according to claim 10 comprising modifying the nuclear waste storage architecture in response to the future temperature prediction.

12. A computer system implementing software for performing a method according to claim 1.

13. A computer-implemented method comprising modeling on a computer the time- and space-variable flow of multiple physical entities in a physical transport system the physical entities comprising at least heat and moisture and the physical transport system comprising at least a solid phase and a gaseous phase wherein the transport of one of the physical entities in the physical transport system affects the transport of one or more others of the physical entities transported in the physical transport system, the method comprising:

a) providing a numerical transport code running on a computer, the numerical transport code having at least one time-variable input and a time-variable output related to the time-variable input;
   b) executing at least one calculation with the numerical transport code using a time- and space-variable input to the numerical transport code, the time- and space-vari-able input being related to the flow of the multiple physical entities in the physical transport system and obtaining at least one time-variable output response from the numerical transport code;

c) identifying a mathematical functional relationship between the time- and space-variable input to the numerical transport code and the time-variable output response from the numerical transport code wherein the mathematical functional relationship identified comprises a convolution integral and the convolution integral includes a kernel function and the kernel function is identified as the indicial admittance of each of the multiple physical entities, the mathematical functional relationship comprising a simplified Volterra series formulation comprising multiple terms for nonlinear processes, each term of the Volterra series formulation having a convolution integral or having the product of multiple convolution integrals; and d) generating a functionalized surrogate model of the physical transport system from the mathematical functional relationship identified, the functionalized surrogate model describing the time- and space-variable flow of the multiple physical entities in the physical transport system.

14. A method according to claim 13, wherein the indicial admittances in the functional relationship in the Volterra series formulation are identified consecutively by matching the surrogate model results with multiple output results obtained from the numerical transport code using essentially different inputs in the calculations.

15. A method according to claim 13, wherein the indicial admittances in the functional relationship in the Volterra series formulation are identified simultaneously by matching the surrogate model results with multiple output results as a single identification task.

16. A method according to claim 15, wherein the number of indicial admittances is obtained from the numerical transport code using essentially different input functions, employing a least-square-fit model, and is smaller than the number of output functions.

17. A modeling method according to claim 13 wherein the multiple physical entities further comprise one or more physical entities selected from the group consisting of water, another fluid, air, another gas or gases, a chemical, chemicals, energy and subatomic particles and wherein the physical transport system further comprises one or more physical phases selected from the group consisting of solid, liquid, gaseous, intermediate and mixed phases.

* * * * *